US008121879B1

(12) United States Patent
Cohen

(10) Patent No.: US 8,121,879 B1
(45) Date of Patent: Feb. 21, 2012

(54) AUTOMATICALLY GENERATING ASSESSMENTS OF QUALIFICATION RELEVANCE AND QUALIFICATION ISSUER CREDIBILITY

(75) Inventor: Peter D. Cohen, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 185 days.

(21) Appl. No.: 12/708,987

(22) Filed: Feb. 19, 2010

Related U.S. Application Data

(62) Division of application No. 11/395,831, filed on Mar. 31, 2006, now Pat. No. 8,024,211.

(51) Int. Cl.
*G06Q 10/00* (2006.01)
(52) U.S. Cl. .................................................. 705/7.14
(58) Field of Classification Search .............. 705/7.14
See application file for complete search history.

(56) References Cited

U.S. PATENT DOCUMENTS

| | | | |
|---|---|---|---|
| 5,455,875 A | 10/1995 | Chevion et al. | 382/311 |
| 5,465,308 A | 11/1995 | Hutcheson et al. | 382/159 |
| 5,805,745 A | 9/1998 | Graf | 382/291 |
| 5,826,244 A | 10/1998 | Huberman | 705/37 |
| 5,848,393 A | 12/1998 | Goodridge et al. | 705/8 |
| 5,862,223 A | 1/1999 | Walker et al. | 380/25 |
| 5,937,388 A | 8/1999 | Davis et al. | 705/8 |
| 6,012,066 A | 1/2000 | Discount et al. | 707/103 |
| 6,029,195 A | 2/2000 | Herz | 709/219 |
| 6,032,151 A | 2/2000 | Arnold et al. | 707/103 |
| 6,041,306 A | 3/2000 | Du et al. | 705/8 |
| 6,044,355 A | 3/2000 | Crockett et al. | 705/8 |
| 6,078,916 A | 6/2000 | Culliss | 707/5 |
| 6,128,380 A | 10/2000 | Shaffer et al. | 379/265 |
| 6,163,607 A | 12/2000 | Bogart et al. | 379/266 |
| 6,173,053 B1 | 1/2001 | Bogart et al. | 379/266 |
| 6,181,343 B1 | 1/2001 | Lyons | 345/358 |
| 6,182,068 B1 | 1/2001 | Culliss | 707/5 |
| 6,223,165 B1 | 4/2001 | Lauffer | 705/8 |
| 6,289,340 B1 * | 9/2001 | Puram et al. | 705/7.14 |
| 6,393,497 B1 | 5/2002 | Arnold et al. | 709/330 |
| 6,539,377 B1 | 3/2003 | Culliss | 707/5 |
| 6,546,087 B2 | 4/2003 | Shaffer et al. | 379/90.01 |

(Continued)

OTHER PUBLICATIONS

Phillip Wallage, Assurance on sustainability reporting: An Auditor's View, 2000, regarding determination of suitable criteria.*

(Continued)

*Primary Examiner* — Romain Jeanty
*Assistant Examiner* — Brandi P Parker
(74) *Attorney, Agent, or Firm* — Seed IP Law Group PLLC

(57) ABSTRACT

A method, system, and computer-readable medium is described for generating assessments of relevance of qualifications and of credibility of qualification issuers, such as in an automatic manner and for use by users in an electronic marketplace that facilitates interactions between task requesters who have tasks that are available to be performed and task performers who are available to perform tasks. Such assessments may in some situations be provided to users in various manners and for various purposes, such as to allow task requester users to identify appropriate qualifications to associate with their tasks and/or to allow task performer users to identify appropriate qualifications to acquire to assist in future performance of tasks. The assessments may be generated in various manners, including based on analyzing usage data related to the use of qualifications by task performers and task requesters and based on feedback provided by human users.

26 Claims, 33 Drawing Sheets

U.S. PATENT DOCUMENTS

| | | | |
|---|---|---|---|
| 6,584,192 B1 | 6/2003 | Agusta | 379/265.12 |
| 6,584,464 B1 | 6/2003 | Warthen | 707/4 |
| 6,587,556 B1 | 7/2003 | Judkins et al. | 379/219 |
| 6,603,854 B1 | 8/2003 | Judkins et al. | 379/265.06 |
| 6,636,590 B1 | 10/2003 | Jacob et al. | 379/114.05 |
| 6,704,403 B2 | 3/2004 | Lurie et al. | 379/114.1 |
| 6,707,904 B1 | 3/2004 | Judkins et al. | 379/265.06 |
| 6,763,104 B1 | 7/2004 | Judkins et al. | 379/265 |
| 6,859,523 B1 | 2/2005 | Jilk et al. | 379/32.01 |
| 6,938,048 B1* | 8/2005 | Jilk et al. | 705/7.14 |
| 7,155,400 B1 | 12/2006 | Jilk et al. | 705/9 |
| 7,167,855 B1* | 1/2007 | Koenig | 1/1 |
| 7,197,459 B1 | 3/2007 | Harinarayan et al. | 704/270.1 |
| 7,243,352 B2 | 7/2007 | Mandava et al. | 718/104 |
| 2002/0069079 A1 | 6/2002 | Vega | 705/1 |
| 2002/0083079 A1 | 6/2002 | Meier et al. | 707/104.1 |
| 2002/0123921 A1 | 9/2002 | Frazier | 705/9 |
| 2003/0078852 A1 | 4/2003 | Shoen et al. | 705/26 |
| 2003/0200156 A1 | 10/2003 | Roseman et al. | 705/27 |
| 2003/0204449 A1 | 10/2003 | Kotas et al. | 705/27 |
| 2005/0004825 A1 | 1/2005 | Ehrler et al. | 705/8 |
| 2006/0127865 A1 | 6/2006 | Siders et al. | 434/219 |
| 2009/0287514 A1* | 11/2009 | West | 705/7 |

OTHER PUBLICATIONS

Wallage, Philip, "Assurance on sustainability reporting: An auditor's view," *Auditing* 19:53-65, 2000. (14 pages).

U.S. Appl. No. 10/990,949, filed Nov. 16, 2004, Cohen et al.

U.S. Appl. No. 10/990,951, filed Nov. 16, 2004, Cohen et al.

U.S. Appl. No. 10/990,771, filed Nov. 16, 2004, Mortensen et al.

U.S. Appl. No. 10/991,339, filed Nov. 16, 2004, Cohen et al.

"About Spending," retrieved Nov. 23, 2004, from http://www.mypoints.com/mp/dstatial.show?isref=nmhp.popup.aboutspending.default, 1 page.

"Earning Points with MyPoints," retrieved Nov. 23, 2004, from http://www.mypoints.com/mp/dstatial.show?isref=nmhp.popup.aboutearning.default, 1 page.

"Enterprise Learning in the Next Twenty-Four Months", elearningforum.com Jun. 13, 2003, accessed from http://www.elearningforum.com/meetings/2003/june/eLearningForum_June13_Master_Final.pdf, 52 pages.

"FAQs," retrieved Nov. 23, 2004, from http://www.mypoints.com/mp/dstatial.show?isref=nmhp.popup.faq.default, 1 page.

"Frequently Asked Questions about the Open Mind Initiative," retrieved Nov. 16, 2004, from http://www.openmind.org/FAQs.html, 3 pages.

"Frequently Asked Questions," TrueDater FAQ's, retrieved Apr. 4, 2005, from http://www.truedater.com/index.php?action=faqs, 2 pages.

"Grid—The Competitive Advantage," Aug. 2004, retrieved Jun. 9, 2005, from http://www.sun.com/solutions/documents/articles/grid_adv_aa.xml?null, 2 pages.

"Join MyPoints Now," retrieved Nov. 23, 2004, from http://www.mypoints.com/?MCK=ccb67d8c41a3819b, 4 pages.

"Payment-On-Line (AOL, Compuserve, Internet, etc)," Oct. 20, 1994, retrieved Dec. 6, 2004, from http://groups-beta.google.com/group/misc.entrepreneurs/browse_thread/thread/80fcf110252bb3f7/fflc8, 3 pages.

"The ESP Game," retrieved Jun. 8, 2005, from http://www.espgame.org, 1 page.

"What is BonusMail®?," retrieved Nov. 23, 2004, from http://www.mypoints.com/mp/dstatial.show?isref=nmhp.popup.bonusmail.default, 1 page.

"What is Keen," retrieved Jun. 8, 2005, from http://www.keen.com/documents/homepage/wik_pop.asp?TID=gbFQnFLPstnUuFonMtBmHw, 1 page.

"What is MyPoints," retrieved Nov. 23, 2004, from http://www.mypoints.com/mp/dstatial.show?isref=nmhp.popup.whatis.default, 1 page.

About, Inc., "Intelligent Agents," retrieved Jun. 9, 2005, from http://psychology.about.com./od/intelligentagents/, 5 pages.

About, Inc., "Our Story," retrieved Jun. 9, 2005, from http://ourstory.about.com/, 2 pages.

About, Inc., Welcome to About.com, retrieved Jun. 9, 2005, from http://www.about.com, 2 pages.

Applied Skills & Knowledge, LLC, "Make Skills-Based Routing Happen," Jun. 3, 2003, retrieved from http://www.appliedskills.com/whitepapers/files/Skills-basedRouting.pdf, 3 pages.

Barlas, D., "Hipbone Connects to Kana," Jan. 5, 2004, retrieved Jun. 8, 2005, from http://www.line56.com/print/default.asp?ArticleID=5255, 1 page.

Brooks, C., et al., "Automated Strategy Searches in an Electronic Goods Market: Learning and Complex Price Schedules," Proceedings of the 1st ACM conference on Electronic Commerce, Denver, Colorado, 1999, accessed from http://researchweb.watson.ibm.com/infoecon/paps/ec99_bundle.pdf, 10 pages.

Calishain, T., "Yahoo! Service Offers More Advice than Expertise," May 6, 2002, retrieved Jul. 16, 2004, from http://www.infotoday.com/newsbreaks/nb020506-1.htm, 2 pages.

Deighton, A., "Elevating Performance Management," CLOmedia.com, Oct. 2003, accessed Nov. 16, 2005, from http://www.clomedia.com/content/anmviewer.asp?a=280&print=yes, 4 pages.

DiMicco, J., et al., "Learning Curve: A Simulation-based Approach to Dynamic Pricing," Electronic Commerce Research : Special Issue on Aspects of Internet Agent-based E-Business Systems, Kluwer Academic Publishers, 3(3-4):245-276, 2003, accessed from http://web.media.mit.edu/~joanie/learningcurve/ECR-DiMicco.pdf, 21 pages.

distributed.net, "distributed.net History & Timeline," retrieved Jun. 8, 2005, from http://www.distributed.net/history.php, 7 pages.

distributed.net, "The Organization," retrieved Jun. 8, 2005, from http://www.distributed.net/, 2 pages.

Doan, A., "MongoMusic Fans Include Microsoft," Sep. 9, 2000, Forbes.com, retrieved Jun. 9, 2005, from http://www.forbes.com/2000/09/09/feat2.html, 3 pages.

DuBaud, S., "Advice Site Resort to Legal Counsel," Jan. 4, 2002, retrieved Apr. 29, 2004, from http://news.com.com/2011-1088-801359.html, 3 pages.

Elance Inc., Elance *Online*™—Everyday Outsourcing™, retrieved Jun. 9, 2005, from http://www.elance.com/c/static/main/displayhtml.pl?file=eol.html&module=home, 2 pages.

Elance, Inc., "Elance History," retrieved Jun. 8, 2005, from http://www.elance.com/c/static/main/displayhtml.pl?file=heritage.html, 3 pages.

eLancer homepage, retrieved Jun. 8, 2005, from http://www.elancer.us/, 2 pages.

Epinions, Inc., Epinions.com homepage, retrieved Jun. 9, 2005, from http://www.epinions.com, 2 pages.

Fox, S., "Can New Technology Revolutionize the Net?," Jun. 1, 2000, CNET.com, retrieved Jun. 8, 2005, from http://web.archive.org/web/20001018221958/www.cnet.com/insider/0-121949-7-1995365.html, pp. 1-3, 3 pages.

Get a Freelancer.com homepage, retrieved Jun. 8, 2005, from http://www.getafreelancer.com, 3 pages.

gonesilent.com homepage, Aug. 22, 2000, retrieved Jun. 8, 2005, from http://web.archive.org/web/20000822122731/www.gonesilent.com/about.html, 2 pages.

Google—Answers, "Ask a question, Set your Price. Get your Answer.," retrieved Jun. 9, 2005, from http://answers.google.com/answers/, 1 page.

Google, "Your Computer's Idle Time is too Precious to Waste," retrieved Jun. 9, 2005, from http://toolbar.google.com/dc/offerdc.html, 1 page.

Grigg, I., et al. "Using electronic markets to achieve efficient task distribution," Feb. 28, 1997, accessed from http://citeseer.ist.psu.edu/693749.html, 19 pages.

Gunn, S., "Hey, buddy, can you spare some cycles?," Sep. 24, 1997, retrieved Jun. 8, 2005, from http://www.cnn.com/TECH/9709/24/netly.news/, 4 pages.

Hagel, J. et al., "Go Slowly with Web Services," Feb. 15, 2002, CIO.com retrieved from http://www.cio.com/archive/021502/keynote.html, 4 pages.

Hagel, J., et al., "Your Next IT Strategy," *Harvard Business Review* R0109G:105-113, Oct. 2001, 11 pages.

Hagel, J., *Out of the Box—Strategies for Achieving Profits today and Growth Through Web Services*, Harvard Business School Publishing, Boston, Massachusetts, 2002, Front Cover through Acknowledgements, Chapter 1, "Responding to Unmet Needs," and Chapter 2, "Web Services Create New Options," pp. i-xix and 1-42, 33 pages.

Ingenio, Inc., Ingenio™ homepage, retrieved Jun. 8, 2005, from http://www.ingenio.com/default.asp?TF=1, 2 pages.

Ingenio, Inc., Introducing Ingenio™ Pay Per Call™, retrieved Jun. 8, 2005, from http://www.ingenio.com/documents/corp/home.asp, 2 pages.

Ingenio, Inc., KEEN—Your Personal Advisor, retrieved Jun. 8, 2005, from http://www.keen.com, 2 pages.

Ingenio, Inc., KEEN—Your Personal Advisor/Get Advice, retrieved Jun. 8, 2005, from http://www.keen.com/categories/get_answers.asp?SRCHT=0&search=&gid=0, 1 page.

Jupitermedia Corporation, "About jGuru.com: Overview," retrieved Jun. 9, 2005, from http://www.jguru.com/misc/about-overview.jsp, 2 pages.

Jupitermedia Corportion, jGuru homepage, retrieved Jun. 9, 2005, from http://www.jguru.com, 5 pages.

Kana Inc., "Corporate Overview," retrieved Jun. 8, 2005, from http://www.kana.com/about/about.aspx, 2 pages.

Katz, J., et al., "The Benefits of a Virtual Contact Center," MCI, Inc., May 2004, retrieved from http://global.mci.com/us/enterprise/insight/whitepapers/pdf/VirtualContractCtr.pdf, 7 pages.

Kenexa, "Call Centers," retrieved Jun. 8, 2005, from http://www.kenexa.com/ind_callcent.html, 3 pages.

Lynn, R., "Keeping Online Daters Honest," Apr. 1, 2005, retrieved on Apr. 4, 2005, from http://www.wired.com/news/print/0,1294,67083,00.html, 3 pages.

Massive Multiplayer Online Role-Playing Game—homepage, retrieved Jun. 8, 2005, from http://www.mpog.com, 2 pages.

Microsoft Corporation, "Microsoft Acquires MongoMusic," Sep. 13, 2000, retrieved Jun. 9, 2005, from http://www.microsoft.com/presspass/press/2000/sept00/mongopr.mspx, 2 pages.

Moreno, R., "Job Scheduling and Resource Management Techniques in Dynamic Grid Environments," In et al., F.F.R., ed.: Across Grids 2003, vol. 2970 of LNCS, Springer 2004, accessed from http://citeseer.ist.psu.edu/cache/papers/cs2/539/http:zSzzSzgrid.cesga.eszSzeabstractszSzR.Moreno.pdf/moreno04job.pdf, 4 pages.

Mori, G., et al., "Breaking a Visual CAPTCHA," retrieved Jun. 8, 2005, from http://www.cs.berkley.edu/~mori/gimpy/gimpy.html, 4 pages.

Mossberg, W., "GuruNet as a Reference Tool Goes Beyond Search Engines," Mar. 6, 2003, retrieved Jul. 20, 2004, from http://ptech.wsj.com/archive/ptech-20030306.html, 3 pages.

Multiplayer Online Games Directory—homepage, retrieved Jun. 8, 2005, from http://www.mpogd.com, 1 page.

Nortel Networks, "Beyond ACD—The advantages of Skill-based Routing in Today's Contact Centers," Mar. 7, 2003, retrieved from http://www.nortelnetworks.com/solutions/ccvp/collateral/nnl03640-030703.pdf, 12 pages.

Online Multiplayer Games Network—homepage, retrieved Jun. 8, 2005, from http://www.omgn.com, 2 pages.

Project Gutenberg's Distributed Proofreaders—homepage, retrieved Jun. 9, 2005 from http://www.pgdp.net/c/default.php, 4 pages.

Rhodes, B., "The Wearable Remembrance Agent: A System for Augmented Memory," Appeared in *Personal Technologies Journal Special Issue on Wearable Computing 1*:218-224, 1997, retrieved Jun. 9, 2005, from http://www.bradleyrhodes.com/Papers/wear-ra-personaltech/, 10 pages.

Sarne, D., et al., "Equilibrium Strategies for Task Allocation in Dynamic Multi-Agent Systems," Proceedings of the 16$^{th}$ European Conference on Artificial Intelligence, ECAI '2004, including Prestigious Applicants of Intelligent Systems, PAIS 2004, Valencia, Spain, Aug. 22-27, 2004, accessed from http://www.cs.biu.ac.il/~sarit/Articles/ecai2004poster-V6.pdf, 2 pages.

Serena Software, Inc., "Serena™ Automating Change," retrieved Jun. 9, 2005, from http://www.serena.com, 1 page.

SETI Institute homepage, retrieved Jun. 9, 2005, from http://www.seti.org/site/pp.asp?c=ktJ2J9MMIsE&b=178025, 3 pages.

Siebel Systems, Inc., Siebel homepage, retrieved Jun. 8, 2005, from http://www.siebel.com/, 3 pages.

Singh, P., "Open Mind: common sense—Teaching computers the stuff we all know," retrieved Jun. 9, 2005, from http://commonsense.media.mit.edu/cgi-bin/search.cgi, 2 pages.

Singh, P., "The Open Mind Common Sense Project," Jan. 2, 2002, retrieved Jun. 9, 2005, from http://www.kurzweilai.net/articles/art0371.html, pp. 1-24, 24 pages.

Singh, R., et al., "A comparative evaluation of internet pricing models: smart markets and dynamic capacity contracting," 2000, accessed from http://www.ecse.rpi.edu/Homepages/shivkuma/research/papers/423-final.pdf, 6 pages.

Spice, B., "CMU Student Taps Brain's Game Skills," Oct. 5, 2003, retrieved Jun. 8, 2005, from http://www.post-gazette.com/pg/03278/228349.stm, 5 pages.

Spogg.com—homepage, retrieved Jun. 8, 2005, from http://www.spogg.com, 2 pages.

Sun Microsystems, Inc., "Products & Technologies—Java Technology," retrieved Jun. 9, 2005, from http://java.sun.com, 2 pages.

Sun Microsystems, Inc., "The Jini Technology Series: JavaSpaces Principles, Patterns, and Practice," retrieved Jun. 9, 2005, from http://java.sun.com/docs/books/jini/javaspaces/, 2 pages.

TopCoder, Inc., Topcoder homepage, retrieved Jun. 8, 2005, from http://www.topcoder.com/, 2 pages.

University of California, "What is SETI@home?," retrieved Jun. 9, 2005, from http://setiathome.ssl.berkeley.edu./, 1 page.

Vollmer, J., "The Enterprise LMS Market: Where Are We Now?" CLOmedia.com, May 2003, accessed Nov. 16, 2005, from http://www.clomedia.com/content/anmviewer.asp?a=181&print=yes, 4 pages.

Wilson, B. "Anti-Social Software," Apr. 30, 2004, retrieved Aug. 26, 2005, from http://www.brendonwilson.com/profile/000156.shtml, 5 pages.

Wolverton, T., et al., "Yahoo Launches Advice Site," Apr. 29, 2002, CNET News.com, retrieved Apr. 29, 2004, from http://news.com.com/2102-1017_3-894968.html?tag+st.util.print, 2 pages.

\* cited by examiner

Example Task Submission

```
    <CreateTask>
        <ParticipantId>BarnabyPhoto</ParticipantId>
 3      <Operation>
            <TaskType>
                <Name>ImageChoice</Name>
 6              <Description>
                    <Verbal>Select which of 4 photographs best shows a business
                                       location </Verbal>
 9                  <Compensation>
                        <CurrencyCode>USD</CurrencyCode>
                        <Amount>0.06</Amount>
12                  </Compensation>
                    <TimeEstimate>30</TimeEstimate>
                </Description>
15              <ProviderApplication> http://imagematch.abcde.com/
                    </ProviderApplication>
                <ProviderCriteria>
18                  <AllowedProviders/>
                    <DisallowedProviders>
                        <Provider>PoorProvider1</Provider>
21                  </DisallowedProviders/>
                    <ProviderQualifications/>
                </ProviderCriteria>
24              <StateTimeouts>
                    <Open>172800</Open>
                    <Locked>60</Locked>
27              </StateTimeouts>
            </TaskType>
            <Request>
30              <ImageSubject>
                    <ItemID>B0000F5R9P</ItemID>
                    <Name>Wildboar Tavern</Name>
33                  <Address>
                        <Street>1200 Main Street</Street>
                        <City>Seattle</City> <State>WA</State> <Zip>98118</Zip>
36                  </Address>
                </ ImageSubject>
                <Images>
39                  <Image> http://image.abcde.com/biz_images/10913487 </Image>
                    <Image> http://image.abcde.com/biz_images/10913488 </Image>
                    <Image> http://image.abcde.com/biz_images/10913489 </Image>
42                  <Image> http://image.abcde.com/biz_images/10913490 </Image>
                </Images>
            </Request>
45      </Operation>
    </CreateTask>
```

FIG. 2A

Example Task Request Status Query

```
   <TaskSearch>
     <ParticipantId>BarnabyPhoto</ParticipantId>
     <Operation>
3      <SearchFields>
         <Requester>BarnabyPhoto</Requester>
         <State>Completed</State>
6        <TaskType>
           <Name>ImageChoice</Name>
         </TaskType>
9      </SearchFields>
     </Operation>
12  </TaskSearch>
```

FIG. 2B

Example Task Performance Response

```
   <TaskSearchResponse>
     <Task>
3      <TaskId>109234875</TaskId>
       <Requester>BarnabyPhoto</Requester>
       <Provider>BestManBryan</Provider>
6      <State>Completed</State>
       <ResponseData>
         <ItemID>B0000F5R9P</ItemID>
9        <Image> http://image.abcde.com/biz_images/10913490 </Image>
       </ResponseData>
     </Task>
12  </TaskSearchResponse>
```

FIG. 2C

Example Task Completion Notification

```
<CloseTask>
    <ParticipantId>BarnabyPhoto</ParticipantId>
    <Operation> <TaskId>10234875</TaskId>  </Operation>
</CloseTask>
```

*FIG. 2D*

Example Available Task Query

```
<TaskGroupSearch>
    <Operation>
        <SearchFields> <State>Open</State>  </SearchFields>
        <RankBy>NumTasks</RankBy>
    </Operation>
</TaskSearch>
```

*FIG. 2E*

Example Available Task Response

```
   <TaskTypeSearchResponse>
     <TaskGroups>
       <TaskGroup>
3        <TaskType>  <Name>ImageChoice</Name>   </TaskType>
         <NumTasks>400</NumTasks>
       </TaskGroup>
6      <TaskGroup>
         <TaskType>  <Name>French-EnglishTranslation</Name>   </TaskType>
         <NumTasks>80</NumTasks>
9      </TaskGroup>
     </TaskGroups>
12 </TaskTypeSearchResponse>
```

*FIG. 2F*

Example Available Task Performance Request

```
   <LockingTaskSearch>
     <ParticipantId>BestManBryan</ParticipantId>
     <Operation>
3      <NumToLock>1</NumToLock>
       <SearchFields>
         <TaskType>  <Name>ImageChoice</Name>   </TaskType>
6        <State>Open</State>
       </SearchFields>
       <RankBy>CreateDate</RankBy>
9    </Operation>
   </LockingTaskSearch>
```

*FIG. 2G*

Example Task

```xml
<?xml version="1.0" encoding="UTF-8" ?>
- <Question ="multi-choice">
    <Title>A sample multi-choice Task</Title>
    <Text>Which image best shows the XYZ Bank?</Text>
    - <Choices presentation="radio">
        - <Choice>
            <Media type="image/jpeg"
                width="250">imgs/00002405.jpg</Media>
            <Label>Image1</Label>
            <Text />
        </Choice>
        - <Choice>
            <Media type="image/jpeg"
                width="250">imgs/00002438.jpg</Media>
            <Label>Image2</Label>
            <Text />
        </Choice>
        - <Choice>
            <Media type="image/jpeg"
                width="250">imgs/00002458.jpg</Media>
            <Label>Image3</Label>
            <Text />
        </Choice>
        - <Choice>
            <Media type="image/jpeg"
                width="250">imgs/00003319.jpg</Media>
            <Label>Image4</Label>
            <Text />
        </Choice>
        - <Choice>
            <Media type="image/jpeg"
                width="250">imgs/00003354.jpg</Media>
            <Label>Image5</Label>
            <Text />
        </Choice>
    </Choices>
</Question>
```

*FIG. 12A*

Example Task Validation Processing Information

```xml
<?xml version="1.0" encoding="UTF-8"?>
<xs:schema xmlns:xs="http://www.w3.org/2001/XMLSchema"
    xmlns:tns="http://xml.abcd.com/tasktype/multichoice"
    targetNamespace="http://xml.abcd.com/tasktype/multichoice"
    elementFormDefault="qualified">
    <xs:complexType name="MediaType">
        <xs:simpleContent>  <xs:extension base="xs:anyURI">
            <xs:attribute name="type" type="xs:string" use="required"/>
            <xs:attribute name="height" type="xs:positiveInteger" use="optional"/>
            <xs:attribute name="width" type="xs:positiveInteger" use="optional"/>
        </xs:extension>  </xs:simpleContent>  </xs:complexType>
    <xs:complexType name="ChoiceType">
        <xs:sequence>
            <xs:element name="Media" type="tns:MediaType"/>
            <xs:element name="Label" type="xs:Name"/>
            <xs:element name="Text" type="xs:string" minOccurs="0"/>
        </xs:sequence>  </xs:complexType>
    <xs:simpleType name="PresentationAttr">
        <xs:restriction base="xs:string">
            <xs:enumeration value="dropdown"/>  <xs:enumeration value="radio"/>
            <xs:enumeration value="checkbox"/>
        </xs:restriction>  </xs:simpleType>
    <xs:complexType name="ChoicesType">
        <xs:sequence>
            <xs:element name="Choice" type="tns:ChoiceType" maxOccurs="unbounded"/>
        </xs:sequence>
        <xs:attribute name="presentation" type="tns:PresentationAttr" default="radio"/>
        <xs:attribute name="default" type="xs:Name" use="optional"/>
    </xs:complexType>
    <xs:element name="Question">
        <xs:complexType>  <xs:sequence>
            <xs:element name="Title" type="xs:string"/>
            <xs:element name="Text" type="xs:string"/>
            <xs:element name="Choices" type="tns:ChoicesType"/>
        </xs:sequence>  </xs:complexType>  </xs:element>
    <xs:element name="Answer">
        <xs:complexType> <xs:sequence>
            <xs:element name="Label" type="xs:Name" maxOccurs="unbounded" minOccurs="0"/>
        </xs:sequence>  </xs:complexType>  </xs:element>
</xs:schema>
```

FIG. 12B

Example Task Information Manipulation Processing Information

```
<?xml version="1.0" encoding="UTF-8" ?>
- <xsl:stylesheet xmlns:xsl="http://www.w3.org/1999/XSL/Transform"
      version="1.0">
    <xsl:output method="html" />
    <xsl:param name="postAction" />
    <xsl:param name="assignmentId" />
  - <xsl:template match="/Question">
    - <html>
      - <head>
        - <title>
            <xsl:value-of select="Title" />
          </title>
        </head>
      - <body>
        - <h1>
            <xsl:value-of select="Title" />
          </h1>
        - <p>
            <xsl:value-of select="Text" />
          </p>
          <xsl:apply-templates select="Choices" />
        </body>
      </html>
    </xsl:template>
  - <xsl:template match="Choices">
    - <xsl:choose>
      - <xsl:when test="@presentation='radio'">
        - <form action="{$postAction}" method="post">
            <input type="hidden" name="id"
              value="{$assignmentId}" />
          - <table>
            - <tr>
                <th>Choice</th>
                <th>Subject</th>
              </tr>
            - <xsl:for-each select="Choice">
              - <tr>
                - <td>
                  - <input>
                    - <xsl:attribute name="type">
```

*FIG. 12C*

Example Task Information Manipulation Processing Information *(continued)*

```
                        <xsl:text>radio</xsl:text
                            >
                        </xsl:attribute>
                      - <xsl:attribute
                            name="name">

<xsl:text>choice</x
                                sl:text>
                        </xsl:attribute>
                      - <xsl:attribute
                            name="value">
                            <xsl:value-of
                                select="Label" />
                        </xsl:attribute>
                      </Input>
                    </td>
                  - <td>
                      <xsl:apply-templates select="."
                          />
                    </td>
                  </tr>
                </xsl:for-each>
              - <tr>
                - <td>
                    <input type="submit" />
                  </td>
                </tr>
              </table>
            </form>
          </xsl:when>
        - <xsl:when test="@presentation='dropdown'">
          - <form action="{$postAction}" method="post">
              <input type="hidden" name="Id"
                  value="{$assignmentId}" />
            - <table>
              - <tr>
                - <td>
                  - <select name="choice">
                    - <xsl:for-each select="Choice">
                      - <option>
                        - <xsl:attribute
                              name="Label">
                            <xsl:value-of
                                select="Text" />
                          </xsl:attribute>
```

*FIG. 12D*

Example Task Information Manipulation Processing Information *(continued)*

```xml
                    - <xsl:attribute
                          name="value">
                        <xsl:value-of
                            select="Label"
                            />
                      </xsl:attribute>
                    </option>
                  </xsl:for-each>
                </select>
              </td>
            - <xsl:for-each select="Choice">
              - <td>
                  <xsl:apply-templates select="."
                      />
                </td>
              </xsl:for-each>
            </tr>
          </table>
        </form>
      </xsl:when>
    - <xsl:when test="@presentation='checkbox'">
      - <form action="{$postAction}" method="post">
          <input type="hidden" name="id"
              value="{$assignmentId}" />
        - <table>
          - <tr>
              <th>Choice</th>
              <th>Subject</th>
            </tr>
          - <xsl:for-each select="Choice">
            - <tr>
              - <td>
                - <input>
                  - <xsl:attribute name="type">
                      <xsl:text>checkbox
                      </xsl:text>
                    </xsl:attribute>
                  - <xsl:attribute
                        name="name">
                      <xsl:text>choice</x
                      sl:text>
                    </xsl:attribute>
```

*FIG. 12E*

Example Task Information Manipulation Processing Information *(continued)*

```xml
            - <xsl:attribute
                  name="value">
                <xsl:value-of
                    select="Label" />
              </xsl:attribute>
            </Input>
          </td>
          - <td>
              <xsl:apply-templates select="."
                  />
            </td>
          </tr>
        </xsl:for-each>
      </table>
     </form>
    </xsl:when>
   </xsl:choose>
  </xsl:template>
- <xsl:template match="Choice">
    <xsl:apply-templates select="Media" />
  - <xsl:if test="Text">
      <br />
      <xsl:value-of select="Text" />
    </xsl:if>
  </xsl:template>
- <xsl:template match="Media">
  - <xsl:choose>
    - <xsl:when test="substring-before(@type, '/')='image'">
      - <img>
        - <xsl:attribute name="src">
            <xsl:value-of select="." />
          </xsl:attribute>
        - <xsl:if test="@height">
          - <xsl:attribute name="height">
              <xsl:value-of select="@height" />
            </xsl:attribute>
          </xsl:if>
        - <xsl:if test="@width">
          - <xsl:attribute name="width">
              <xsl:value-of select="@width" />
            </xsl:attribute>
          </xsl:if>
        </img>
      </xsl:when>
```

*FIG. 12F*

Example Task Information Manipulation Processing Information *(continued)*

```
            - <xsl:otherwise>
              - <object>
                - <xsl:attribute name="data">
                    <xsl:value-of select="." />
5                 </xsl:attribute>
                - <xsl:attribute name="type">
                    <xsl:value-of select="@type" />
                  </xsl:attribute>
                - <xsl:if test="@height">
10                - <xsl:attribute name="height">
                      <xsl:value-of select="@height" />
                    </xsl:attribute>
                  </xsl:if>
                - <xsl:if test="@width">
15                - <xsl:attribute name="width">
                      <xsl:value-of select="@width" />
                    </xsl:attribute>
                  </xsl:if>
              </object>
20          </xsl:otherwise>
          </xsl:choose>
        </xsl:template>
      </xsl:stylesheet>
```

*FIG. 12G*

Example Presentation Of Task

Which image best shows the XYZ Bank? *1225*

| Choice | Subject | |
|---|---|---|
| ○ *1215a* | Image 1 | } *1205a* |
| ○ *1215b* | Image 2 | } *1205b* |
| ○ *1215c* | Image 3 | } *1205c* |
| ◉ *1215d* | Image 4 | } *1205d* |
| ○ *1215e* | Image 5 | } *1205e* |

*1220*

Example Task Results Manipulation Processing Information

```
    <?xml version="1.0" encoding="UTF-8" ?>
    <xsl:stylesheet xmlns:xsl="http://www.w3.org/1999/XSL/Transform"
        version="1.0">
      <xsl:output method="xml" />
5     <xsl:template match="/CGIData">
        <Answer>
          <xsl:for-each select="Parameter">
            <xsl:if test="@name='choice'">
              <Label>
10              <xsl:value-of select="@value" />
              </Label>
            </xsl:if>
          </xsl:for-each>
        </Answer>
15    </xsl:template>
    </xsl:stylesheet>
```

*FIG. 12I*

Example Manipulated Task Results Provided to Task Requester

```
<?xml version="1.0" encoding="UTF-8" ?>
- <Answer>
    <Label>Image4</Label>
  </Answer
```

*FIG. 12J*

| Qualification Name | Overall Rating | Usefulness | Performance | Popularity | ... |
|---|---|---|---|---|---|
| AAA Java Programming Certificate | ** | * | * | ** | |
| BBB Advanced Java Qualification | *** | **** | *** | *** | |
| Java Joe's Master Coffee Brewer | **** | *** | ****** | ** | |
| PPP Java Level 2 Certification | ***** | ****** | ***** | **** | |
| ... | | | | | |

FIG. 15A

| Qualification Name | Total Number of Tasks | Current Number of Tasks | Percentage Acceptance Rate | Average Completion Time | ... |
|---|---|---|---|---|---|
| AAA Java Programming Certificate | 2452 | 345 | 32% | 185 minutes | |
| BBB Advanced Java Qualification | 56673 | 589 | 85% | 120 minutes | |
| Java Joe's Master Coffee Brewer | 53321 | 876 | 94% | 150 minutes | |
| PPP Java Level 2 Certification | 60875 | 657 | 91% | 75 minutes | |
| ... | | | | | |

| Qualification Name | Total Number of Performers | Percentage Acceptance Rate | Average Task Completion Time | Task Throughput (Tasks/Day) | ... |
|---|---|---|---|---|---|
| AAA Java Programming Certificate | 5470 | 27% | 175 minutes | 5.8 | |
| BBB Advanced Java Qualification | 452 | 87% | 140 minutes | 7.5 | |
| Java Joe's Master Coffee Brewer | 673 | 83% | 160 minutes | 8.5 | |
| PPP Java Level 2 Certification | 360 | 95% | 65 minutes | 10.2 | |
| ... | | | | | |

FIG. 15D

| Qualification Name | Average Usefulness Rating | Category | Number of Reviews | Read Reviews | ... |
|---|---|---|---|---|---|
| AAA Java Programming Certificate | * | Java programming | 62 | [click here] | |
| BBB Advanced Java Qualification | **** | Java Programming | 55 | [click here] | |
| Java Joe's Master Coffee Brewer | *** | Coffee Brewing | 47 | [click here] | |
| PPP Java Level 2 Certification | ***** | Java Programming | 97 | [click here] | |
| ... | | | | | |

| Qualification Issuer Name | Overall Rating | Usefulness | Performance | Popularity | ... |
|---|---|---|---|---|---|
| AAA Certificate House | ** | * | * | * | |
| BBB Testing Service | **** | **** | *** | *** | |
| Joe's Coffee Institute | **** | *** | ***** | ** | |
| PPP Technical Training | ***** | ***** | ***** | **** | |
| ... | | | | | |

FIG. 15E

PPP Technical Training
  Overall Rating: ***** [Read Reviews]
  Number of tasks with qualifications from PPP:
  Number of performers with qualifications from PPP: 2315
  Number of task requesters requiring qualifications from PPP: 37
  In Business Since: 05/04/XX
  Contact Information: www.ppp-training.xzy

| Qualification Name | | Category | Overall Rating | Issued to Performers | Acceptance Rate | ... |
|---|---|---|---|---|---|---|
| PPP Advanced C++ Certificate | [reviews] | C++ Programming | ** | 238 | 75% | |
| PPP C# Guru Qualification | [reviews] | C# Programming | ***** | 487 | 93% | |
| PPP Java Level 1 Certification | [reviews] | Java Programming | *** | 549 | 86% | |
| PPP Java Level 2 Certification | [reviews] | Java Programming | ****** | 360 | 95% | |
| PPP WWW Wizard | [reviews] | Web Programming | **** | 681 | 89% | |
| ... | | | | | | |

FIG. 15F

AUTOMATICALLY GENERATING ASSESSMENTS OF QUALIFICATION RELEVANCE AND QUALIFICATION ISSUER CREDIBILITY

CROSS-REFERENCE TO RELATED APPLICATIONS

This application is a divisional application of co-pending U.S. patent application Ser. No. 11/395,831, filed Mar. 31, 2006 and entitled "Automatically Generating Assessments Of Qualification Relevance And Qualification Issuer Credibility," which is hereby incorporated herein by reference. U.S. patent application Ser. No. 11/395,831 is related to U.S. patent application Ser. No. 11/396,113, filed Mar. 31, 2006 and entitled "Using Qualifications Of Users To Limit Access To Available Tasks," which is hereby incorporated by reference in its entirety.

TECHNICAL FIELD

The following disclosure relates generally to generating assessments of relevance of qualifications and of credibility of qualification issuers, such as in an automatic manner and for use by users in an electronic marketplace that facilitates interactions between task requesters who have tasks that are available to be performed and task performers who are available to perform tasks.

BACKGROUND

The Internet comprises a vast number of computers and computer networks that are interconnected through communication links, with information being exchanged using various services such as electronic mail and the World Wide Web (also referred to as the "Web"). In addition to providing access to information, the Web has increasingly become a medium that is used to search for, shop for and order items (such as products, services and/or information) that are for purchase, rent, lease, license, trade, evaluation, sampling, subscription to, etc. In many circumstances, a user can visit the Web site of a Web merchant (or a "Web store") or otherwise interact with an online retailer or electronic marketplace that provides one or more items, such as to view information about the items, give an instruction to place an order for one or more items, and provide information needed to complete the purchase (e.g., payment and shipping information). The Web merchant then fulfills the order by providing the ordered items to the indicated recipient, such as by providing product items that have been ordered through physical distribution channels (e.g., shipment via a governmental postal service or private common carrier) or electronically (e.g., via download over the Internet, such as for digital music or videos) as appropriate. Ordered service items may similarly be provided electronically (e.g., providing email service) or physically (e.g., performing cleaning services at the purchaser's house).

In addition to such Web-based interactions between computers (e.g., interactions initiated by users using Web browser applications to interactively request Web pages from Web servers), various distributed computing systems are known in which multiple computer systems interact in other manners in order to achieve a goal. For example, it is often desirable for an application program on a computer system to interact with remote systems and applications in order to obtain various types of information and functionality that are not part of the application program. By performing such interactions, an application program may be able to leverage information and functionality from vast numbers of other computer systems over the Internet or other networks. In order to enable such interactions between remote computer systems and application programs, various programmatic interaction mechanisms have been developed. For example, remote procedure call ("RPC") protocols have long existed that allow a program on one computer to cause a program on another computer to be executed, and various object-oriented and other architectures such as CORBA ("Common Object Request Broker Architecture"), Java RMI ("Remote Method Invocation"), JavaSpaces, Jini, JXTA, and UPnP ("Universal Plug and Play") and DCOM ("Distributed Component Object Model") provide similar capabilities. In addition, a variety of middleware programs have been implemented to connect separate applications (often of distinct types and from unrelated sources) to allow communication. For example, various EDI ("Electronic Data Interchange") networks exist that provide standard mechanisms to allow a computer system of one user of the network to send data to a computer system of another user of the network.

The widespread popularity of the Web has also provided additional opportunities for computers to inter-communicate in various programmatic manners. For example, there is growing use of the Web to provide so-called "Web services," which typically involve the programmatic interaction of remote applications to exchange information via defined APIs ("application program interfaces"), or the like. Web services may allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

Unfortunately, while Web services and other programmatic interaction mechanisms allow various application programs and computers to interact, such interactions are typically limited in various ways. For example, the types of information and functionality that are available to be requested using such programmatic interactions are typically restricted to very limited types of requests that the remote computer systems and applications can automatically fulfill (e.g., to provide a specified predefined group of information, such as a Web page or file, or to perform a specified database query on a specified database). Moreover, there is a very large class of tasks which computers and application programs cannot easily automatically perform, but which humans can typically easily perform, referred to herein as "human performance tasks." This is due at least in part to various cognitive and other mental capabilities of humans that are not easily encoded in automated programs, such as the ability to use human judgment to form opinions, to perform abstract or common-sense reasoning, to perform various discernment and perception tasks (e.g., visual and aural pattern recognition, such as based on experience), to use cultural awareness and emotional intelligence, and to perform various other everyday yet highly complex kinds of perception, cognition, reasoning and thinking.

However, existing settings that allow parties to make tasks available for performance by human users also result in various problems. One example of a problem that arises in the context of human performance of tasks is that of controlling access of users to the tasks available for performance. Parties that provide tasks for performance by others may have various reasons for desiring to limit some users' access to information about the tasks in question, such as to limit information that is available to potential competitors about those tasks (e.g., the number, kind, and other details of the tasks that the party is making available for performance), but it is typically difficult to do so in such settings. In addition, a provider of tasks may wish to limit information about the tasks to only a selected group of users who may perform the tasks, such as to create a private network of such users who are approved to perform the tasks, but this is also not typically possible in such settings.

Another example of a problem that arises in the context of human performance of tasks is assessing the qualifications of users to perform particular tasks. In particular, a party that provides tasks to be performed may desire that the users who perform those tasks possess particular qualifications, such as to desire that users who perform tasks involving translations from English to Spanish be fluent in both languages. While a user available to perform such tasks may assert that he/she is sufficiently qualified due to a particular achievement (e.g., a certification, degree, or other qualification from a known language school), the provider of the tasks may have difficulty in assessing how the asserted achievement will affect actual performance of such tasks (e.g., due to questions about the actual skills that correspond to the achievement, to questions about how the achievement compares to other known achievements, to questions about the reliability of the party who provided the achievement to the user or otherwise certified the achievement, etc.), as well as about the authenticity of the achievement.

BRIEF DESCRIPTION OF THE DRAWINGS

FIGS. 2A-2G illustrate examples of programmatic messages used to interact with an example embodiment of the described electronic marketplace.

FIGS. 12A-12J illustrate examples of using multiple types of user interaction processing to control performance of a task by a task performer in an example embodiment of the described electronic marketplace.

FIGS. 15A-15F illustrate examples of use of various assessment information.

DETAILED DESCRIPTION

Figure 1A:
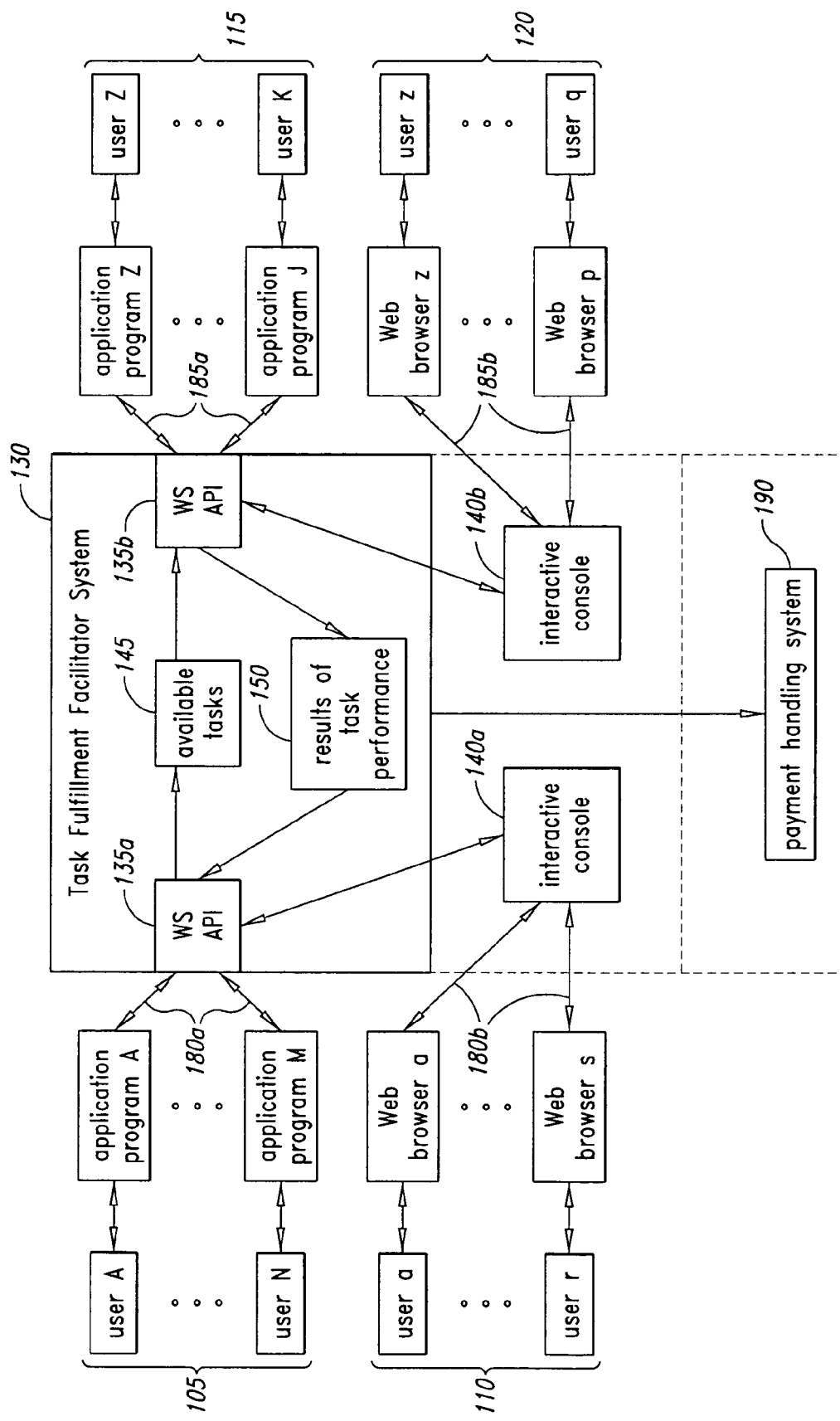
FIG. 1A is a network diagram illustrating interactions and information flow for an example embodiment of the described electronic marketplace for human performance tasks.

A software facility is described that facilitates interactions between task requesters who have tasks that are available to be performed and task performers who are available to perform tasks. In at least some embodiments, the tasks to be performed are cognitive human performance tasks that use cognitive and other mental skills of human task performers, such as to employ judgment, perception and/or reasoning skills of the human task performers. In addition, in at least some embodiments an intermediary electronic marketplace is provided that allows task requester users and task performer users to programmatically and/or interactively engage in task-related transactions and to perform various other activities related to performance of tasks.

In particular, in some embodiments one or more computing systems providing the electronic marketplace act as an intermediary to allow task requesters to programmatically request (e.g., via programmatic invocations of one or more APIs of the electronic marketplace by application programs of the task requesters) that tasks be performed by human task performers and to receive corresponding results after the tasks are performed (e.g., as responses to the programmatic invocations), thus providing a form of artificial artificial intelligence to task requesters application programs. Similarly, human task performers can access the electronic marketplace (e.g., in a programmatic or interactive manner) to obtain information about available tasks that they can perform and to provide the results of task performance after the completion of tasks that they are assigned. By enabling large numbers of unaffiliated or otherwise unrelated task requesters and task performers to interact via the intermediary electronic marketplace in this manner, free-market mechanisms mediated by the Internet or other public computer networks can be used to programmatically harness the collective intelligence of an ensemble of unrelated human task performers.

The electronic marketplace further performs a variety of additional activities to facilitate the performance of tasks. For example, the electronic marketplace may track the progression of the tasks through various states (e.g., an "open" state for tasks that are available to be performed, an "assigned" state for each assignment of a task to one or more task performers, a "completed" state for an assignment after the task performer provides the results of performance of the task, etc.), and may further take various actions corresponding to the tasks. In addition, in some embodiments a task requester user may impose various criteria regarding performance of a task (e.g., required and/or preferred qualifications for task performers, time limits for task completion, etc.) and/or may specify various actions associated with task performance (e.g., payment of a specified fee under specified conditions), and if so the electronic marketplace may enforce those criteria and initiate those actions as appropriate for the task. Similarly, task performer users may specify various actions related to tasks, such as to request that information about available tasks and/or about other users be provided in various ways (e.g., to be notified when specified types of tasks become available), and if so the electronic marketplace may similarly initiate those actions as appropriate.

In some embodiments, the electronic marketplace further provides a variety of types of functionality related to obtaining and using information about qualifications and other attributes of task performer users and/or task requester users, such as to allow users to identify and/or specify types of users with whom to conduct transactions. For example, the electronic marketplace may track various information about activities by task performer users and/or task requester users in some embodiments, such as to automatically generate quantitative measurements of actions taken by the users that may be used as qualifications (e.g., activities related to prior task performance). More generally, in some embodiments the electronic marketplace may support user qualifications of various types (e.g., qualifications for a user that are asserted by that user, that are specified by one or more other users, and/or that are automatically generated by the electronic marketplace).

For example, in some embodiments the electronic marketplace may provide support for private qualifications of users and tasks, such as to allow use of the private qualifications to control access to information about tasks. In such embodiments, a particular private qualification may be associated with a task, and users without that particular private qualification may be restricted in their ability to obtain information regarding the task, such as to prevent such users from obtaining any information about the existence of the task and/or about details regarding the task. When used in such a manner, such private qualifications enable the creation of private networks of task requester users and task performer users, such as if a task requester associates one or more unique private qualifications (e.g., qualifications defined by the task requester) with their tasks and with potential task performer users selected by the task requester, and with information about the tasks and about those private qualifications of those task performer users being withheld from users who do not possess the appropriate private qualification. Thus, when private qualifications are used to restrict information about the existence of tasks having that private qualification, some or all task performers may not even be aware of the existence of the private qualification, such as if users lacking those private qualifications are restricted from obtaining any information regarding the private qualification (e.g., to prevent potential gaming of the system by such users attempting to falsely assert such private qualifications for themselves), and/or if the users having those private qualifications are unaware of them (e.g., if the assignment of private qualifications to a task performer by task requesters is transparent to the task performer). In addition, in some embodiments the use of private qualifications may further be configurable by task requester users or others, such as to allow additional control over how much information about users and/or tasks having the private qualifications is made available to users and/or to allow additional control over which users are given access to such information (e.g., so that a user without a private qualification may obtain the name of a task with which the private qualification is associated but not the identity of the task requester, or so that a user having an associated private qualification may be allowed to obtain the name of the qualification but not the issuer). Additional details regarding such private qualifications are included below.

In addition, in some embodiments the electronic marketplace may provide a variety of types of functionality for evaluating and otherwise assessing the relevance of qualifications for use with tasks to be performed and/or for use by task performers, as well as for assessing the credibility of the issuers of qualifications. For example, in at least some embodiments the electronic marketplace may automatically collect and analyze a variety of data regarding the use of qualifications by task performers, task requesters and qualification issuers in order to generate information that may be used by users when assessing qualification relevance and/or qualification issuer credibility. In addition, the electronic marketplace may in at least some embodiments collect and organize a variety of information provided by human evaluators (e.g., evaluations, recommendations, reviews, etc.) that may be used by users when assessing qualification relevance and/or qualification issuer credibility. Additional details regarding such assessment of relevance of qualifications and credibility of qualification issues are included below.

Furthermore, in some embodiments the electronic marketplace provides functionality to authenticate or otherwise corroborate information about users (e.g., users' qualifications, identities, non-qualification attributes, etc.), such as based on obtained evidence that supports that information, and may then use such corroborated information in various ways. Functionality provided by the electronic marketplace related to qualifications and corroboration of user information is discussed in greater detail below.

Interactions between the electronic marketplace and users of the marketplace can occur in a variety of ways. As previously noted, in some embodiments task requesters interact with the electronic marketplace in a programmatic manner, such as by invoking defined APIs of the marketplace (e.g., APIs based on Web services provided by the electronic marketplace) to send messages that request or supply information. The defined APIs may allow the task requesters to not only submit tasks that are available to be performed, but also to perform various other actions with respect to previously submitted tasks (e.g., check on the status of pending tasks, modify information about pending tasks, submit instructions regarding handling of pending tasks, and interactively obtain results for completed tasks). In addition, the defined APIs may allow task requesters to further perform various other types of interactions with the electronic marketplace, such as searching for and/or browsing for information of interest (e.g., to identify available task performers having specified qualifications or attributes, or to identify information about tasks submitted by other task requesters), supplying qualification information for themselves and/or for task performers, etc. In addition, while in some embodiments all communications between task requesters and task performers occur via the electronic marketplace, in other embodiments at least some communications may occur directly between a task requester and a task performer (e.g., to allow a task performer to obtain information from a task requester regarding a task to be performed, to allow a task performer to provide task results information to a task requester for a task that has been performed, etc.) or more generally between any two or more users, such as after the electronic marketplace facilitates that direct communication (e.g., by providing appropriate contact or other communication-related information to at least one of the parties to the communication).

In situations in which a final response is not immediately available to a programmatically supplied message (e.g., a final response that includes results from performing a task that is submitted with the message), the electronic marketplace may in some embodiments provide an immediate response that acknowledges receipt of the message (e.g., by providing a unique task identifier for a task being submitted), and may later provide one or more additional related electronic communications (e.g., to provide the results from performing a task to the task requester who submitted the task). Such additional electronic communications can be performed in a variety of ways, such as by initiating a new electronic message (e.g., email, instant messaging, etc.), by using a callback mechanism supplied along with the original message, etc.

In at least some embodiments, the electronic marketplace may also provide an interactive console that allows task requesters to interactively perform some or all of the various types of actions previously noted, whether instead of or in addition to a programmatic interface that is provided for those actions. For example, in some embodiments the interactive console functionality may be accessed by a task requester user via a Web browser that interacts with a Web server for the electronic marketplace (e.g., by supplying appropriate information in a form on a Web page from the electronic marketplace).

In a similar manner, task performer users may interact with the electronic marketplace in a variety of ways in order to identify available tasks of interest and to perform such tasks, whether in a programmatic and/or interactive manner. More generally, task performer users may similarly perform a variety of types of actions with respect to the electronic marketplace, including searching for and/or browsing for available tasks for which they are qualified, searching for and/or browsing for tasks from task requesters who have specified attributes, supplying qualification information, requesting assignments for available tasks of interest, supplying results from performance of tasks to which they have been assigned, requesting notifications of later-submitted tasks for which they are qualified, providing various types of preference information, etc. Additional details regarding specific types of interactions with the electronic marketplace by task requester and task performer users are discussed in greater detail elsewhere.

FIG. 1A provides a high-level overview of types of interactions by task performers and task requesters in one example embodiment. In particular, a Task Fulfillment Facilitator ("TFF") system 130 is operating in this example embodiment to facilitate task-related interactions, such as by providing an electronic marketplace for cognitive human performance tasks and/or other types of human performance tasks. In this example embodiment, the TFF system provides an API 135 for programmatic interactions with users, and an interactive console interface 140 is also available for interactive communications. The TFF system may be implemented in various ways in various embodiments, such as a software system executing on one or more computing systems or devices (e.g., in a distributed manner, such as on a peer-to-peer or grid network).

In particular, in this example a variety of human task requester users 105 are each interacting with one or more application programs to request that tasks be performed by registering or otherwise submitting the tasks to the TFF system, as well as to perform various other interactions with the TFF system. To submit the tasks or perform other interactions, the application programs each programmatically invoke 180*a* one or more Web services ("WSes") that are part of TFF system's API 135*a* in this example embodiment. As discussed in greater detail elsewhere, each of the task requests may include a variety of information about the task to be performed, including one or more qualifications needed by any human task performer who performs the tasks, one or more other criteria related to task performance (e.g., deadlines for completion and requirements for the format of results from the task performance), and one or more associated fees to be provided to the human task performers who successfully perform the task.

Similarly, in the illustrated embodiment other task requester users 110 submit available tasks and perform other interactions with the TFF system in an interactive manner via Web browser programs that communicate 180*b* information supplied by the users to an interactive console 140*a*, with the console then interacting with the API 135*a* of the TFF system in a manner similar to that of the interactions 180*a* by the application programs. In the illustrated embodiment, the console is provided as part of the TFF system (whether on the same or different computing systems used for other parts of the TFF system), such as based on one or more Web pages provided by a Web server of the TFF system. In other embodiments, however, one or more such consoles or other mechanisms to interact with the TFF system may instead by provided externally to the TFF system, such as by third parties (whether instead of or in addition to any console(s) provided by the TFF system). After receiving the information for the available tasks being submitted via the API 135*a*, the TFF system stores information 145 about the available tasks for use by task performers. While not illustrated here, some task requester users may be part of both group 105 and group 110 by interacting with the TFF system in both programmatic and interactive manners, such as at different times and/or for different purposes.

FIG. 1A also illustrates various human task performer users who interact with the electronic marketplace to perform available tasks. In particular, in this example various task performer users 120 each interact with a Web browser program that communicates 185*b* with an interactive console 140*b* of the TFF system, such as to identify tasks that are currently available for which they are qualified and to provide information about results of performance of tasks to which they have been assigned. As with console 140*a*, console 140*b* then interacts with an API 135*b* of the TFF system to provide information supplied by the task performer users to the TFF system. In this illustrated embodiment, other task performer users 115 instead directly interact programmatically with the TFF system via API 135*b* in order to perform activities related to task performance, such as by each using one or more application programs that programmatically invoke 185*a* appropriate Web services that are part of the API 135*b*. While illustrated separately in this example, consoles 140*a* and 140*b* may in some embodiments be part of a single console provided by the TFF system, and the APIs 135*a* and 135*b* of the TFF system may similarly each be portions of a single API 135 for the system. In addition, while not illustrated here, some task performer users may be part of both group 115 and group 120 by interacting with the TFF system in both programmatic and interactive manners, such as at different times and/or for different purposes. In addition, some users may serve as both task requesters and task performers, such as for different tasks.

Based on the interactions with the human task performers, the TFF system tracks information about the current status of tasks, such as by updating information 145 about available tasks, and stores results 150 from the performance of tasks that are received via interface 135*b*. After a task is performed and corresponding results are received, the TFF system can notify the task requester that supplied that task of the results in a variety of ways. For example, in some embodiments the results are provided to task requesters via the interactive console 140a when the task requesters next interact with the console. Alternatively, task performance results may instead be electronically sent to the task requesters via the API 135a as a response to a prior invocation, or may instead be sent to task requesters in any other way that provides the information to the task requesters in a timely manner (e.g., via email, telephone, fax, postal mail, etc.).

In addition, the TFF system in the illustrated embodiment facilitates the exchange of payments between parties to transactions involving tasks, such as between task requesters and task performers (e.g., to provide payments to the task performers from the task requesters for satisfactory performance of submitted tasks, such as in accordance with current task prices for those tasks). In the illustrated embodiment, the TFF system may include internal payment handling capabilities, such as via a payment handling system 190, although in other embodiments the TFF system may instead interact with an external payment handling system (whether from the same organization that provides the TFF system or instead from a third party) to provide the payments. In some situations, task performance payments may be made automatically after a task is performed (e.g., after automated verification is performed by the TFF system on received task results to ensure that any criteria for the task have been met), while in other situations the payments may instead be made only after the task requester has reviewed and accepted the results (or failed to reject the results after a specified period of time). In addition, as described in greater detail elsewhere, a variety of other types of payments may be made in other situations, such as payments from task performers, payments to or from the TFF system (e.g., for services provided by the system), and/or payments to or from one or more third parties.

Moreover, a variety of types of non-monetary compensation (e.g., for performance of tasks) and other non-monetary rewards may also be used in other embodiments, whether provided by task requesters (e.g., for performance of submitted tasks), task performers (e.g., for the opportunity to perform tasks), the TFF system (e.g., for specified types of user activities), and/or third parties to transactions related to task performance. In particular, in some embodiments compensation to one or more task performers for performance of one or more tasks may include credit and/or discounts for use at one or more online retailers (e.g., a Web merchant affiliated with the TFF system), such as to allow those task performers to purchase and/or rent goods and services for themselves and/or for others as gifts. In addition, in some embodiments such compensation and/or information about such compensation (e.g., a promise to provide such compensation at a future time when specified conditions are satisfied) may also be provided immediately or substantially immediately to a task performer or other recipient of the compensation, such as to allow the recipient to immediately use the compensation for a retail transaction. In other situations, a reward for performance of a task may include recognition of the task performer (e.g., by display information about specified activities of the task performer and/or a ranking of the task performer relative to other task performers), such as a task performed for a task requester that is a charity or that otherwise benefits a charitable cause or other beneficial entity or activity.

Figure 1B:
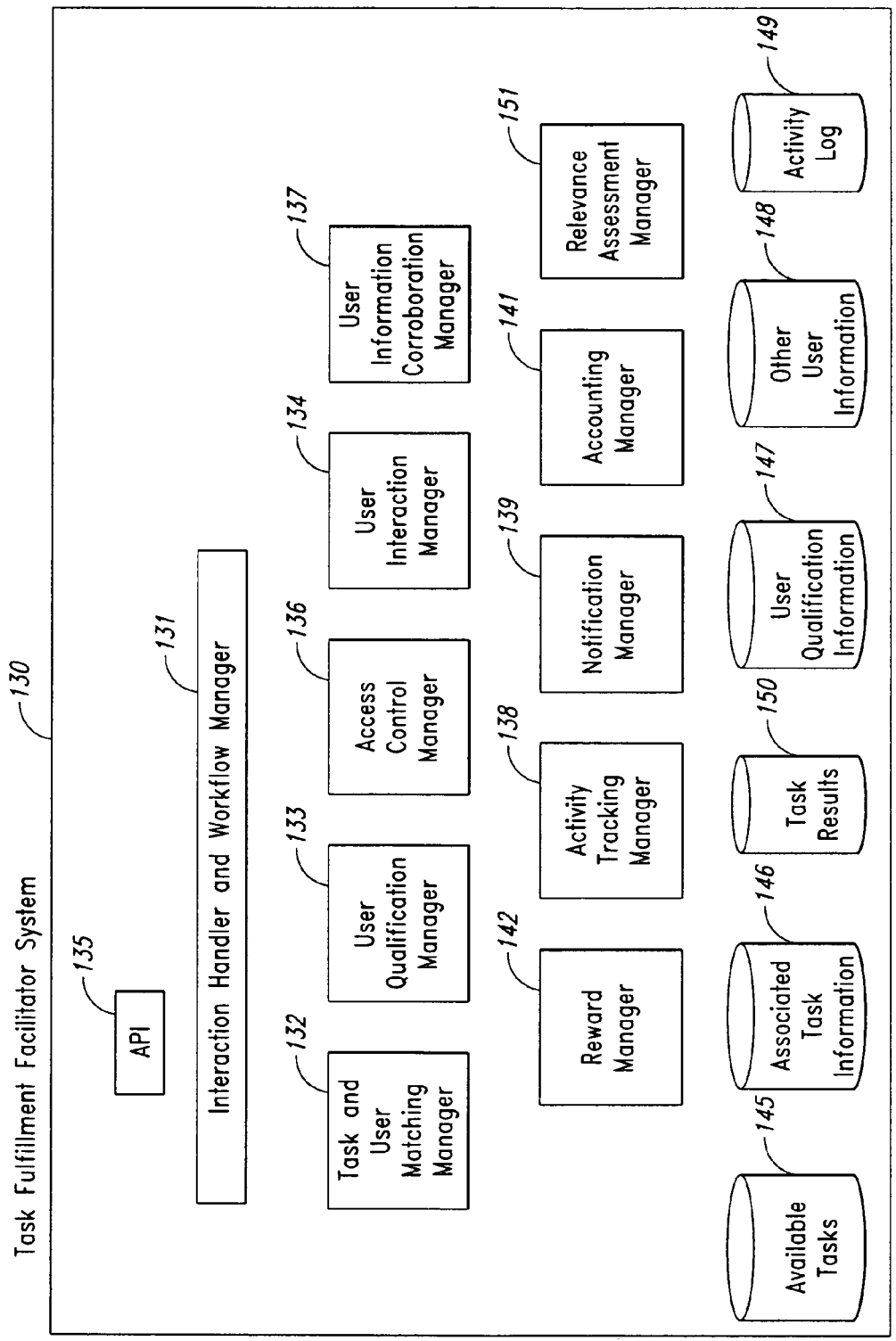
FIG. 1B is a block diagram illustrating an example embodiment of a system for providing the described electronic marketplace.

FIG. 1B illustrates examples of various types of modules and functionality for one example embodiment of the TFF system 130. In particular, the illustrated embodiment of the TFF system includes a module 131 that receives requests and information from users via the API 135 of the TFF system, and handles the requests and information as appropriate (e.g., by implementing business logic and/or workflow processing for a specific embodiment, or by providing or otherwise producing requested information, such as to produce information related to tasks to be performed and/or related to results of task performance). For example, as tasks are submitted by task requesters via the API, the module 131 stores information about the available tasks in a database 145, and further stores any additional associated information for the tasks (e.g., information to be analyzed or manipulated as part of a task) in a database 146. Information about available tasks may then be provided to users by the module 131 via the API, such as in response to requests from task performers and/or task requesters that are received via the API (e.g., requests to access information about a specified task, or to search or browse for various tasks). In addition, when task performers provide results from performance of tasks via the API, the module 131 stores the task results information in a database 150, and may further provide information about the results to users (e.g., the task requesters that submitted the tasks) as appropriate via the API.

The module 131 may also provide a variety of types of functionality other than exchanging task and task result information with users. For example, the module 131 may receive various types of information about users via the API (e.g., evidence of a user's identity, qualification information for users, payment source and/or repository information for a user, demographic information, user preferences, etc.), such as when users initially register with the TFF system to act as task performers and/or task requesters. In the illustrated embodiment, the module 131 then stores the user qualification information in database 147 and the other user information in database 148 (although in other embodiments the information may be stored in other ways), and may then provide such information to users when appropriate via the API, such as in response to search and/or browse requests. A variety of other types of information may also be available (e.g., information about users' accounts with the TFF system, aggregate information about groups of related users or all users, information about historical activities of specific users and/or groups of users, summary and overview information about tasks that have been performed, etc.), and if so the module 131 may similarly provide such information to users when appropriate via the API.

In the illustrated embodiment, the TFF system further includes various additional modules that provide additional types of functionality, such as to assist the module 131, although in other embodiments some or all of the additional modules and/or additional types of functionality may not be included, or may be combined together in different manners. As one example, the illustrated embodiment of the TFF system includes an Access Control Manager module 136 to assist in controlling access to various functionality and stored information, such as based on specific access policies specified by users for specific pieces of information and/or based on default policies of the TFF system. In particular, after a user's identity and/or other relevant information is determined (whether by the Access Control Manager module, module 131, or other entity such as an external system affiliated with the TFF system or provided by a third party), the Access Control Manager module may assist in determining whether the user is allowed to access TFF system information based on that determined user information, with the module 131 providing information to users only when they are authorized to receive it. Access control information can be specified for various types of information in various ways, such as for information about users (e.g., as specified by those users), tasks (e.g., as specified by the task requesters that submitted the tasks), results of task performance (e.g., as specified by the task requesters that submitted the tasks and/or task performers that performed the tasks), etc. For example, in at least some embodiments access control may be determined based at least in part on private qualifications associated with users and/or tasks.

The illustrated embodiment of the TFF system also includes a User Interaction Manager module 134 to assist in managing at least some types of interactions with users. For example, in some embodiments task requesters and/or task performers may be allowed to specify preferences and/or requirements for how certain types of task-related interactions are to occur, such as to allow a task requester to specify how a submitted task is to be presented to a task performer and/or how results from the task performer are to be obtained. In embodiments in which the TFF system includes one or more consoles (not illustrated here) with which users interact during the task performance process, the User Interaction Manager module may further be included with or otherwise affiliated with one or more of the consoles to facilitate those user interactions with the consoles. In addition, while in the illustrated embodiment the User Interaction Manager module operates in conjunction with the module 131 to control particular types of interactions in a user-configurable manner, in other embodiments the module 131 may instead directly include some or all of the types of functionality provided by the User Interaction Manager module.

To facilitate the control of user interactions, the User Interaction Manager module in the illustrated embodiment provides various predefined Task Interaction Control ("TIC") types (not shown) that each include a combination of multiple types of processing related to task performance, and allows task requesters to specify a TIC type for use with each task that is submitted. When a task is later to be performed by a human task performer, the User Interaction Manager module then controls the interactions with the human task performer by performing the types of processing specified by the TIC type associated with the task. The types of user interaction processing may include, for example, manipulating information associated with a task in a specified manner before it is provided to a task performer (e.g., to format the information in a specified manner), providing the manipulated information to the task performer in a specified manner (e.g., by invoking an applet or other functionality on a computing system of the task performer that controls the display or other presentation of the manipulated task information to the task performer), obtaining results of task performance from the task performer in a specified manner (e.g., as input to a CGI ("Common Gateway Interface") program), and manipulating obtained task results before they are provided to the task requester (e.g., to format the information in a specified manner). Multiple predefined alternatives may be provided for each of the types of user interaction processing, and users may further be allowed to define new TIC types based on specified combinations of predefined alternatives and/or by using new processing information supplied by the users. Other information regarding management of task-related interactions with users is discussed in greater detail elsewhere.

The illustrated embodiment of the TFF system further includes a User Qualification Manager module 133 to assist in specifying qualifications of users, such as qualifications of task performer users related to performing tasks and/or qualifications of task requester users related to submitting available tasks and to handling results from performance of tasks. In particular, in the illustrated embodiment the User Qualification Manager module allows users to specify new qualification types, as well as to issue or assert specific qualifications of users of those qualification types (or of predefined qualification types in embodiments in which the TFF system provides them). The User Qualification Manager module may further in at least some embodiments assist in specifying new private qualification types, configuring access rights associated with private qualifications, and/or issuing or asserting specific private qualifications for tasks and users. Information about user-specified qualification types and specified user qualifications is then stored in the illustrated embodiment in database 147, and may be used by task requesters and/or task performers who have access to that information (e.g., to search for users having specified qualifications, to identify preferred or required qualifications for task performers who perform tasks, to identify preferred or required qualifications for task requesters who have submitted tasks, etc.). As discussed in greater detail elsewhere, in some embodiments the TFF system may further assist in specifying user qualifications based on numerical assessments of prior task-related activities by tracking information about the occurrences of such activities. Additional information regarding private qualifications, qualification types and qualifications is discussed in greater detail elsewhere.

The illustrated embodiment of the TFF system further includes a Relevance Assessment Manager module 151 to manage information related to the relevance of qualifications and the credibility of qualification issuers. In particular, in the illustrated embodiment the Relevance Assessment Manager module automatically tracks a variety of uses of qualifications relative to tasks, task performers, task requesters, and qualification issuers, and may generate various analyses and summaries based on the tracked information. In addition, in the illustrated embodiment the Relevance Assessment Manager module may further obtain various human-generated information related to qualifications and qualification issuers, such as reviews or other ratings from users, and similarly may generate various analyses and summaries based on the obtained information. Information obtained by and/or generated by the Relevance Assessment Manager module regarding the relevance of qualifications and credibility of qualification issuers may be stored in one or more of the illustrated databases (e.g., the Associated Task Information database 146, the User Qualification Information database 147, and/or the Other User Information database 148), and may be provided to users in various manners. For example, in some embodiments such information may be provided to interested users upon request (e.g., to task requester users who are determining what qualifications to use for their tasks, to task performer users who are determining possible qualifications to obtain for use in performing tasks in the future, to qualification issuers to assess their own qualifications and performance and that of other qualification issuers, etc.), and possibly in exchange for a fee. Other information regarding the assessment of the relevance of qualifications and the credibility of qualification issuers is discussed in greater detail elsewhere.

The illustrated embodiment of the TFF system also includes a User Information Corroboration Manager module 137 to assist in authenticating or otherwise corroborating information about users, such as identities of users, specified qualifications of users, and other types of attributes of users. In particular, in the illustrated embodiment the User Corroboration Manager module obtains various information that may serve as evidence for one or more pieces of information about users, such as from users that supply the evidence via the API to corroborate particular pieces of user information, and may then use that information for corroboration purposes in various ways. For example, in some embodiments corroborative information may be provided to users along with the information that it corroborates, such as to allow a recipient to evaluate the corroborative value of that information. Alternatively, in some embodiments and for some types of corroborative information, the Information Corroboration Manager module may automatically make an assessment of a degree and/or type of corroboration provided by the information. After a piece of user information has been sufficiently corroborated, it can be used in various ways, such as to provide indications to others about the degree or type of corroboration for the information, to limit some types of functionality to users who have sufficiently corroborated information (e.g., to require that task performers for a task have a sufficiently corroborated qualification, or to limit some types of access to information to users' whose identities have been sufficiently corroborated), etc. Other information regarding corroboration of user information is discussed in greater detail elsewhere.

A Task and User Matching Manager module 132 is also illustrated in the example embodiment of the TFF system to assist in matching available tasks to be performed and available task performers who can perform the tasks. The matching of tasks and task performers can be performed at various times and in various ways. For example, in some embodiments the matching may be performed in response to requests from task performer users for tasks that meet specified criteria, with the matching tasks provided to the task performer users as candidates that they can select to perform. Alternatively, in some embodiments the matching may be automatically performed for at least some types of tasks when the tasks are submitted, such as to assist in quickly identifying one or more task performers to perform the tasks. In addition, in some embodiments the matching may be performed by matching information about the tasks and the task performers, such as by identifying task performers having qualifications that meet or exceed any required qualifications specified for a task. Furthermore, in at least some embodiments, the Task and User Matching Manager module may also use information related to private qualifications when performing matching, such as by limiting matches between task performers and available tasks to those in which private qualifications assigned to at least one potential participant to a match (e.g., a task) are shared by the other one or more potential participants to the match (e.g., a potential task performer user). In other embodiments the Matching Manager module may use additional information (e.g., information about task requesters that submit tasks, preferences of task performers and/or task requesters, preferred but not required criteria specified for tasks, etc.) when performing matching and/or perform various additional activities related to matching. Other information regarding matching of tasks and task performers is discussed in greater detail elsewhere.

The illustrated embodiment of the TFF system further includes several other modules that provide additional types of functionality to assist operation of the system. For example, the illustrated embodiment includes an Activity Tracking Manager module 138 that tracks a variety of types of activities (e.g., each activity taken by a user with respect to a submitted task) and stores the tracked information in an activity log database 149. The Activity Tracking Manager module or other part of the system can then analyze the logged information to determine various types of aggregate or summary information (e.g., for specific users, groups of users, all users, types of tasks, groups of related tasks, etc.), and make that aggregate or summary information available to users as appropriate. The illustrated embodiment also includes a Notification Manager module 139 that provides notifications to users as appropriate, such as to notify task performers when new tasks that meet specified criteria become available, to notify task requesters when results of performance of their previously submitted tasks are available, etc. The notifications can be performed in various ways in various embodiments, such as via a console or programmatic interface of the TFF system, or via other electronic communication mechanisms (e.g., cellphone, email, instant messaging, etc.). The illustrated embodiment also includes a Reward Manager module 142 that tracks information about compensation and other rewards for users based on their activities, such as to maintain a financial repository for each user for use in providing or receiving monetary compensation. In addition, the illustrated embodiment includes an Accounting Manager module 141 to perform various administrative functions for the system, such as to obtain financial payments or other reward information from users.

Figure 3:
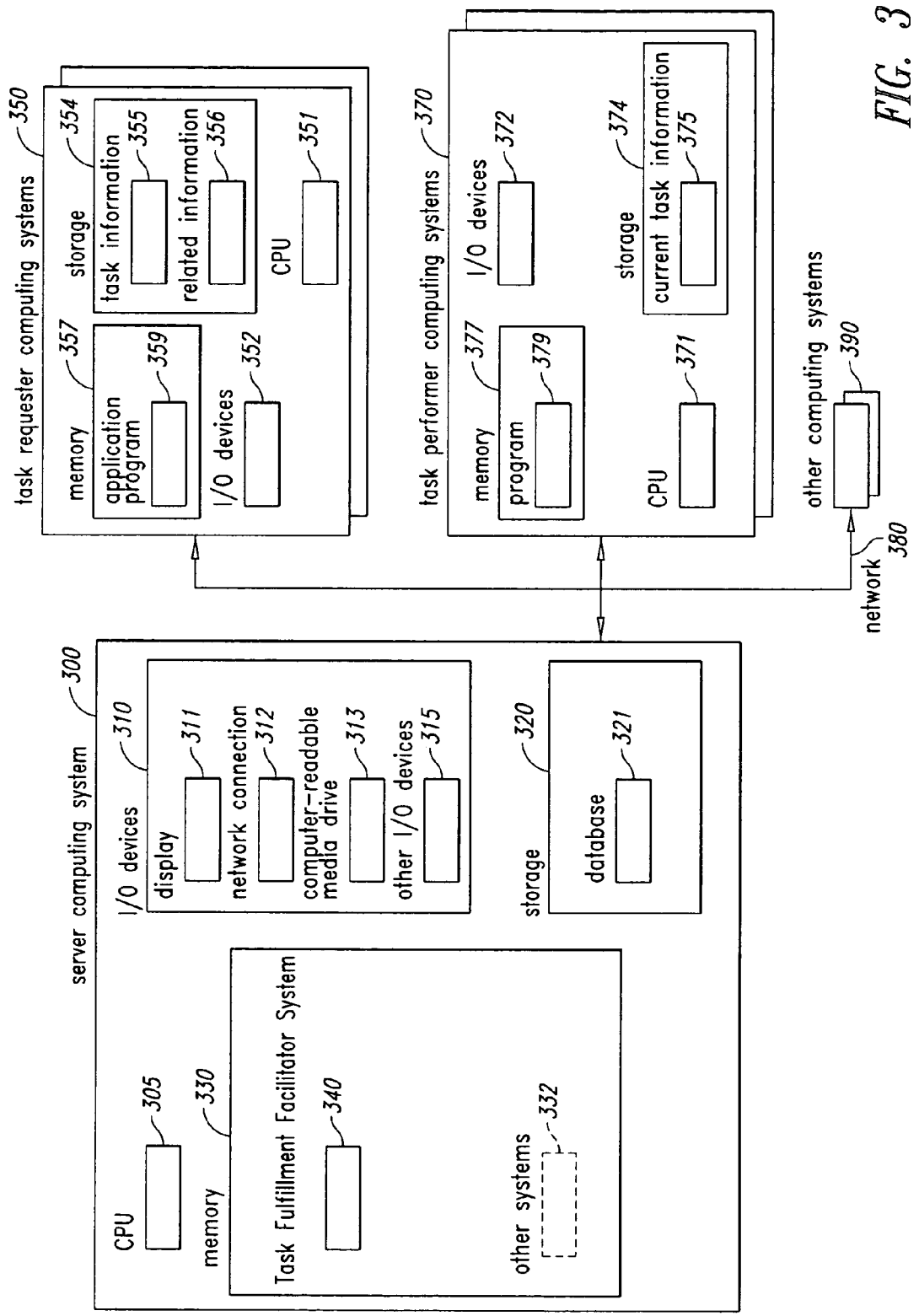
FIG. 3 is a block diagram illustrating a computing system suitable for executing an embodiment of a system for providing the described electronic marketplace.

FIG. 3 illustrates a server computing system 300 suitable for executing an embodiment of the TFF system facility that provides an electronic marketplace for human performance tasks, as well as various task requester computing systems 350, task performer computing systems 370, and other computing systems 390. In the illustrated embodiment, the server computing system 300 includes a CPU 305, various I/O devices 310, storage 320, and memory 330. The I/O devices include a display 311, a network connection 312, a computer-readable media drive 313, and other I/O devices 315.

An embodiment of the TFF system 340 is executing in memory, and it interacts with the other computing systems over the network 380 using the network connection 312 (e.g., via the Internet and/or the World Wide Web). In particular, users of task requester computing systems 350 may interact with the TFF system in order to provide information about available tasks to be performed, such as by using application program 359 executing in memory 357 to send stored task information 355 (e.g., information about the task, any associated criteria, any reward for successful performance, etc.) and related information 356 (e.g., information to be analyzed by human task performers as part of the tasks) on storage 354. Human task performer users similarly use task performer computing systems 370 to interact with the TFF system, such as via a program 379 (e.g., a Web browser) in memory 377 to programmatically or interactively obtain information about available tasks and provide results information for performed tasks. When information is received at the computing system 370 about available tasks, the information is stored in this example embodiment with current task information 375 in storage 374 (e.g., temporarily until performance of the task is completed).

The TFF system and its modules (not shown) may also access and use various task-related and user-related information on storage 320 or elsewhere, such as information stored in one or more databases 321. In addition, in some embodiments the TFF system may also interact with other optional systems 332 executing in memory 330 and/or other optional computing systems 390 to perform additional related functionality, such as to perform payment processing in order to provide payments to human task performers on behalf of task requesters and/or to obtain qualification information from third-party qualification issuing authorities.

Those skilled in the art will appreciate that computing systems 300, 350, 370 and 390 are merely illustrative and are not intended to limit the scope of the present invention. The TFF system may instead be executed by multiple interacting computing systems or devices, and computing system 300 may be connected to other devices that are not illustrated, including through one or more networks such as the Internet or via the World Wide Web ("Web"). More generally, a "client" or "server" computing system or device may comprise any combination of hardware or software that can interact, including (without limitation) desktop or other computers, network devices, PDAs, cellphones, wireless phones, pagers, electronic organizers, Internet appliances, television-based systems (e.g., using set-top boxes and/or personal/digital video recorders), and various other consumer products that include appropriate inter-communication capabilities. In addition, the functionality provided by the discussed TFF system modules may in some embodiments be combined in fewer modules or distributed in additional modules. Similarly, in some embodiments the functionality of some of the modules may not be provided as part of the TFF system and/or other additional functionality may be available.

Those skilled in the art will also appreciate that, while various items are discussed or illustrated as being stored in memory or on storage while being used, these items or portions of them can be transferred between memory and other storage devices for purposes of memory management and data integrity. Alternatively, in other embodiments some or all of the software modules and/or components may execute in memory on another device and communicate with the illustrated computing system via inter-computer communication. Some or all of the system modules and/or data structures may also be stored (e.g., as software instructions or structured data) on a computer-readable medium, such as a hard disk, a memory, a network, or a portable media article to be read by an appropriate drive or via an appropriate connection. The system modules and data structures can also be transmitted via generated data signals (e.g., as part of a carrier wave or other analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

As previously noted, in at least some embodiments human task requesters submit tasks to the electronic marketplace that are available to be performed by human task performers. The types of tasks that can be submitted and performed may vary in various embodiments. In particular, in some embodiments the tasks are each cognitive human performance tasks that use cognitive and/or other mental skills of human task performers, such as to use human judgment capabilities to form an opinion related to one or more subjective bases, to use human discernment and/or perception skills to select information (e.g., by analyzing audio and/or video information, such as to perform pattern recognition), to use human reasoning skills (e.g., based on common-sense reasoning), etc. More generally, in at least some embodiments the tasks to be performed are human performance tasks that are selected based on their susceptibility to performance by humans, whether because automated systems are not currently capable of performing the tasks or because human task performers can perform the tasks more cheaply, rapidly, and/or accurately. For example, while automated text translation tools may translate text between languages at a limited level of proficiency, human translators with appropriate qualifications may be able to perform the translations with a significantly higher proficiency level. In addition, in some embodiments some or all of the tasks include questions to be answered by the task performers, such as to select from an enumerated set of potential answers or to more generally generate an appropriate answer.

The results of task performance can also take various forms in various embodiments, including answers to questions, a selection by a task performer of one or more options provided as part of the task, a manipulated form of information provided to the task performer, a categorization or other analysis of information provided to the task performer, etc. Additional information regarding tasks and task results is discussed elsewhere.

For illustrative purposes, some embodiments are described below in which a specific form of electronic marketplace provides various specific types of capabilities and functionalities with respect to various specific types of tasks, and interacts with task requesters and task performers in specific types of ways. However, those skilled in the art will appreciate that the techniques of the invention can be used in a wide variety of other situations, including with other types of tasks, with types of programmatic interfaces and/or access mechanisms that do not use Web services, and in situations other than with an electronic marketplace, and that the invention is not limited to the exemplary details provided.

FIGS. 2A-2G illustrate examples of programmatic messages used to interact with an example embodiment of an electronic marketplace for human performance tasks, with the message contents formatted in XML to use various example types of XML tags. In other embodiments, similar types of information could be formatted in other ways, and a variety of additional types of messages may similarly be used to provide other types of information and obtain other types of functionality from the electronic marketplace.

In particular, FIG. 2A illustrates an example of a task submission message that a task requester can programmatically provide to the electronic marketplace in order to describe a task that is available to be performed. In this example, the task is of a type identified by the task requester as being "ImageChoice" (as shown in line 5), such as based on a previous specification by the task requester of that task type or instead based on a predefined type of task provided by the electronic marketplace. The task in this example involves answering the question of which one of 4 specified photographs best shows a specified subject (which in this example is a business in Seattle by the name of "Wildboar Tavern," as indicated in lines 30-37), with the answer being the selected photograph. The task may be, for example, one of thousands or millions of related tasks for a task requester who is creating a directory of businesses with associated photographs. As discussed in greater detail later, FIG. 12A illustrates an alternative example of encoding task information for a similar type of task.

In this example, the message identifies the task requester in line 2 of the message as having an ID of "BarnabyPhoto", specifies details regarding the task in lines 29-44, and specifies information in lines 4-28 regarding criteria and other associated information for the task. A verbal description of the task is provided in lines 7-8, an indication of payment compensation for successful performance of the task is provided in lines 9-12 (which in this example is 6 cents, to be provided to the task performer after approval of the results of task performance by the task requester), and an estimate of the time needed to complete the task is indicated in line 13 to be 30 seconds. The message also indicates various criteria in lines 17-23 regarding task performers who are allowed to perform the task, which in this example does not include any specific qualification criteria (as shown in line 22) or any specific task performers who are identified as being allowed to perform the task (as shown in line 18), but does specify one task performer in lines 19-21 who is excluded from performing the task. Timeout information in lines 24-27 indicates that the task will remain open for performance for 172,800 seconds (or 48 hours), but that an assignment of the task to a task performer will be kept open for only 60 seconds before the task becomes available to others. The message further indicates in lines 39-42 the supplied photographs to be analyzed, and in lines 15-16 indicates an application that will provide functionality for comparing the images (e.g., by displaying all four photographs along with a control for indicating which photograph was selected). In response to submitting this message, the task requester receives a message (not shown) indicating that the task information was received and including a unique task ID of "109234875" that was generated for referencing the task.

FIG. 2B illustrates an example message that a task requester may programmatically supply to the electronic marketplace in order to determine the status of various tasks previously submitted by the task requester. In this example, the previously discussed task requester whose ID is "BarnabyPhoto" has supplied previous tasks that were also of type "ImageChoice", and is gathering information about the performance of those tasks. The message in this example identifies the task requester in line 2, and lines 3-11 indicate to perform a search and provide information about tasks of type "ImageChoice" that have been submitted by the task requester and that have been completed. In response, the task requester will receive a message (not shown) including information about each of the tasks matching those specified criteria.

FIG. 2C illustrates an example message that is later provided to the task requester to give task results from performance of the task illustrated in FIG. 2A, such as after receiving a similar message from a task performer to whom the task was assigned. In particular, line 3 of this example message indicates the task ID for the task to which the results correspond, line 5 identifies the task performer as being "BestManBryan", and in line 6 indicates that the task performance has been completed. Lines 7-10 indicate the actual results of the task, which in this example includes an indication of a particular photograph that was selected, as well as a corresponding ID supplied by the task requester for the business being identified (in line 31 of the message illustrated in FIG. 2A).

FIG. 2D next illustrates an example message sent back to the electronic marketplace from the task requester to indicate that the results are acceptable by closing the task, which in this example triggers the payment of 6 cents to be provided to the human performer for the task performance. If the task requester had instead been unsatisfied with the results, the task requester could have rejected the prior performance result and instead made the task again available for performance to other task performers.

FIGS. 2E-2G next illustrate examples of some messages that are programmatically exchanged with a task performer in order to identify and perform tasks of interest. In particular, FIG. 2E illustrates an example message that a task performer can send to the electronic marketplace in order to identify available tasks, such as by indicating in lines 2-5 of this example message to perform a search for all tasks that are open and available, and to rank the available types of tasks by the number of each type that are available.

In response, the electronic marketplace may provide an example message as illustrated in FIG. 2F, which indicates two types of available tasks. In this example, lines 3-6 of the message indicate that there are 400 available tasks related to selecting photographs or other images (e.g., to match them to business locations), and lines 7-10 of the message indicate that there 80 available tasks related to translating text between French and English. In some embodiments, all available tasks may be indicated to the task performer regardless of the qualifications of the performer, while in other embodiments only available tasks for which the performer is qualified and/or which the performer is authorized to access may be indicated (e.g., if the performer in this example has a previously established associated qualification of having French to English translation abilities).

FIG. 2G then illustrates an example message that a human task performer can use to request that an available task be assigned to them. While in some situations a human task performer may identify one or more specific tasks of interest (e.g., by the task IDs of those tasks), in this example the human task performer indicates an available task by specifying criteria related to the task. In particular, this example message requests in lines 3-10 to assign and lock one of the open tasks for selecting images, and in particular to rank tasks of that type by their creation date so as to select the oldest available task of that type. After information about the task is provided to the human task performer (such as in a message similar to that of FIG. 2A), the human task performer can make an appropriate selection and provide results of task performance to the electronic marketplace (such as in a response message similar to that of FIG. 2C). It will be apparent that a variety of other types of messages could similarly be exchanged for various other types of functionality and using various other formats, and that similar types of messages could be used for a wide variety of types of tasks.

Figure 4A:
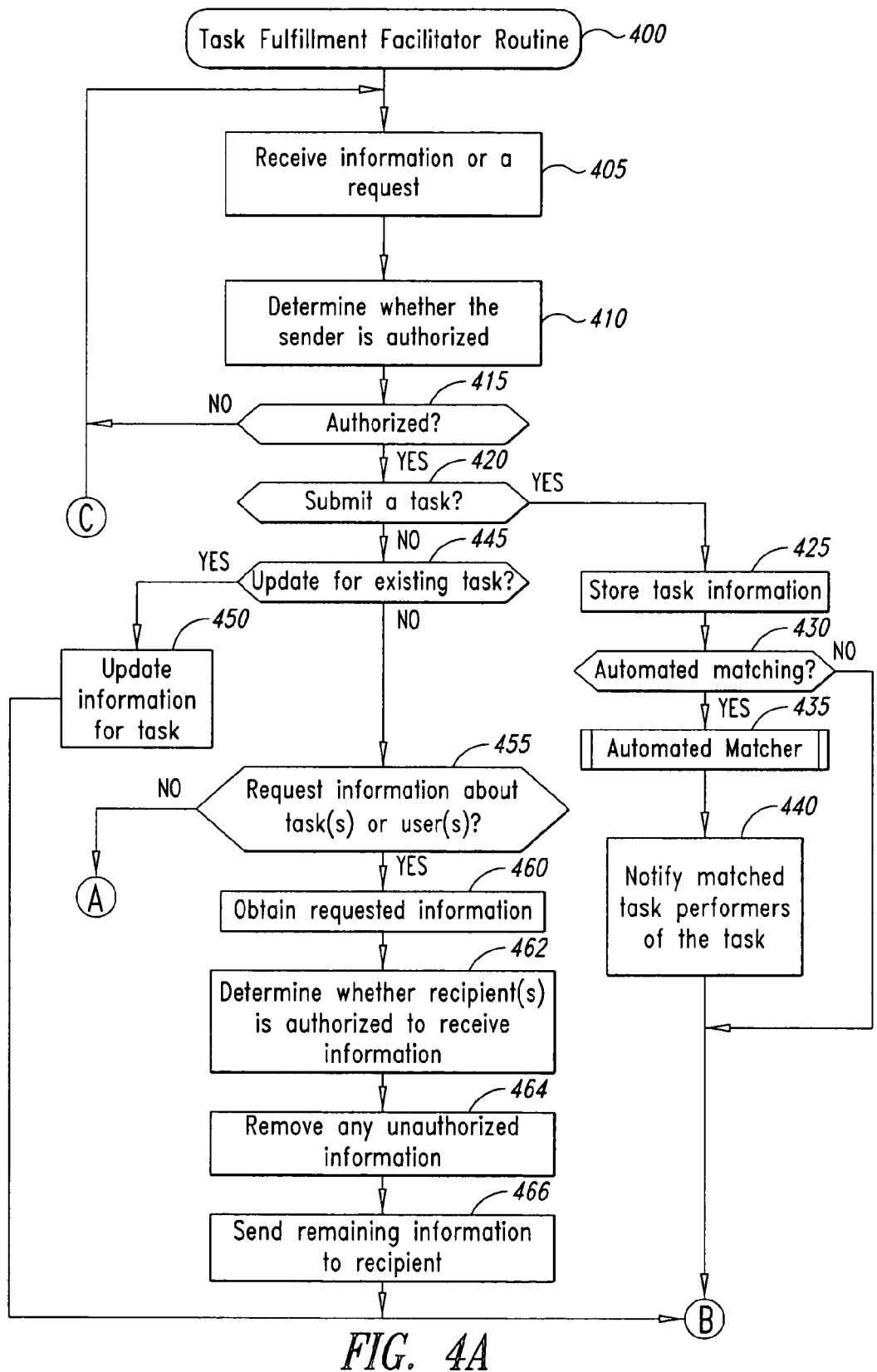
FIGS. 4A and 4B are a flow diagram of an embodiment of a Task Fulfillment Facilitator routine.
Figure 4B:
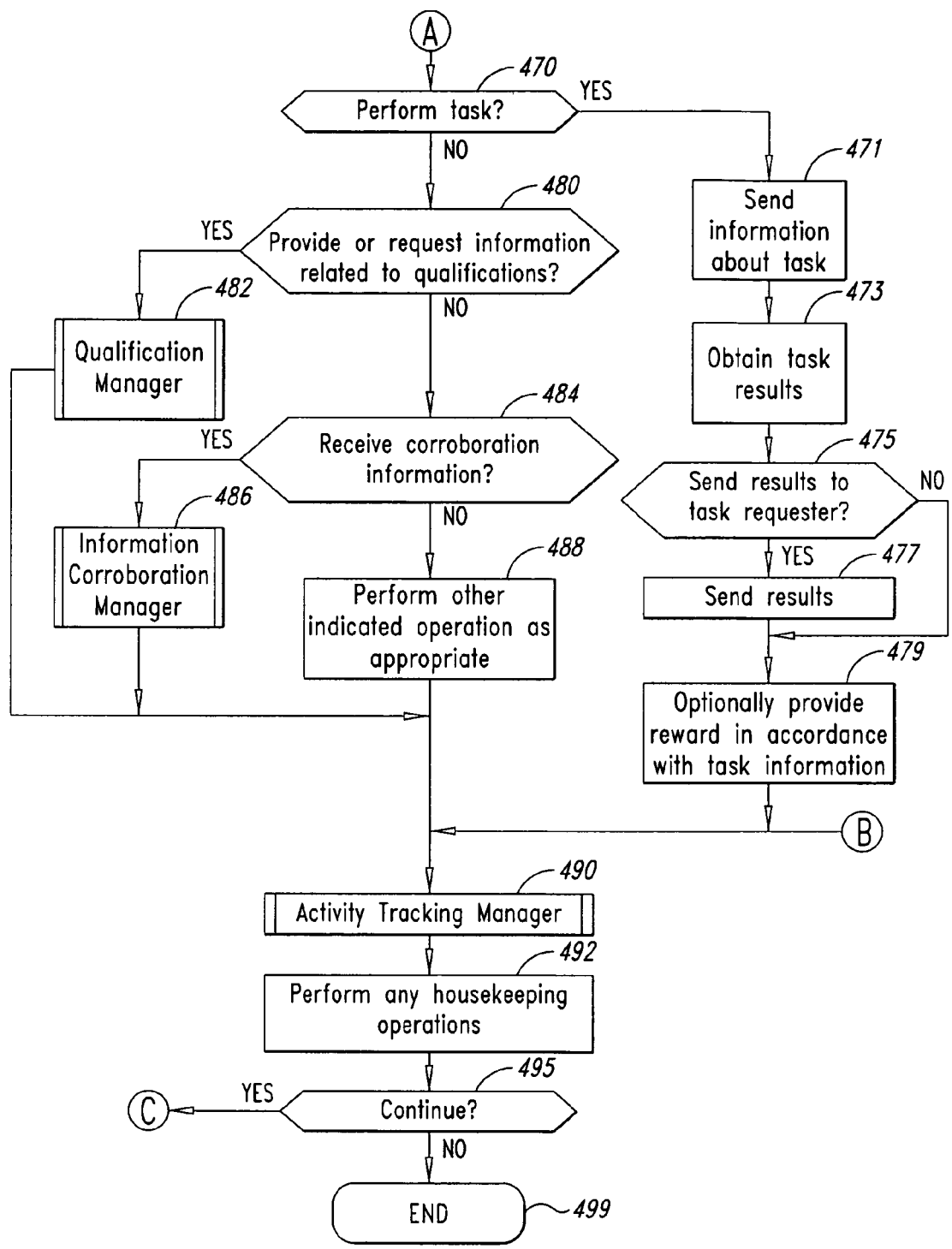

FIGS. 4A and 4B are a flow diagram of an embodiment of a Task Fulfillment Facilitator routine 400. The routine may, for example, be provided by execution of an embodiment of the TFF system 130 of FIGS. 1A and 1B and/or of TFF system 340 of FIG. 3, such as to in this illustrated embodiment provide an electronic marketplace for human performance tasks by interacting with task requesters and task performers as appropriate to facilitate performance of tasks, as well as optionally to interact with other third-party systems as appropriate.

The routine begins in step 405, where an indication is received of information or a request, and in step 410 determines whether the sender of the information or request is authorized to perform requests of that type or provide information of that type, such as based on previously defined access controls for specific users or types of users, and/or on private qualifications associated with the sender and/or with other related information. If the routine identifies the sender as authorized in step 415, the routine continues to step 420 to determine whether the received indication was a request to submit a task. If so, the routine continues to step 425 to store task information received in step 405, including any task criteria related to task performance (including any private or other qualifications associated with the task), information about any associated rewards for performance of the task, and any associated information to be analyzed or manipulated as part of the task.

The routine then continues to step 430 to determine whether to perform automated matching to identify task performers who are appropriate to perform the task, such as based on the type of task submitted and/or an explicit request by the submitter of the task, although in other embodiments such automated matching functionality may not be provided. In the illustrated embodiment, if automated matching is to be performed, the routine continues to step 435 to execute an Automated Matcher routine, and in step 440 then receives identifications from the Automated Matcher routine of any identified task performers. The routine then notifies those identified task performers of the task in an appropriate manner (e.g., based on previously specified user preferences for those task performers). After step 440, or if it was instead determined in step 430 that automated matching was not to be performed, the routine continues to step 490.

If it was instead determined in step 420 that the received indication was not to submit a task, the routine continues instead to step 445 to determine whether a request was received to perform an update for an existing task, and if so continues to step 450 to perform the update as appropriate. Such updates may take a variety of forms, such as to modify information about or delete a pending task that has not been performed, to perform an indicated activity related to a task (e.g., to cause a reward to be provided to a task performer after the task requester has reviewed and accepted the task results), to add, modify, or remove private qualifications to or from an existing task that has not yet been performed, etc. If it was instead determined in step 445 that the received indication was not to update an existing task, the routine continues to step 455 to determine whether the received indication was a request for information about one or more tasks and/or one or more users, such as for a search or browse request, a request for detailed information about a particular task or user, a request for summary or aggregate information about some or all types of tasks and/or users, etc. If so, the routine continues to step 460 to identify and obtain the requested information, and then continues to step 462 to determine whether the indicated recipient of the information is authorized to receive all of the obtained information, such as based on access controls associated with any aspects or elements of the obtained information (although in other embodiments the access determination may be made before or as part of the obtaining of the information). For example, the determination of whether the indicated recipient is authorized to receive the requested information may be based in part or entirely on private qualifications assigned to the indicated recipient and/or to the task or user whose information was requested. If a potential recipient is searching or browsing for information regarding tasks or users, for example, the potential recipient may not be authorized to receive information regarding those tasks or users having associated private qualifications that do not match the recipient(s) private qualification(s), and the potential recipient may similarly not be authorized to receive information regarding any such private qualifications that the recipient does not have. Such use of private qualifications to restrict access to information may be performed in various ways in various embodiments, such as allowing a potential recipient no access to any information regarding a particular task or user having an associated private qualification unless the recipient also holds a matching private qualification, or instead to provide access only to certain types of information about any such tasks or users (e.g., as configured by the issuer of the private qualification). In step 464, the routine then removes any information for which the recipient is not authorized, and in step 466 sends any remaining information to the recipient. In some embodiments, indications may be provided to the recipient of any removed information for which they were not authorized, while in other embodiments such indications may not be provided. After steps 450 or 466, the routine continues to step 490.

If it was instead determined in step 455 that the received indication was not a request for information about tasks or users, the routine continues instead to step 470 to determine whether the received indication was a request from a task performer to perform an indicated task. If so, the routine continues to step 471 to retrieve and provide information about the task to the task performer in an appropriate manner (e.g., in a manner specified for the task), and in step 473 obtains results of performance of the task by the task performer. In step 475, the routine then determines whether to immediately send the task results to the task requester, such as based on information associated with the task and/or user preferences for the task requester. If so, the routine continues to step 477 to send the results. After step 477, or if it was instead determined in step 475 not to send the results to the task requester at this time, the routine continues to step 479 to optionally provide any reward associated with the task to the task performer in accordance with the task information, such as if such rewards are to be provided automatically upon receipt of the task results or instead if the task results satisfy any automatically verifiable criteria specified for the task that trigger the providing of the reward. After step 479, the routine continues to step 490.

While the illustrated embodiment indicates a synchronous flow in which the routine waits for and obtains task results in step 473 after sending the task information in step 471, in other embodiments the routine could be structured in other manners, such as to continue with other processing while waiting for task results (if any) to be sent. In addition, in some situations task performers may not provide task results for a task after they accept an assignment to perform the task, which may be indicated to the routine in an explicit message from the task performer that the task performer is abandoning or withdrawing from task performance or instead by not receiving task results within a specified period of time, and if so the routine would continue to handle other task-related requests and information. In addition, while not illustrated here, in other embodiments various types of notifications may be sent to task requesters related to their submitted tasks, such as when a task is assigned to a task performer for performance and/or when an assigned task is withdrawn from a task performer who has not completed the performance.

If it was instead determined in step 470 that the received indication was not to perform a task, the routine continues instead to step 480 to determine whether the received indication is to request or specify information related to user qualifications, and if so continues to step 482 to execute a Qualification Manager routine to handle the qualification-related activities. If it was instead determined in 480 that the received indication was not to request or specify qualification-related information, the routine continues instead to step 484 to determine whether information or a request was received related to corroboration of user qualifications or other user information, and if so continues to step 486 to execute an Information Corroboration Manager routine to handle the corroboration-related activities. If it was instead determined in step 484 that the received indication was not related to corroboration, the routine continues instead to step 488 to perform another indicated operation as appropriate, such as from a task performer indicating a withdrawal from or abandonment of an assignment to perform a task, to specify various types of user information (e.g., information related to a user's identity or attributes, information related to an account of a user with the TFF system, information related to specifying access controls for information and/or functionality, administrative requests related to system operations, requests for information related to monitoring performance of tasks or other operations of the system, etc.).

After steps 482, 486, or 488, the routine continues to step 490 to execute an Activity Tracking Manager routine to log information about activities that have occurred and to generate various types of review and summary aggregate information for the system related to tasks and users. After step 490, the routine continues to step 492 to perform any additional housekeeping operations, such as to take appropriate actions when events do not occur within specified periods of time (e.g., to withdraw assigned tasks from task performers who do not timely perform the tasks, to provide rewards to task performers for tasks that they have performed when task requesters do not timely reject the task results provided by the task performers, etc.). After step 492, the routine continues to step 495 to determine whether to continue. If so, or if it was determined in step 415 that the sender was not authorized, the routine returns to step 405, and if not continues to step 499 and ends. While the illustrated embodiment may include tasks being specified one at a time, in other embodiments tasks may instead be specified in other manners, such as to allow multiple tasks to be submitted together (e.g., to allow for batch processing), whether or not those tasks are related to each other.

Figure 5:
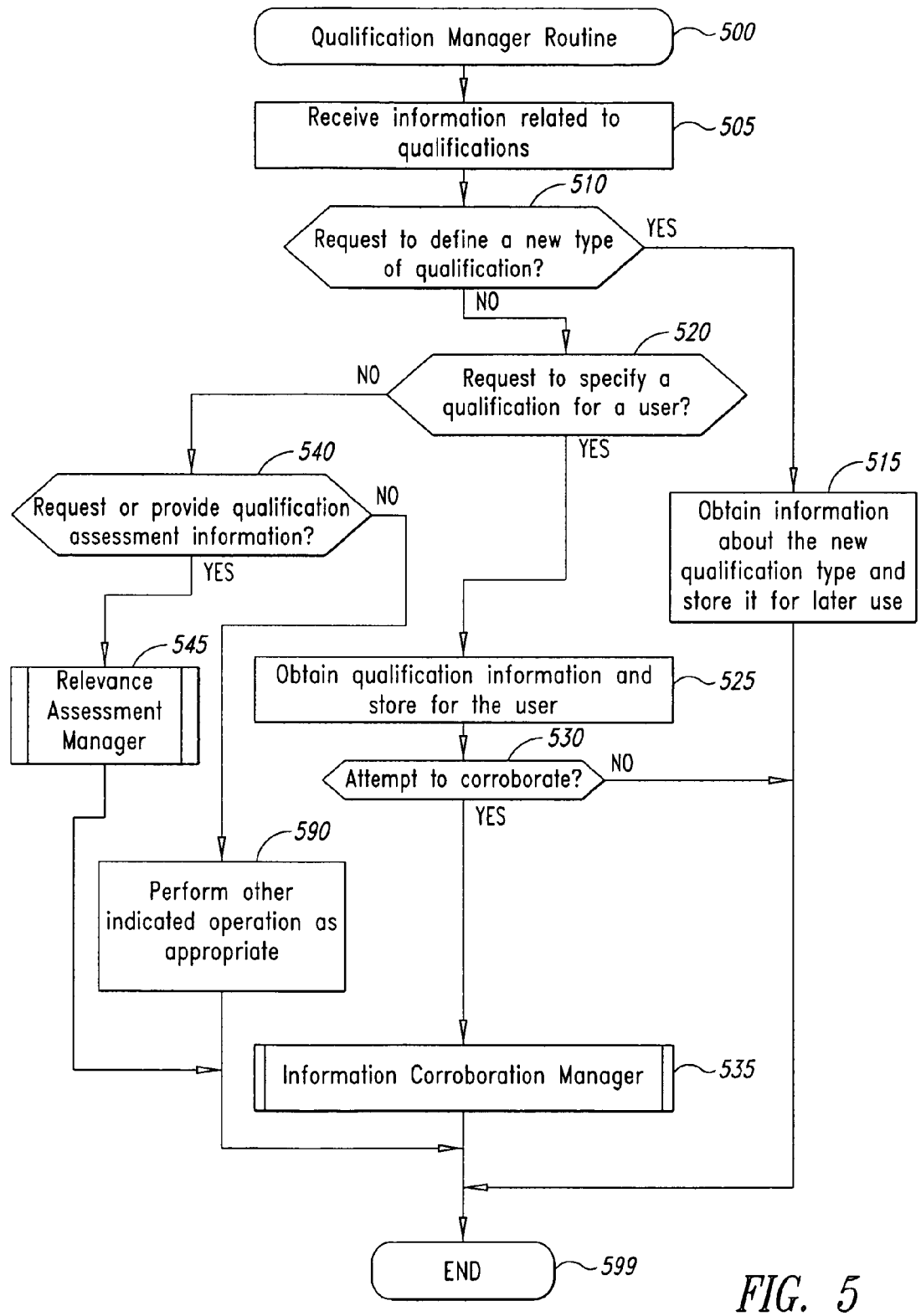
FIG. 5 is a flow diagram of an embodiment of a Qualification Manager routine.

FIG. 5 is a flow chart of an embodiment of a Qualification Manager routine 500. The routine may, for example, be provided by execution of an embodiment of the User Qualification Manager module 133 of FIG. 1B, such as to receive information related to user qualifications and handle the information as appropriate.

The routine begins in step 505, where an indication is received of information or a request related to user qualifications. In step 510, the routine then determines whether the received indication was a request from a user to define a new type of qualification for use with the system, such as for use by that user and/or other indicated users (or all users). If so, the routine continues to step 515 to obtain various information about the new qualification type and to store it for later use. As discussed in greater detail elsewhere, such qualification types may include a unique name, indications of one or more entities authorized to issue qualifications of that type, indications of a rating scale for how qualifications of that type may be rated, an indication of whether the qualification type is a private qualification type to be used to limit access to information and optionally configuration information related to such access limits (e.g., rules or access controls to limit the visibility of qualifications of that type and/or of users or tasks with which such qualifications are associated), an indication of a particular system at which the qualification type is defined (e.g., the TFF system), etc.

If it was instead determined in step 510 that the received indication was not a request to define a new type of qualification, the routine continues instead to step 520 to determine whether the received indication was a request to specify a particular qualification for a particular user, such as from an issuing entity for qualifications of that type. As discussed in greater detail elsewhere, in some embodiments any user is allowed to author any qualification for any user (including themselves), with other corroborative and/or reputational information able to be used to determine how much weight to give to a particular qualification. If it is determined in step 520 that the received indication was related to specifying a qualification, the routine continues to step 525 to obtain the received qualification information and to store it for the indicated user. As discussed in greater detail elsewhere, such qualifications may include an indication of a qualification type for the qualification, of a rating or value for the qualification, the issuer of the qualification, an indication of whether the qualification is a private qualification (e.g., if an indicated qualification type is not a private qualification type) to be used to limit access to information and optionally configuration information related to such access limits (e.g., rules or access controls to limit the visibility of the qualification and/or of users or tasks with which the qualification is associated), an indication of a particular system that stores the qualification (e.g., the TFF system), etc. After step 525, a determination is made in step 530 whether to attempt to corroborate the qualification information at this time, such as based on other information that may serve as evidence of the accuracy or validity of the qualification. If so, the routine continues in step 535 to execute Information Corroboration Manager routine 535, and if not continues to step 599. In other embodiments, such corroboration functionality may not be provided or may be performed at other times.

If it was instead determined in step 520 that the received indication was not a request to specify a qualification for a user, the routine continues instead to step 540 to determine whether the received indication was to request or to provide qualification assessment information, such as information related to relevance of one or more qualifications. If so, the routine continues to step 545 to execute a Relevance Assessment Manager routine. If the received indication was not to request or to provide qualification assessment information, however, the routine continues instead to step 590 to perform another indicated operation as appropriate, such as to update information about or remove existing qualifications, or to provide information about user qualifications to a user or other system. Furthermore, in at least some embodiments users may be restricted when attempting to specify, update, remove, obtain or provide information about a qualification, such as if the qualification is private and if the user is not the issuer of that private qualification (or qualification type) and does not otherwise have such rights with respect to that private qualification, whether due to access controls configured for that private qualification (or private qualification type) or due to default functionality provided by the TFF system. In addition, in some embodiments the routine may issue qualifications to at least some users based on past activities of the user with regard to the TFF system that had been tracked, such as automatically (e.g., on a periodic basis) and/or in response to a received request from a user to issue one or more qualifications of a specified type for one or more specified user based on specified types of tracked activity, and if so could perform such qualification issuance in step 590. After steps 515, 535, 545 or 590, the routine continues to step 599 and ends. While the illustrated embodiment may include qualifications and qualification type definitions being specified one at a time, in other embodiments qualifications and/or qualification type definitions may instead be specified in other manners, such as to allow multiple qualifications and/or qualification type definitions to be submitted together (e.g., to allow for batch processing).

Figure 6:
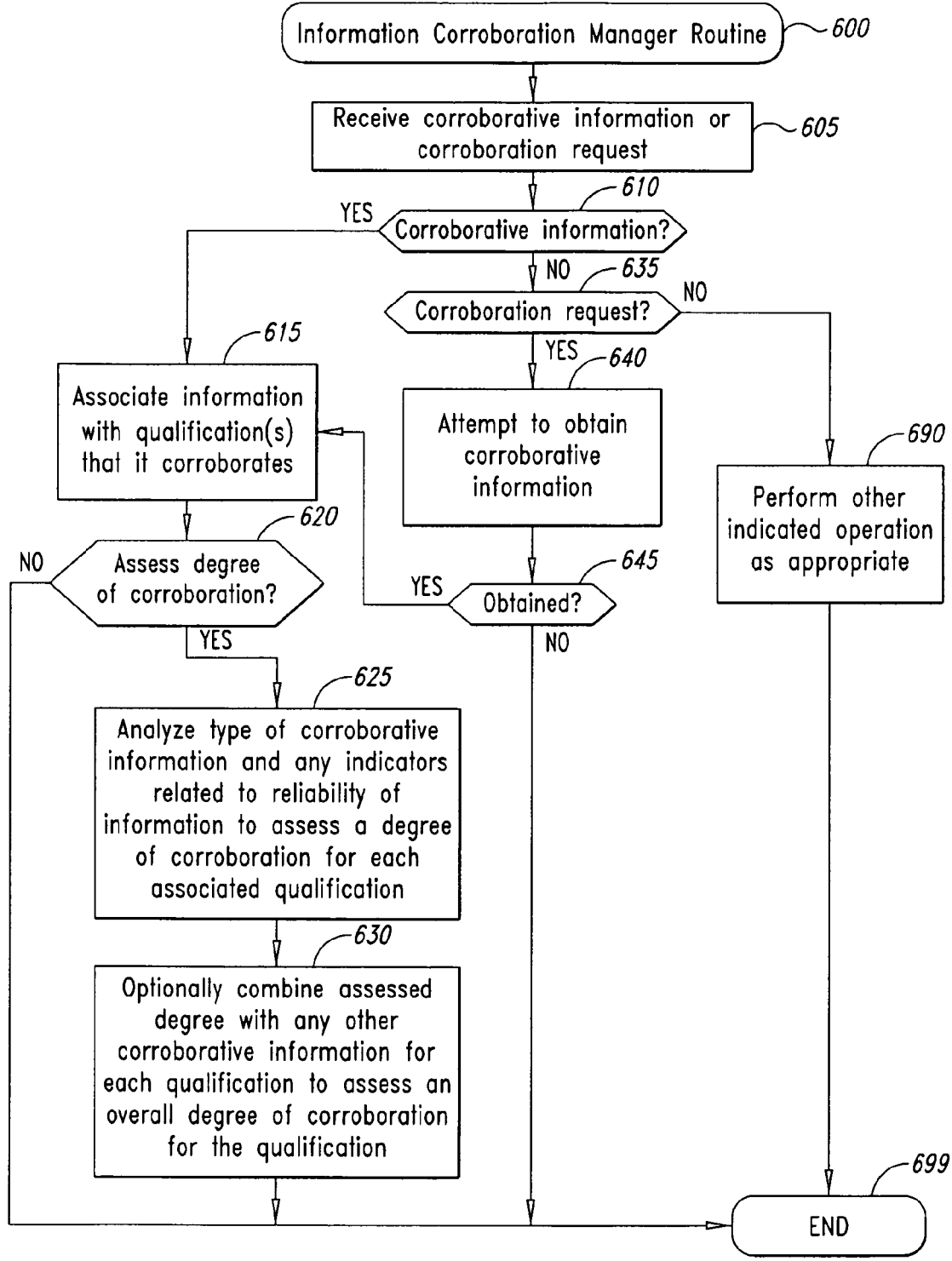
FIG. 6 is a flow diagram of an embodiment of an Information Corroboration Manager routine.

FIG. 6 is a flow diagram of an embodiment of an Information Corroboration Manager routine 600. The routine may, for example, be provided by execution of an embodiment of the User Information Corroboration Manager module 137 of FIG. 16, such as to receive information and requests related to corroborating user qualifications and other types of user information, and to respond as appropriate.

The routine begins at step 605, where an indication is received of a corroboration request or of corroborative information for a specified type of user information. In step 610, the routine determines whether corroborative information was received, such as for a particular user qualification or other piece of user information. If so, the routine continues to step 615 to associate the corroborative information with the user qualification or other user information that it corroborates, such as for later presentation to others along with that user information to allow the recipient to assess its credibility.

The routine then continues to step 620 to determine whether to automatically assess a degree of corroboration provided by the corroborative information if possible, although in some embodiments such automatic assessment functionality may not be provided. In the illustrated embodiment, if the corroboration is to be automatically assessed, the routine continues in step 625 to analyze information about the corroborative information in order to assess a degree of corroboration that the information provides for the user qualification or other information to which the corroborative information applies. For example, the analysis may be based at least in part on the type of corroborative information and indicators about the reliability of that information, such as the source of the information (and other associated information about the source, such as a reputation of the source). After step 625, the routine continues to step 630 to optionally combine the assessed degree of corroboration for the newly received corroborative information with any other corroborative information for each user qualification or other user information to which it applies in order to assess an overall degree of corroboration for those user qualifications or other user information, such as by using any of various information combination techniques (e.g., averaging, weighted averaging, etc.).

If it was instead determined in step 610 that the received indication was not corroborative information, the routine continues instead to step 635 to determine whether a request was received to attempt to perform corroboration for indicated user information at this time, although in other embodiments such requests may not be handled. In the illustrated embodiment, if a corroboration-related request was received, the routine continues to step 640 to attempt to obtain appropriate corroborative information, and if it is determined in step 645 that it was obtained, the routine returns to step 615 to process the corroborative information. Attempts to obtain corroborative information may be performed in a variety of ways, such as based on the type of information to be corroborated (e.g., attempting to corroborate a user's identity based on querying the user to provide evidence of the identity in various forms, attempting to corroborate a qualification of the user by testing the user with respect to that qualification, attempting to obtain information from a third party that may have additional related information, etc.).

If it was instead determined in step 635 that a corroboration-related request was not received, the routine continues instead to step 690 to perform another indicated operation related to corroboration as appropriate, such as to provide corroborative information or an assessed degree of corroboration to users or other systems. After steps 630 or 690, or if it was instead determined in step 620 not to assess the degree of corroboration or in step 645 that corroborated information was not obtained, the routine continues to step 699 and ends. While not illustrated here, in other embodiments additional types of functionality could be provided, such as to provide a response to the sender that provided the corroborative information or corroboration-related request in step 605, such as to indicate the results of the analysis of provided corroborative information and/or the results of attempting to satisfy a received corroboration-related request. While the illustrated embodiment may include corroborative information being specified one piece at a time, in other embodiments corroborative information may instead be specified in other manners, such as to allow multiple pieces of corroborative information to be submitted together (e.g., to allow for batch processing).

Figure 7:
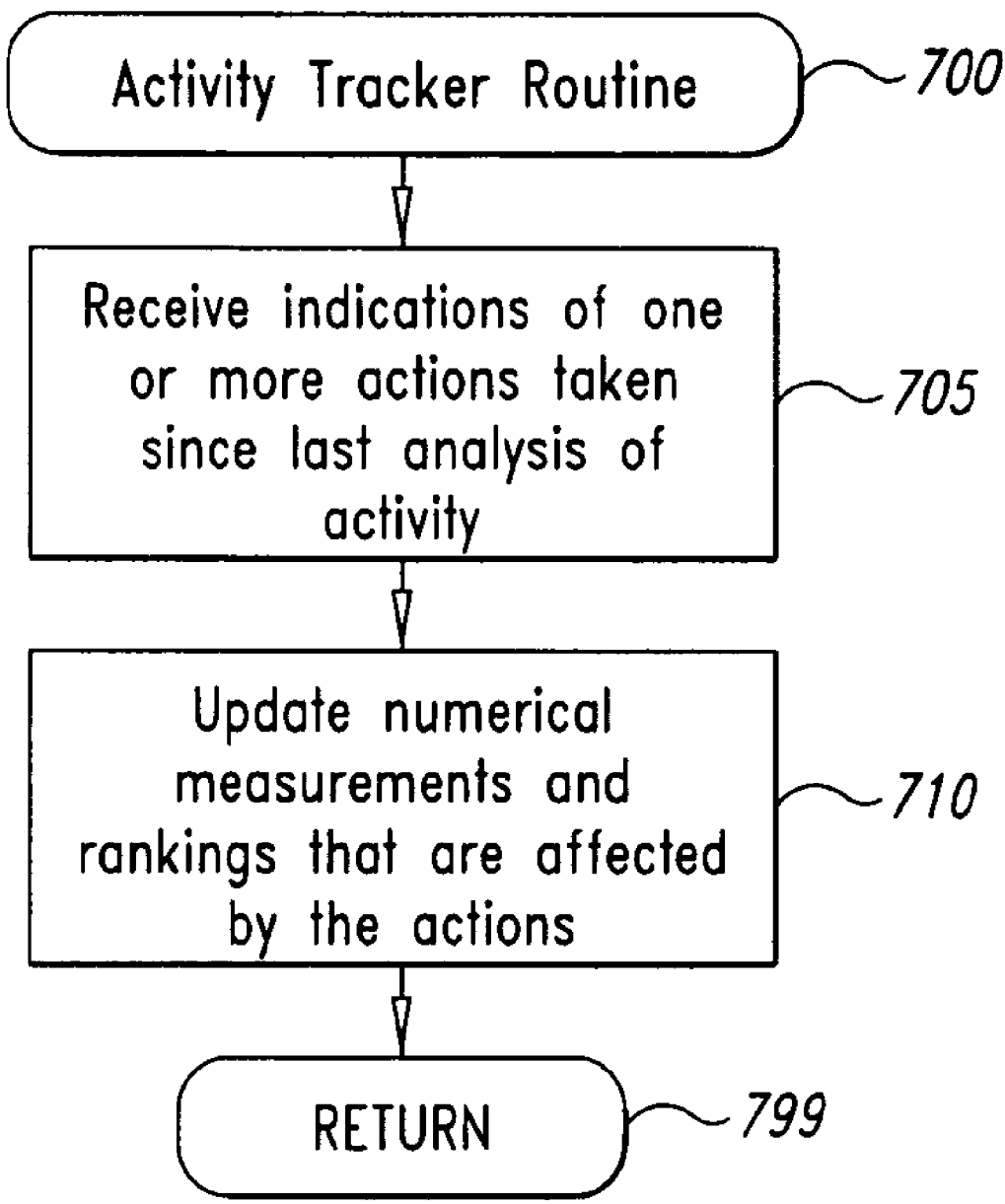
FIG. 7 is a flow diagram of an embodiment of an Activity Tracker routine.

FIG. 7 is a flow diagram of an embodiment of an Activity Tracker routine 700. The routine may, for example, be provided by execution of an embodiment of the Activity Tracking Manager module 138 of FIG. 1B, such as to track user activities related to task performance. The routine begins at step 705, where an indication is received of one or more actions taken by task requesters and/or task performers since a last activity tracking analysis. The routine continues in step 710 to store the activity information and to update quantitative measurements and/or rankings for users that are affected by the indicated actions. The routine then continues to step 799 and ends. In some embodiments, the routine may be executed at various times, such as periodically, in response to an activity to be tracked and/or in response to a request to perform the routine.

Figure 8:
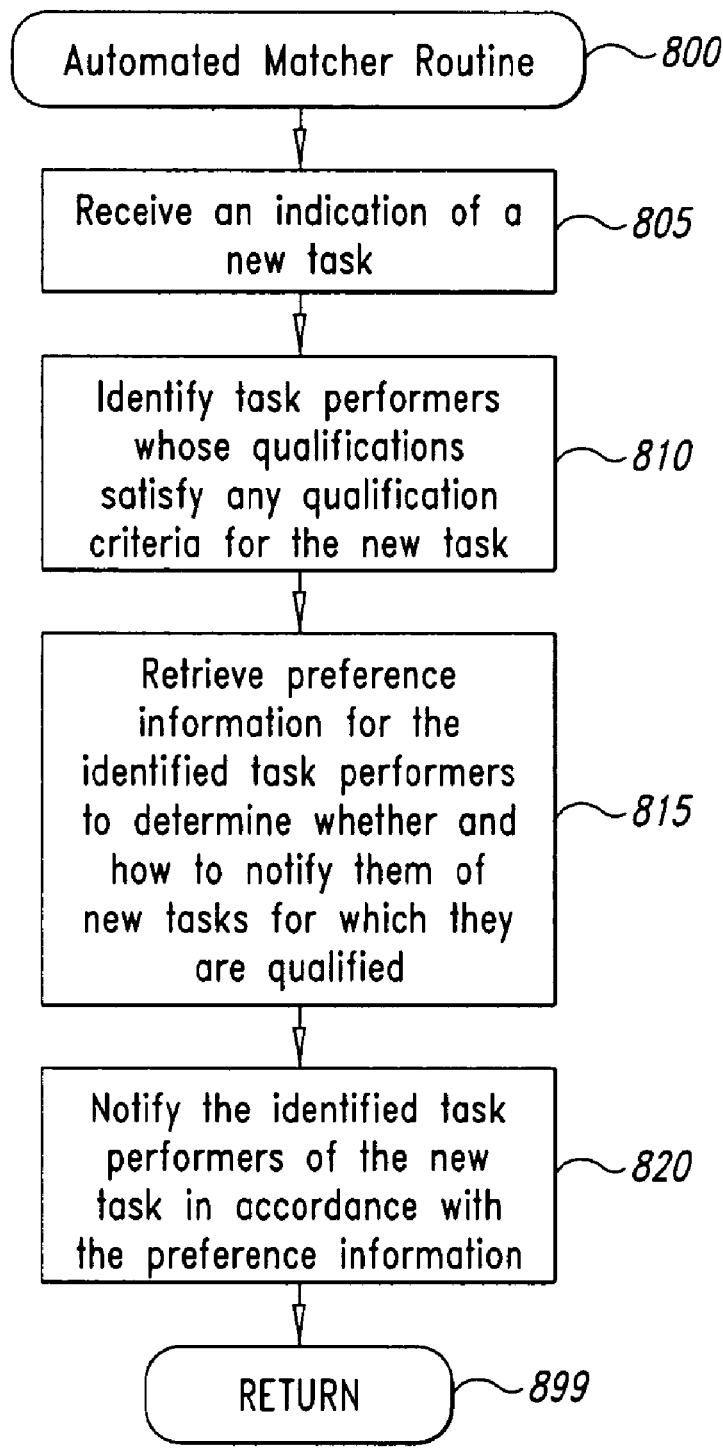
FIG. 8 is a flow diagram of an embodiment of an Automated Matcher routine.

FIG. 8 is a flow diagram of an Automated Matcher routine 800. The routine receives indications of new task requests and attempts to automatically match the tasks to appropriate task performers. The routine may, for example, be provided by execution of an embodiment of the Task and User Matching Manager module 132 of FIG. 1B, such as to match tasks and task performers as appropriate. In some embodiments, the routine may be performed in response to receiving new submissions of some or all tasks and/or at other times (e.g., in response to requests to perform the matching). In addition, in some times the automated matching may be performed in other ways, such as to receive an indication of one or more task performers (e.g., new task performers for the system) and to match appropriate tasks to those performers.

In the illustrated embodiment, the routine begins at step 805, where an indication is received of a new task. In step 810, the routine identifies one or more task performers whose qualifications satisfy any qualification criteria for the new task. In some embodiments, the matching of qualifications may be performed without the routine understanding the meaning or context of the qualifications (e.g., based on identifying qualifications from task criteria and for task performers that are of the same qualification type and that have compatible values or ratings), such as in embodiments in which the qualifications are of types defined by users. Furthermore, in at least some embodiments the matching of one or more task performers whose qualifications satisfy any qualification criteria for the new task may be based at least in part on private qualifications, such as to identify one or more task performers each having one or more private qualifications that match one or more private qualifications associated with the task. In some such embodiments, this matching may be strict such that a task performer must have every private qualification associated with the task, while in other such embodiments this matching may be less strict such that a task performer need have only one (or some pre-determined subset) of multiple private qualifications associated with the task. The routine then continues in step 815 to retrieve preference information for the identified task performers to determine whether and how to notify them of the new task. In step 820, the routine notifies the identified task performers of the new tasks in accordance with the preference information. While not illustrated here, in other embodiments the automated matcher subroutine could further automatically assign new tasks to one or more human task performers as appropriate, such as based on prior requests by the task performers. In addition, in some embodiments the automated matcher routine may perform one or more of the indicated activities for a fee, such as from the task requester who supplied the new task and/or the task performers who are notified of the task. After step 820, the routine continues to step 899 and ends. While the illustrated embodiment may include tasks and tasks performers being matched one at a time, in other embodiments tasks may be instead matched to task performers and/or task performers may instead be matched to tasks in various other manners, such as to allow multiple tasks and task performers to be matched together (e.g., to allow for batch processing).

Figure 14A:
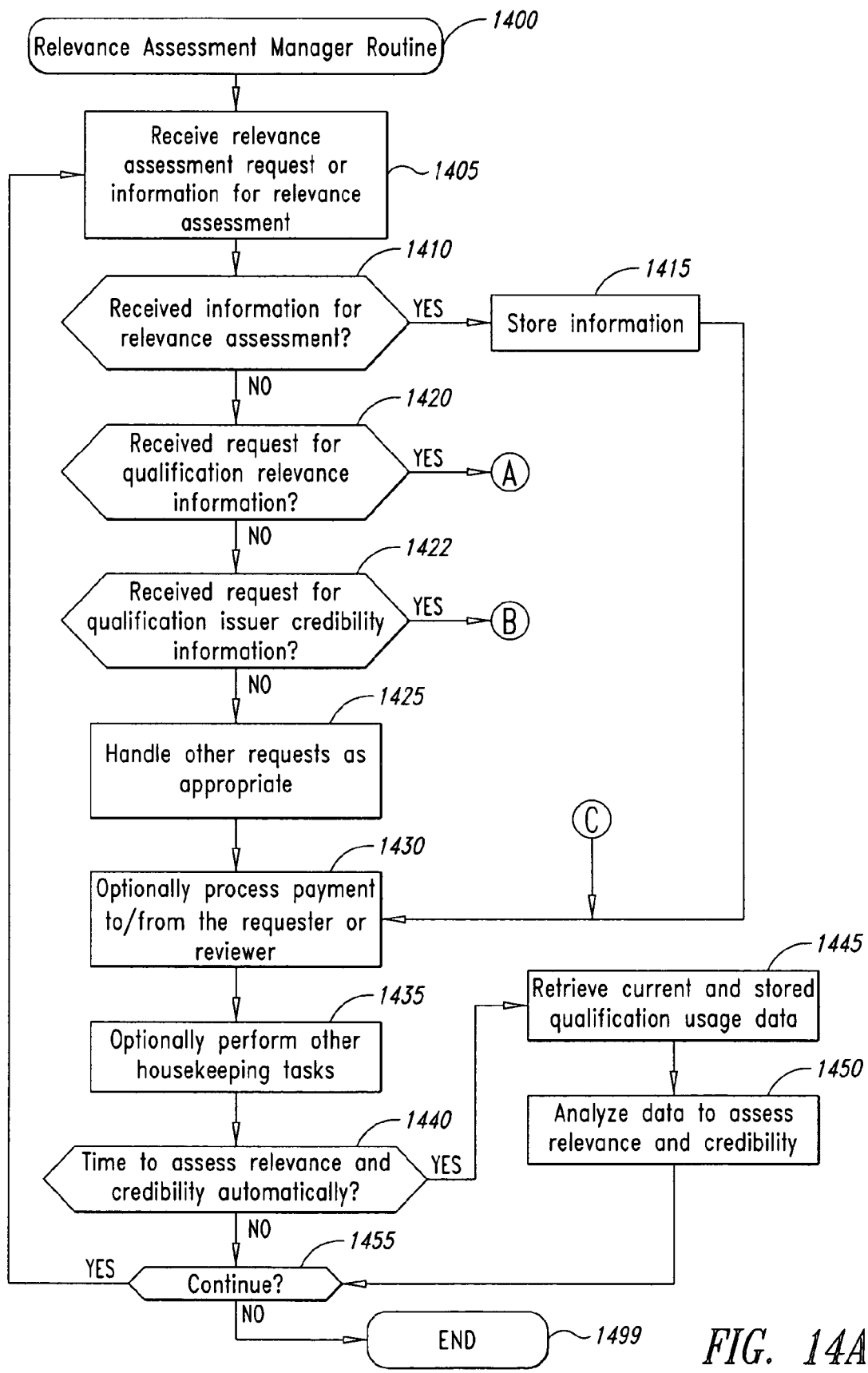
FIGS. 14A and 14B are a flow diagram of an embodiment of a Relevance Assessment Manager routine.
Figure 14B:
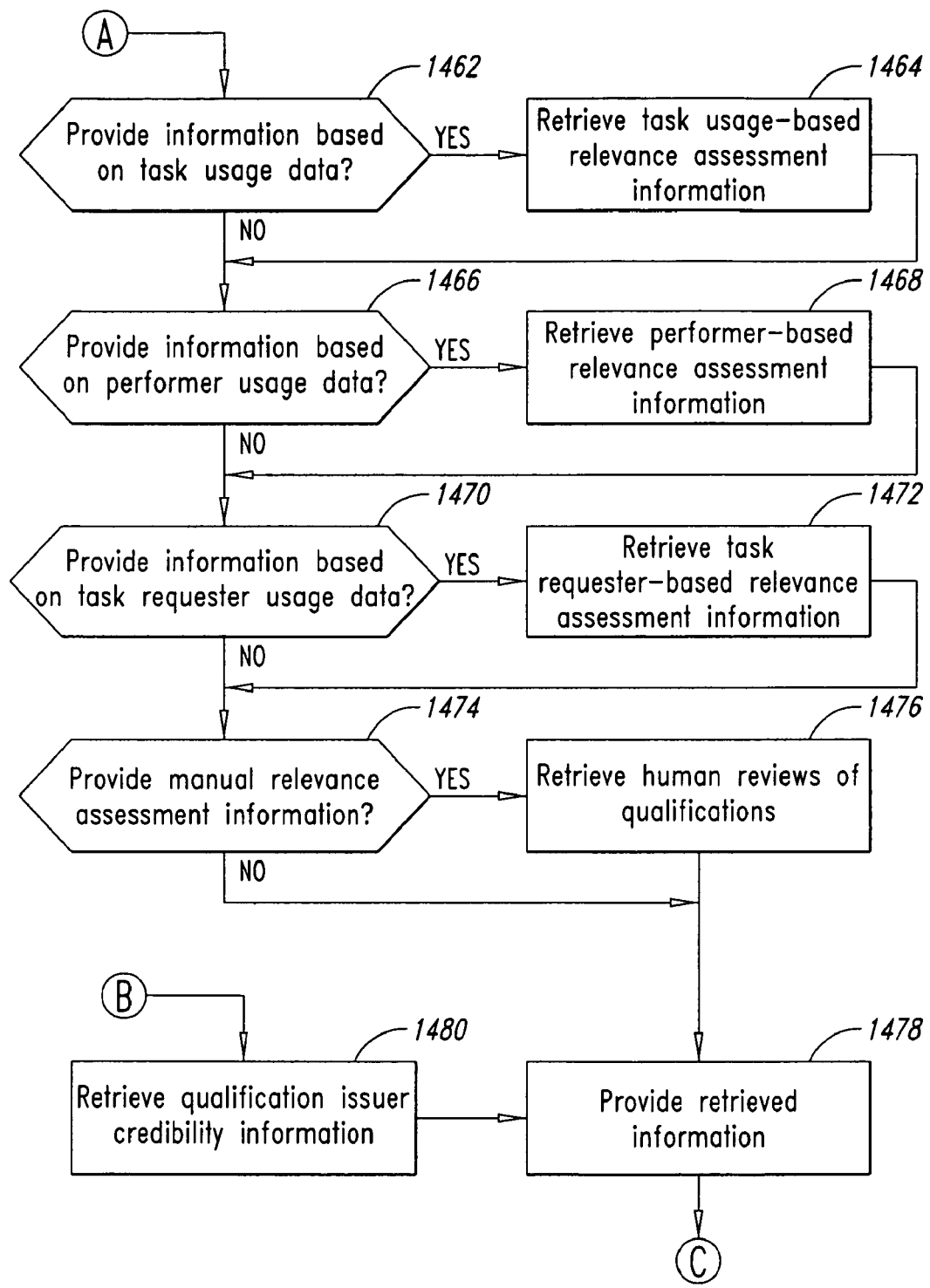

FIGS. 15A-15F illustrate examples of use of various assessment information for qualifications and qualification issuers, such as may be generated by an example embodiment of a Relevance Assessment Manager module and/or provided to users (e.g., in response to requests for assessment information regarding relevance of qualifications or credibility of qualification issuers) in various manners, and FIGS. 14A-14B are a flow diagram of an embodiment of a Relevance Assessment Manager routine that may, for example, be performed by execution of a Relevance Assessment Manager module.

In particular, FIG. 15A illustrates a table 1500 that contains various summary assessment information related to qualification relevance, such as may be based on aggregating various detailed assessment information (not shown) for the qualifications. For purposes of illustration for this example, it is assumed that a user has requested relevance-related information for qualification types related to the text string "Java," and FIGS. 15A-15F represent snapshots of a subset of corresponding information that may be displayed or otherwise presented or provided to the user. In this example, table 1500 contains several rows 1504b-1504e that each represent a qualification type matching the user's search criteria (e.g., qualification types with names containing the string "Java"), and various high-level summary information is provided related to rankings of the qualification types. In particular, row 1504a of the table is a header row with cells that describe the content of the columns below, including Qualification Name 1502a, Overall Rating 1502b, Usefulness 1502c, Performance 1502d, and Popularity 1502e. In this example, Qualification Name 1502a is a text string assigned to a qualification type at the time the qualification type is created, while columns 1502b-1502e each reflect a distinct measure of the relevance of the qualification types. For example, Overall Rating 1502b contains an overall rating for a given qualification type, such as may be based on measures 1502c-1502e and/or on other qualification-related information that is not shown, and such as may be automatically generated from such underlying information using any of various mathematical formulas or statistical techniques (e.g., sum, product, mean, median, weighted averages, etc.). In this example, measurement rating scores are presented by way of a number of stars ("*"), where more stars represent better ratings (e.g., on a scale of 0 to 5), while other embodiments may use other techniques to display quantitative information (e.g., bar graphs, numbers, letter grades, etc.). Furthermore, such rating scores for a qualification type may be generated and presented in various manners, such as in a manner relative to scores for some or all other qualification types, or instead in a non-relative manner.

In this example, column 1502e reflects a qualification relevance measure based on a summary indication of a popularity rating for a given qualification type. Such a popularity rating may, for example, be based on information regarding the use of qualifications of that type in the electronic marketplace (e.g., automatically tracked and collected information), such as by users and with tasks, and may be based on one or more of various specific frequency-related metrics such as total number of tasks having such qualifications, number of current tasks having such qualifications, total number of task performers having such qualifications, etc. While the example overview information in this table reflects use of qualifications with both tasks and task performer users, in other embodiments such information may instead be separated, such as is illustrated with respect to example embodiments in FIGS. 15B and 15C. In this example, column 1502d further reflects a qualification relevance measure based on a summary indication of a performance rating for a given qualification type, such as based on information reflecting one or more of a variety of metrics regarding performance of tasks by task performer users related to qualifications of that type (e.g., an average task performance throughput by task performer users with such qualifications, a percent acceptance rate by task performer users to perform tasks that have such qualifications, etc.). Column 1502c in this example reflects a qualification relevance measure based on a summary indication of a qualitative usefulness rating for a given qualification type, such as may be assessed based on human-generated feedback regarding that qualification type and/or qualifications of that type (whether directly regarding the qualification type, or instead that may be inferred based on feedback regarding users and/or tasks with which such qualifications are associated), and such as may reflect a degree to which possession of the qualification by a user reflects corresponding actual skills or abilities of the user. While not illustrated here, in at least some embodiments a user to whom the table 1500 is provided may further obtain more detailed information regarding the relevance measures 1502b-1502e and/or a particular qualification type, such as by selecting illustrated data to drill-down to underlying data and/or an indication of how the illustrated data was generated, and/or to obtain additional details such as a degree of uncertainty or confidence in a particular generated data value. Furthermore, column 1502f and row 1504f reflect that one or more additional columns (to reflect one or more of various other types of relevance measures, as discussed in greater detail below) and/or rows of data (to reflect one or more additional qualification types, or instead groupings of related qualification types) may be presented in other embodiments, and that some of the example data shown (such as particular types of relevance measures) may instead not be used in other embodiments.

FIG. 15B illustrates another example of assessment information related to qualification relevance, and in particular shows information for tasks that reflects use of qualifications with the tasks. Such information may provide indications regarding popularity and performance of given qualification types with respect to tasks (e.g., the popularity among task requesters users who specify qualifications of such types for their tasks, and the quality of task performance for tasks having qualifications of such types), and may be of use, for example, to task requester users who desire to obtain information about qualifications that would be beneficial to associate with their tasks (e.g., to prompt rapid and/or accurate performance by task performer users) and to task performer users who desire to obtain information about qualifications to potentially acquire (e.g., to qualify for additional tasks that are plentiful and/or rewarding). In this example, the illustrated table 1510 includes entries 1514b-1514e to reflect the same example qualification types discussed in FIG. 15A, and row 1514a is similarly a header row that contains cells that describe the contents of columns below, including Qualification Name 1512a, Total Number Of Tasks 1512b, Current Number Of Tasks 1512c, Percentage Acceptance Rate 1512d, and Average Completion Time 1512e. In particular, in this example the relevance-related measures for the qualification types include the Total Number Of Tasks 1512b (which illustrates the total number of tasks that have been created in the system that have associated qualifications of a given type), the Current Number Of Tasks 1512c (which illustrates the current number of such tasks that are available for performance or otherwise active, such as unassigned, uncompleted, completed but not yet accepted or rejected, etc.), the Percentage Acceptance Rate 1512d (which illustrates the percentage of such tasks that after completion by a task performer have been accepted by the task requester for the task), and the Average Completion Time 1512e (which illustrates the average time taken by task performers to complete such tasks). Such information may be automatically tracked and collected, such as by an Activity Tracking Manager module, and analyzed by a Relevance Assessment Manager module to generate the illustrated data. Column 1512f and row 1514f reflect that one or more additional columns (to reflect one or more of various other types of relevance measures, such as to reflect additional measures of accuracy or other quality of results provided for tasks using qualifications of a given type, compensation associated with tasks using qualifications of a given type, etc.) and/or rows of data (to reflect one or more additional qualification types, or instead groupings of related qualification types) may be presented in other embodiments, and that some of the example data shown (such as particular types of relevance measures) may instead not be used in other embodiments.

In a manner similar to FIG. 15B, FIG. 15C illustrates another example of assessment information related to qualification relevance, and in particular shows information for task performer users that reflects use of qualifications by such users. Such information may provide indications regarding popularity and performance of given qualification types with respect to task performer users (e.g., the popularity of qualifications of such types among task performer users who obtain such qualifications, and the quality of task performance by task performer users who have qualifications of such types), and may be of use, for example, to task performer users who desire to obtain information about qualifications to potentially acquire and to task requester users who desire to obtain information about qualifications that would be beneficial to associate with their tasks. In this example, the illustrated table 1520 includes entries 1524b-1524e to reflect the same example qualification types discussed in FIG. 15B, and row 1524a is similarly a header row that contains cells that describe the contents of columns below, including Qualification Name 1522a, Total Number Of Performers 1522b, Percentage Acceptance Rate 1522c, Average Task Completion Time 1522d, and Task Throughput 1522e. In particular, in this example the relevance-related measures for the qualification types include the Total Number Of Performers 1522b (which illustrates the total number of task performers in the system that have had associated qualifications of a given type), the Percentage Acceptance Rate 1522c (which illustrates the percentage of any tasks that after completion by such task performers have been accepted by the task requesters for the tasks), the Average Task Completion Time 1522d (which illustrates the average time for such task performers to complete any tasks), and the Task Throughput 1522e (which illustrates the average number of tasks completed per day by such task performers). Such information may be automatically tracked and collected, such as by an Activity Tracking Manager module, and analyzed by a Relevance Assessment Manager module to generate the illustrated data. Furthermore, column 1522f and row 1524f reflect that one or more additional columns (to reflect one or more of various other types of relevance measures, such as to reflect additional measures of accuracy or other quality of results provided by task performer users with qualifications of a given type, compensation earned by task performer users with qualifications of a given type, etc.) and/or rows of data (to reflect one or more additional qualification types, or instead groupings of related qualification types) may be presented in other embodiments, and that some of the example data shown (such as particular types of relevance measures) may instead not be used in other embodiments.

FIG. 15D illustrates another example of assessment information related to qualification relevance, and in particular shows summary information regarding human feedback provided for qualification types. Such information may provide indications regarding qualitative assessments of usefulness of given types of qualifications (e.g., with respect to accurately reflecting particular capabilities of users having qualifications of such types), and may be of use, for example, to task requester users who desire to obtain information about qualifications that would be beneficial to associate with their tasks and to task performer users who desire to obtain information about qualifications to potentially acquire. In this example, the illustrated table 1530 includes entries 1534b-1534e to reflect the same example qualification types previously discussed, and row 1534a is similarly a header row that contains cells that describe the contents of columns below, including Qualification Name 1532a, Average Usefulness Rating 1532b, Category 1532c, Number of Reviews 1532d, and Read Reviews 1532e. In particular, in this example the illustrated relevance-related measure for the qualification types is the Average Usefulness Rating 1532b (which illustrates an average "star" rating as awarded by a number of human reviewers), and additional information includes Category 1532c (which contains a description of a category or other grouping for a particular qualification type, such as may be determined in various ways, including by human reviewers or classifiers or by way of automated clustering or other techniques) and a Number Of Reviews 1532d (which illustrates the number of reviews available for a particular qualification type). The Read Reviews 1532e further provides a user-selectable control to request specific reviews available for a particular qualification type. Column 1532f and row 1534f reflect that one or more additional columns (to reflect one or more of various other types of relevance measures) and/or rows of data (to reflect one or more additional qualification types, or instead groupings of related qualification types) may be presented in other embodiments, and that some of the example data shown may instead not be used in other embodiments.

FIG. 15E illustrates an example of assessment information related to credibility of qualification issuers, and in particular shows information for qualification issuers in a manner similar to that in FIG. 15A for qualification types, such as may be based on aggregating various detailed assessment information (not shown) for the qualification issuers. Such qualification issuer credibility information may be of use, for example, to task requester users who desire to obtain information about qualifications that would be beneficial to associate with their tasks (e.g., to prompt accurate performance by task performer users) and to task performer users who desire to obtain information about qualifications to potentially acquire (e.g., to qualify for additional tasks that are rewarding). For purposes of illustration for this example, it is assumed that a user has requested relevance-related information for qualification issuers who issue qualifications related to the text string "Java," and the illustrated table 1540 generally contains high-level summary information related to credibility of such qualification issuers. The contents of the cells of header row 1544a are similar to those in Table 1500 shown in FIG. 15A, as are the rating values for the columns (which may be generated in manners similar to those discussed with respect to FIG. 15A), although the entries in rows 1544b-1544e reflect qualification issuers rather than qualification types. Furthermore, column 1542f and row 1544f reflect that one or more additional columns (to reflect one or more of various other types of relevance measures, as discussed in greater detail below) and/or rows of data (to reflect one or more additional qualification issuers, or instead groupings of related qualification issuers) may be presented in other embodiments, and that some of the example data shown (such as particular types of relevance measures) may instead not be used in other embodiments.

FIG. 15F illustrates another example of assessment information related to qualification issuer credibility and qualification relevance, and in particular shows a detailed view of information related to a single qualification issuer and to the qualifications issued by the particular issuer. Such information may be provided to a user, for example, in response to user selection of information regarding the qualification issuer shown in row 1544e of FIG. 15E (the "PPP Technical Training" qualification issuer) in such a manner as to request detailed information about that qualification issuer. In this example, the information 1550 contains detailed information in section 1551 related to the indicated qualification issuer, such as an overall rating, a total number of tasks having qualifications issued by this issuer, a total number of task performer users having qualifications issued by this issuer, a total number of task requester users that use qualifications issued by this issuer, and administrative information for the qualification issuer such as contact information and an inception date (or date that the qualification issuer first began interactions with the electronic marketplace). In addition, table 1552 provides various relevance-related information for five types of qualifications issued by this qualification issuer, in a manner similar to that previously described with respect to FIGS. 15A-15D. In particular, row 1556a is a header row and describes the information contained in the columns below, with Qualification Name 1554a containing the name of a qualification type, Category 1554b containing the category of a qualification type, Overall Rating 1554c containing an overall reliability rating of a qualification type, Issued To Performers 1554d containing an indication of the number of task performer users to whom qualifications of a qualification type have been issued, Acceptance Rate 1554e containing an indication of the average acceptance rate of completed tasks having qualifications of a qualification type that are accepted by task requesters, and illustrated user-selectable controls to request information about human-supplied reviews or other feedback for the qualification types. Furthermore, column 1554f and row 1556g reflect that one or more additional columns and/or rows of data may be presented in other embodiments, and that some of the example data shown may instead not be used in other embodiments.

Thus, various examples of assessment information for qualifications and qualification issuers have been illustrated with respect to FIGS. 15A-15F, although it will be appreciated that in other embodiments various additional types of assessment information may be used and at least some of the illustrated types of assessment information may not be used. Similarly, as discussed in greater detail elsewhere, such assessment information may be used in various ways in various embodiments, such as to be displayed or otherwise provided to users (e.g., at the request of the users, or instead in other manners, such as part of automatic recommendations).

Figure 16:
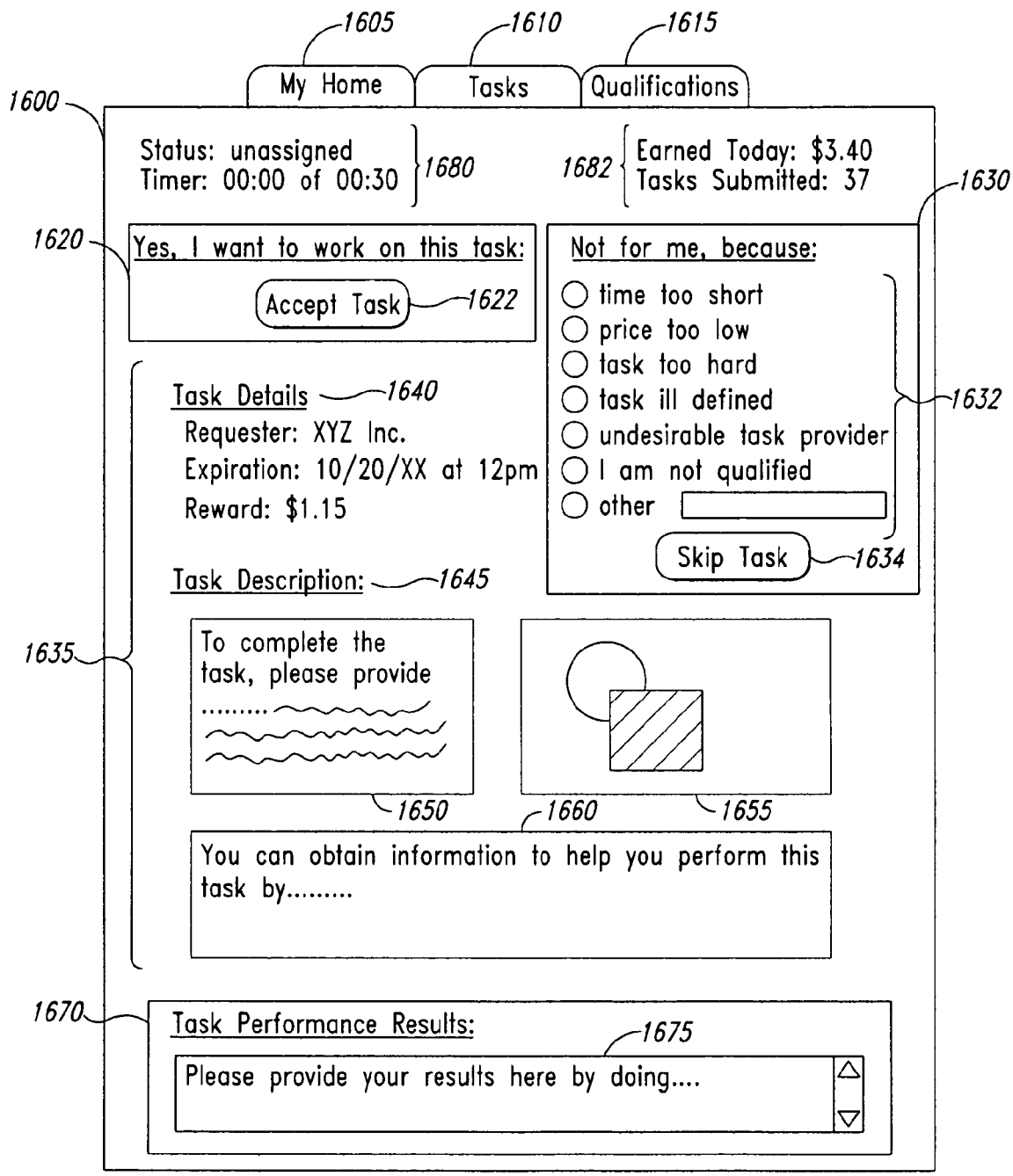
FIG. 16 illustrates an example of a user interface display for interacting with a potential task performer user during task selection.

FIG. 16 illustrates an example of a user interface display for interacting with a potential task performer or other user during task selection. In this example, a display 1600 contains various information to describe a task that is available for performance and to provide other information to a potential task performer user. In particular, the display includes a section 1680 that provides information about the status of the task (which in this example is not yet assigned to a task performer user for performance) and about the time remaining for a user to perform the task once it is accepted, with user-selectable control 1622 in section 1620 available to the user for use in accepting this task for performance. In addition, the display further includes information 1682 specific to the user, which in this example provides information regarding the total amount of tasks performed and money earned by the task performer user on the current day. Section 1635 provides various details about the available task, including task details 1640 (e.g., task requester information, associated price, task expiration date, etc.) and a task description 1645 that in this example includes instructions 1650 and written and image information 1660 and 1655 specific to this task. A section 1670 is also shown via which a task performer user can submit task performance results, such as via a text box 1675 in which a textual answer may be written (in other embodiments, task performance results may be provided in a variety of other manners, including radio buttons, checkboxes, buttons, switches, upload fields, etc.). In addition, in this example the display 1600 includes a task rejection section 1630 with a user-selectable control 1634 available to the user for use in rejecting this task, and further includes a rejection feedback section 1632 via which the user can optionally provide feedback regarding the user's rejection. In this example, the feedback includes a number of predefined rejection reasons and associated radio button controls and a text box for the user to provide one or more other reasons, although in other embodiments the feedback may be obtained in other manners, and in some embodiments may not be optional. In this manner, the system can obtain feedback from task performers regarding unaccepted tasks that are available on the system, which may be of use to the system and/or to the task requester. For example, the system may determine that a particular task (or group of tasks) is too difficult, inappropriately priced, too ill-defined, or too time-constrained by analyzing feedback provided by task performer users, and may accordingly in some embodiments take a variety of actions, including notifying the task requester, automatically modifying prices or deadlines associated with the task, etc. In this example, several user-selectable navigation tab controls are also shown to allow a user to view other available information in the system, such as information regarding available tasks (e.g., by searching or browsing) via the Tasks tab 1610, information regarding their own or available qualifications (e.g., by searching or browsing) via the Qualifications tab 1615, and overview information regarding the user's account or other status via the My Home tab 1605.

FIGS. 14A and 14B are a flow diagram of an embodiment of a Relevance Assessment Manager routine 1400. The routine may, for example, be provided by execution of an embodiment of the Relevance Assessment Manager module 151 of FIG. 1B, such as to receive information related to relevance of qualifications and/or credibility of qualification issuers or to receive requests for assessment information, and to handle the information and requests as appropriate.

The routine begins in step 1405, where an indication is received of information or a request related to qualification relevance and/or qualification issuer credibility. In step 1410, if it is determined that the received indication was information for use in relevance and/or credibility assessment, the routine continues to step 1415 and stores the information in an appropriate database or other data store for later analysis or other user. The information provided to the routine may come from a variety of sources, including human users who provide feedback (e.g., reviews, recommendations, or other types of manual assessments of qualification types and/or qualification issuers) and/or other system components via event notifications or other updates (e.g., from the User Qualification Manager 133 or the Task and User Matching Manager 132 modules, such as to indicate that a particular qualification has been issued to a particular user, that a particular task with a particular qualification has been submitted or accepted, that a particular timeout interval has passed, etc.).

If it was instead determined in step 1410 that the received indication was not received information, the routine continues instead to step 1420 to determine whether the received indication was a request for qualification relevance information, and if so continues to step 1462 to determine whether the received indication was for information based on task usage data (e.g., information such as the current or total number of tasks that have a particular qualification or one or more qualifications of an indicated group, the percentage of tasks having one or more indicated qualifications that when completed by task performers have been accepted by the requesters of the tasks, frequent co-occurrence of multiple qualifications with respect to tasks, etc.). If so, the routine proceeds to step 1464 and retrieves task usage-based relevance assessment information. Additional details regarding various kinds of task-based usage information are discussed elsewhere. After step 1464, or if it was instead determined in step 1462 that the received indication was not a request for information based on task usage data, the routine continues to step 1466 to determine whether the received indication was a request for information based on task performer user data. If so, the routine continues to step 1468 and retrieves task performer-based relevance assessment information as indicated, such as for task performer users who have one or more indicated qualifications (e.g., the total number of task performers that possess a given qualification, the average task completion time of task performers that possess a given qualification, etc.). Additional details regarding various kinds of task performer-based usage information are discussed elsewhere. After step 1468, or if it was instead determined in step 1466 that the received indication was not a request for information based on task performer data, the routine continues to step 1470 to determine whether the received indication was a request for information based on task requester data. If so, the routine continues to step 1472 and retrieves task requester-based relevance assessment information as indicated, such as for task requesters who have one or more indicated qualifications and/or who use one or more indicated qualifications with their tasks (e.g., the total number of task requesters that have submitted tasks having a given qualification, the kinds of other qualifications that have been considered by task requesters as alternatives or synonyms for a given qualification, etc.). Additional details regarding various kinds of task requester-based usage information are discussed elsewhere. After step 1472, or if it was instead determined in step 1470 that the received indication was not a request for information based on task requester usage data, the routine continues to step 1474 to determine whether the received indication was a request for human-generated relevance information for one or more indicated qualifications, such as feedback from users that is generally related to relevance of qualifications and/or to specific attributes or aspects of qualifications. If so, the routine continues to step 1476 and retrieves manual relevance assessment information. Additional details regarding various kinds of human-generated relevance information are discussed elsewhere.

If it was instead determined in step 1420 that the received request was not for qualification relevance assessment information, the routine continues to step 1422 to determine whether the received request was for qualification issuer credibility information, such as for one or more indicated qualification issuers (e.g., information that relates to the credibility, trustworthiness, or quality of a qualification issuer, such as from feedback from human users and/or automated data analysis, and including reviews, recommendations, and statistical or other analysis of underlying relevance data related to the qualification(s) issued by a particular qualification issuer). If so, the routine continues to step 1480 and retrieves qualification issuer credibility information as indicated. Additional details regarding various kinds of qualification issuer credibility information are discussed elsewhere. After steps 1476 or 1480, or if it was instead determined in step 1474 that the received indication was not a request for human-generated relevance assessment information, the routine continues to step 1478 and provides the information retrieved in one or more of steps 1464, 1468, 1472, 1476, and 1480 to a user from whom the request was received (or to one or more other designated recipients).

If it was instead determined in step 1422 that the received indication was not a request for qualification issuer credibility information, the routine continues to step 1425 to handles another indicated type of request as appropriate (e.g., requests for information regarding the credibility of other users that provide relevance or credibility information to the system, information related to trusted certifications granted by the system or other well-known users to particular other users that issue qualifications or otherwise provide relevance or credibility information, etc.). After steps 1425 or 1478, the routine continues to step 1430 to optionally process payment to or from the user based on the indication received in step 1405 (e.g., to provide payment or other compensation to a human user that provides desired feedback, such as reviews or other human-generated assessments of qualifications or qualification issuers, or to obtain payment from a user for providing requested assessment information, such as based on an indicated fee for such information). After step 1430, the routine continues to step 1435 and optionally performs housekeeping tasks of various types.

After step 1435, the routine continues to step 1440 to determine whether to perform automated assessment of qualification relevance and/or qualification issuer credibility, such as based on a periodic basis or in response to information stored in step 1415. If so, the routine continues to step 1445 and retrieves stored and/or current usage and feedback data (e.g., data related to the use or issuance of qualifications by task performers, task requesters, and qualification issuers), and in step 1450 analyzes the retrieved usage data to assess relevance and credibility in one or more of a variety of ways, as discussed elsewhere. After step 1450, or if it was instead determined in step 1440 not to perform automated relevance or credibility assessments, the routine continues to step 1455 to determine to continue. If so, the routine returns to step 1405, and if not continues to step 1499 and ends.

Thus, as previously noted, in at least some embodiments relevance of qualification types and/or qualifications may be assessed and related information may be provided to users, such as to allow task requesters and/or task performers to obtain information regarding qualifications to potentially use. Similarly, in at least some embodiments credibility of qualification issuers may be assessed and related information may be provided to users, such as to allow task requesters and/or task performers to obtain information regarding qualifications to potentially use. Accordingly, In at least some embodiments the TFF system provides various functionality to facilitate such assessments and to provide information of use to users, whether in exchange for payment or for free (e.g., in order to help establish a robust electronic marketplace for human performance of tasks). Alternatively, a subset of the information may be provided free of charge to ordinary users, while additional information (e.g., more specialized or detailed) may be provided for users who have purchased access to such information (e.g., via a higher "concierge" level of service).

In order to provide the above functionality related to assessing the relevance of qualifications, in some embodiments the system collects, organizes and analyzes a variety of information regarding the usage, popularity, usefulness, productivity, efficiency, profitability, or other quantitative or qualitative metrics related to qualifications. This information may be gathered or otherwise determined automatically by the system during execution and/or based at least in part on use of human feedback (possibly in exchange for payment or other compensation). Examples of the kinds of information the system may track and use when assessing the relevance of qualification types includes, but is not limited to, the following: combinations of qualifications that have been used together by task requesters with tasks that are submitted; combinations of qualifications that have been assigned together to particular task performers; qualifications that can be viewed as alternatives or synonyms for one another, such as based on multiple qualifications considered by task requesters for use with a task (qualifications that the task requester reviewed in detail while assigning qualifications to a task) before one or a subset of those qualifications are used, or on multiple qualifications considered by task performers to be obtained before one or a subset of those qualifications are so obtained; categories of qualifications, classifications of qualifications and/or other groups of qualifications related in one or more ways, whether automatically determined or as indicated by users; groups of, types of and/or attributes of task requesters that use indicated qualifications with their tasks; groups of, types of and/or attributes of task performers that have indicated qualifications; various metrics regarding frequency of use of given qualification types with and by tasks, task performers and/or task requesters (including the number of available, completed, or accepted tasks that have a given qualification, the number of task performers that currently have a given qualification, the number of task requesters that use a given qualification, etc.); and various metrics regarding efficiency, productivity, or profitability related to given qualifications (e.g., the percentage of completed tasks with a given qualification that are accepted by task requesters, the average number of tasks per unit time performed by task performers with a given qualification, the average time required to perform a single task by task performers with a given qualification, the amount of money earned by task performers with a given qualification, etc.). Furthermore, the system may provide various such information in various ways, including "top 10" (or other numbers) lists, recent trends or changes in metrics, with respect to personalized recommendations provided to users, etc. The system may further maintain and provide qualitative information that is generated by feedback from human evaluators, including but not limited to reviews, recommendations, ratings, or rankings.

In order to provide the above functionality related to assessing the credibility of qualification issuers, the system in some embodiments collects, organizes and analyzes a variety of information regarding the trustworthiness, popularity, prestige or other quantitative metrics or qualitative assessments related to qualification issuers. This information may be gathered or otherwise determined automatically by the system during execution and/or based at least in part on use of human feedback (possibly in exchange for payment or other compensation). Examples of the kinds of information the system may track and use when assessing the credibility of qualification issuers includes, but is not limited to, the following: various combinations of the data gathered or collected for use in determining the relevance of qualifications when considered with respect to the issuers of those qualifications (e.g., determining generalized performance metrics for qualification issuers by averaging the automatically determined metrics for each of the qualifications they issue, determining overall rankings for qualification issuers by averaging rankings for each of the qualifications they issue, etc.); qualitative assessments of the qualification issuers by other users such as task performer users and task requester users (including reviews, rankings, ratings, recommendations, etc.); manual or automatic assignment of certifications or seals of approval issued by the system or other well-known or trusted entities (e.g., third-party qualification issuer evaluators, system operators, etc.); by identity corroboration and/or reputation assessment for the qualification issuers; etc. Techniques related to generating and providing user reputation information and identity and other corroboration information that may be used in some embodiments for assessing credibility of qualification issuers are discussed in pending commonly-owned U.S. patent application Ser. No. 10/646,341, filed Aug. 22, 2003 and entitled "Managing Content Based On Reputation," U.S. patent application Ser. No. 11/165,842, filed Jun. 24, 2005 and entitled "Exchanging User Reputation Information," U.S. patent application Ser. No. 11/290,623, filed Nov. 30, 2005 and entitled "Assessing Content Based On Assessed Trust In Users," and U.S. patent application Ser. No. 11/024,006, filed Dec. 27, 2004 and entitled "Using Corroborated User Identities To Enhance Information Credibility," each of which is hereby incorporated by reference in its entirety.

In order to facilitate feedback from users regarding qualifications and/or qualification issuers, in some embodiments the system may provide additional functionality related to obtaining such feedback, including by requesting evaluations or assessments from users (e.g., accompanied by offering payment or other compensation for providing such feedback) or by otherwise performing audits or using other automated or manual forms of qualitative or quantitative data gathering, and providing such information to users of the system (possibly in exchange for a fee).

By providing the various assessment information related to qualification relevance and qualification issuer credibility, comparisons between qualification types and qualification issuers are facilitated, essentially providing a marketplace of qualifications that compete against each other based on relevance. Such comparisons may be further facilitated in situations in which qualification issuers charge for use of their qualifications by task requesters and/or task performers, with cost being another metric by which qualifications may be compared. Furthermore, access to such assessment information may further facilitate other uses of qualifications, such as to allow users to identify groups of related qualifications that may beneficial when used together, and providing information about such groups or further allowing users to issue new qualifications that each represent such a group of multiple other qualifications (e.g., for users that already issue some or all of the qualifications of the group, or instead for users unrelated to such other qualification issuers).

In addition, as previously noted, in at least some embodiments some qualifications of tasks and/or task performer users may be private to those task performers and/or to task requesters or other parties who issued those qualifications, such as to allow task requesters to limit information about and/or performance of their tasks to specified users in a manner that is not visible to other users who do not have those private qualifications. Accordingly, in at least some such embodiments task requesters or other qualification issuing parties may define private qualification types that can be used to create private networks of task requesters and task performers (as well as to potentially configure how such private qualifications will be used, such as the types of information to which such private qualifications will restrict access, who may use such private qualifications, etc.), while in other embodiments predefined private qualification types may be available to multiple such private qualification issuers but with the resulting issued private qualifications from an issuer being treated in a manner that is private to that issuer. A task requester may, for example, issue a private qualification to individual task performer users if they are known to be capable of performing certain tasks (e.g., due to successful performance on previous occasions of such tasks, due to successful completion by the task performers of a qualifying examination, due to the task performers meeting some other criteria of the task requester, etc.) and associate those same private qualifications with corresponding tasks, and the system will then restrict other users' access to information about those tasks unless they have the appropriate, matching private qualification. For example, a task performer or other user who searches or browses for tasks would not be shown any information (or in other embodiments, such as depending on configuration, only limited information) about tasks that have associated private qualifications not held by the task performer or other user. Such functionality may be used to limit competitors' access to information regarding the activities of a particular task requester, as well as to prevent other task performer users from asserting private qualifications to which they are not entitled. Moreover, in some embodiments, the system may also be configured to restrict information about a private qualification even to task performers to whom that private qualification has been issued. Furthermore, in some embodiments, the system may also be configured to utilize private qualifications to restrict access to information about other features, components, or aspects of the system (e.g., users, qualification types, qualifications held by users, qualifications issued by qualification issuers, etc.), such as by associating a private qualification with information to which access is restricted, as well as by optionally specifying criteria to indicate the manner or type of the access restriction. For example, information about which users hold an indicated non-private qualification may be limited to those users who hold an associated private qualification, or information about the qualifications held by an indicated user may similarly be limited to those users who hold an associated private qualification. In addition, in some embodiments users may seek to obtain private qualifications in various ways, such as by requesting the system and/or an issuer to provide a private qualification, by purchasing a private qualification from the system and/or a party that defines, issues, and/or asserts private qualifications, by purchasing information from the system and/or another party to indicate one or more private qualifications that are in use with the system or otherwise available, etc.

More generally, in at least some embodiments the ability to assert or issue at least some private qualifications may further be restricted, whether by default or in a manner configured by a party who defines a private qualification or who uses private qualifications with tasks being submitted, such as to allow only a task requester who submits a task to assert private qualifications for that task, or to allow only a party who defines a private qualification type to assert or issue private qualifications of that type (or to configure who is able to issue such private qualifications). In addition, various means for revoking or modifying private qualifications once they have been issued to users or associated with tasks may be provided in at least some embodiments, and may similarly be restricted to particular party or in other manners. For example, some embodiments may provide for the automatic expiration of private qualifications for task performer users at a certain time or when specified criteria are satisfied. Other embodiments may have users perform periodic qualification examinations or other specified activities in order to maintain some or all private qualifications.

As previously noted, a variety of types of tasks can be submitted and performed in various embodiments, and may include tasks that involve a variety of types of activities by human task performers, such as analysis of one or more supplied pieces of information (e.g., to translate a supplied word or paragraph, to select which of several supplied photographs best represents a specified subject matter, or to identify whether a supplied human signature is authentic, such as by comparison to a known sample and/or on another basis), or retrieval or identification of desired information. In some embodiments the tasks may each require little time of the human task performer (e.g., at most a few seconds), while in other embodiments tasks may be sufficiently complex to take significant amounts of time (e.g., hours or days). In addition, while in some embodiments each of the tasks may be a cognitive human performance task that uses cognitive and/or other mental capabilities of human task performers, in other embodiments some or all of the tasks may include physical activities by one or more human task performers (e.g., to take and supply a specified type of picture), whether instead of or in addition to one or more cognitive or other mental activities of one or more human task performers.

In addition, in some embodiments each task may be a stand-alone activity that is unrelated to other tasks, while in other embodiments some tasks may each be a small part of a larger collective, such as to allow a large number of unrelated human task performers to perform a time-consuming collective task in parallel in a very short time (e.g., without the individual task performers even being aware that the individual tasks are part of a larger collective task), such as in a manner analogous to grid computing. When individuals tasks are part of a larger collective task, a single task requester may in some situations collect and aggregate or analyze the individual results, while in other situations some or all of the aggregation or analysis activities may instead be one or more other tasks made available through the electronic marketplace. Other information related to users performing tasks is included in pending commonly-owned U.S. patent application Ser. No. 09/976,717, filed Oct. 12, 2001 and entitled "A Hybrid Machine/Human Computing Arrangement."

A non-exclusive list of examples of types of human performance tasks that may be performed via the electronic marketplace include the following: translation or conversion of information of various forms (e.g., text, speech and other audio, images and other video, etc.) between languages and/or information form (e.g., transcription of audio material); selection of one or more groups of visual information (e.g., photographs or other images) and/or audio information (e.g., songs, voice messages, etc.) that satisfy a specified criteria (e.g., to identify groups that are similar, that have specified characteristics, etc.); supplying answers to specified questions (e.g., to obtain information for use in research, for marketing purposes, for use as feedback, for use with computer-human interface and other types of user studies, for use as pre-release and/or post-release reviews of or reactions to products and/or content, etc.) and/or supplying other types of specified information (e.g., a missing description for a specified item available from a Web store); outsourced tasks of various types (e.g., engineering, marketing, sales, customer support, etc.); and analysis of content of various forms of information to identify specified types of content (e.g., spam, pornography and other obscene or offensive material, etc.) and/or to otherwise categorize the information (e.g., according to a predefined taxonomy; based on a determined source or other aspect of the information; etc.). When information is to be analyzed as part of a task, that information can be provided to a task performer in a variety of ways, such as from the TFF system along with other task-related information, by providing a link or other indicator to the task performer to allow the task performer to retrieve the information (e.g., from the TFF system, from the task requester for the task, from a location or source external to the TFF system, etc.).

As one specific example, a task requester may submit tasks on behalf of a store (e.g., a Web store) that each request at least two human task performers to submit a specified type of data that is missing for one or more items offered by the store (e.g., performance specifications for a stereo). The first two human task performers that submit the same (or sufficiently similar) data for a task will each receive payment (e.g., $0.25), thus providing information with some degree of reliability in a manner that minimizes overhead for the task performers and the task requester. As another examples, tasks may include analyzing results of task performance from other task performers, such as to corroborate or verify the accuracy or other aspect of interest of the results (e.g., to have a human task performer with a higher level or qualification and/or additional qualifications review the results from less-qualified task performers), to compare results from multiple task performers for the same or related tasks (e.g., to compare performance of human task performers to automated task performers, such as for research purposes, or to compare performance of different groups of human task performers), to analyze results in an attempt to determine whether the task performer is human or not (e.g., for research purposes, or to verify or corroborate the identity and/or qualifications of a task performer), etc.

As previously noted, in some embodiments a variety of types of user qualifications can be specified and used, and may further in some embodiments each be associated with a specified qualification type. Such qualification types may include a variety of associated information in various embodiments, including a name (e.g., for later reference purposes), a rating scale to indicate allowed values (e.g., any floating point number, true/false, an enumerated ranked set of values, etc.), indications of one or more entities or entity types who may issue specific qualifications of the qualification type to users, expiration conditions (e.g., an expiration date/time) or other indications of how and when qualifications of the type are effective, an indication of the user (e.g., a unique user identifier) who specified the qualification type (e.g., to limit who can modify, delete and/or view information about the qualification type), etc. In some embodiments, each qualification may be stored in or as part of a qualification data structure that may contain some or all of the indicated types of associated information, whether using a qualification data structure specific to a specified qualification type or independent of any specific qualification type. In addition, for embodiments in which multiple instances or versions of the TFF system are operating, or in which other types of systems with overlapping types of functionality may interact, the specified qualification types may further have an associated indication of the system at which the qualification type is specified. Moreover, in some embodiments users may be allowed to define new qualification types for use within the system.

As previously noted, task performer qualifications can also take various forms in various embodiments, including self-assertions by a user of qualifications that they possess, human-generated ratings of human task performers by other humans based on prior task performances by the task performers (e.g., feedback from task requesters who supplied the tasks and/or ratings by other reviewers of the past performances), and credentials supplied by third-party authorities (e.g., educational degrees or other accomplishments from specified educational institutions, awards and other recognitions from specified organizations or contests, recognitions of levels of training or knowledge, etc.). One form of credential that may be used in some embodiments is a reputation or other rating of a user that is supplied by a third party as a service, such as for a fee. A discussion of techniques related to generating and providing user rating information that could be used in some embodiments for user qualifications is included in pending commonly-owned U.S. patent application Ser. No. 10/646,341, filed Aug. 22, 2003 and entitled "Managing Content Based On Reputation," which is hereby incorporated by reference in its entirety.

Task performer qualifications may also include various quantitative measurements by the electronic marketplace of tracked activities of human task performers, including measurements related to a specific task, average and/or cumulative measurements over a specified group of multiple tasks and/or a specified period of time, and information about a rate of change for one or more measurements over one or more specified periods of time. A non-exclusive list of types of measurements that may be used in various embodiments include the number of tasks assigned to a task performer, the number or percentage of tasks assigned to a task performer that are completed, the number or percentage of tasks completed by a task performer that are approved or rejected (e.g., by the task requester), the number or percentage of assigned tasks that are explicitly abandoned (or "dropped") by a task performer before completion, the number or percentage of assigned tasks that are withdrawn from a human task performer before completion (e.g., by the electronic marketplace for failure to complete the task within a specified time limit), the number or percentage of tasks that are offered to a task performer that are refused (if an embodiment includes offering tasks to task performers), an amount of time, taken before performing assigned tasks (e.g., an average or distribution over time), etc. In some embodiments, task requesters may also be given qualifications based on quantitative measurements by the electronic marketplace of tracked activities, such as the number of submitted available tasks from a task requester, the number or percentage of submitted tasks that are removed before assignment by a task requester, the number or percentage of completed tasks that are approved or rejected by a task requester, the number or percentage of submitted tasks that are modified by a task requester, the timeliness of a task requester in providing payment when due, etc. In addition, in some embodiments task performers may be able to provide qualifications for task requesters by rating them, such as for task performers that have been involved in performance of tasks submitted by those task requesters. Such ratings may be based on, for example, the reasonableness of the task requester in categorizing their submitted tasks, in providing appropriate compensation for the level of task difficulty, in providing payment after satisfactory task results are provided, etc.

In some embodiments, the electronic marketplace may also provide rankings of task performers relative to other task performers on the basis of one or more of the various types of qualifications, and a task performer's ranking level could further be used as a qualification (e.g., a performer in the top 10% for a specified quantitative measurement). More generally, a performer qualification can in some embodiments include any information about a performer that can be measured or identified.

Thus, as previously noted, a variety of types of information may serve as qualifications in some embodiments. More generally, in some embodiments any user may specify any qualification for any user (including themselves), with the qualification measuring any dimension or aspect, using any rating scale, and may further include objective and/or subjective qualifications. The meaning or context of a qualification may in some embodiments be maintained externally to the TFF system (e.g., by the issuers of the qualifications and/or task requesters that use them as criteria for tasks being submitted), such that the TFF system performs tracking of and matching of qualifications as arbitrary data values without knowledge or use of the meaning of the qualifications. Thus, in such embodiments any user can act as their own issuing authority to issue qualifications, and to later use the qualifications by searching for users that have them and/or tasks that include them in their task criteria. In addition, in some embodiments qualifications may be issued to and used for entities that are not directly associated with users of the TFF system, such as qualifications for various types of third-party entities (e.g., issuers of qualifications).

In addition, in some embodiments the activities of users with other systems may be used as qualifications or in other manners, such as based on importing data from such other systems. For example, in some embodiments the TFF system may be affiliated with or otherwise receive information related to shopping-related activities of users, such as with a Web retailer or other online merchant. Types of information that may be obtained and used from a retailer's system include the user's browsing history, search history, clickstream history, click-through history, purchase or rental history, payment and/or credit history, returns history, history of service-related activities (e.g., frequency and number of calls to customer service), use of discounts and purchase incentives, contributions of content and/or information (including various details about such contributions, such as length, subject matter, frequency of submission, quality as judged by other users, etc.) provided by the user (e.g., reviews of items, lists or groups of items of interest, etc.), participation in various community-based features, reputation within the system (e.g., based on voting or other rating by other users), browser and browsing device used, etc. Similarly, qualification and other information from the TFF system may in some embodiments be able to be exported to other systems for use by those other systems. In addition, when such types of information are available, they can also be used in other ways. For example, if recommendation information is available for a user based on a relationship of the user to other users, such recommendation information may be used as qualification information for the user (e.g., this user is likely to want to do tasks of a certain type) and/or to recommend tasks to a task performer (e.g., other task performers similar to you perform tasks of this type).

A non-exclusive list of various example qualifications includes the following:

C++ programming Level 2 test certification, issued by Professor Bob Smith of Stanford University, test score 95% (Jan. 13, 2005, 10:03 GMT; expires 5 years from issuance)

C++ programming recommendation certificate, issued by Kernighan & Ritchie, "Expert" rating (Jan. 13, 2005, 10:03 GMT; no expiration date)

Able to distinguish pornography from non-pornography according to community standards prevalent in St. Louis, Mo., issued by myself, "I know it when I see it" (Jun. 27, 2006, 14:18 PDT)

Completes tasks requiring a self-issued "Able to distinguish pornography from non-pornography according to community standards prevalent in St. Louis, Mo." qualification with over 90% acceptance rate, issued by TFF system, 1000 tasks completed with acceptance rate of 98% (Jun. 27, 2006, 14:18 GMT, based on performance results in TFF system from Jan. 14, 2005, 9:00 GMT through the present)

Dialysis patient unable to eat solid food, issued by the Mayo Clinic, (no value) (Jan. 15, 2005, 22:47 EST)

Scholastic Aptitude Test taken, issued by Educational Testing Service, Princeton, N.J., scores verbal=508, math=518 (Oct. 1, 2004, expiry date 6 years from issuance)

Qualified to practice law in the state of California, issued by the State Bar of California, "active member" and "member in good standing" (Oct. 3, 2004; date of bar admission May 15, 1994; continued status contingent on compliance with continuing legal education requirement, with next compliance period ending on or before Jan. 31, 2005).

Has published at least two reviews of popular English-language novels in The New York Times Book Review, issued by The New York Times, total number of such reviews published by the reviewer to date (Jun. 15, 2005, 12:01 EDT).

Is a considerate person, issued by Jeanette Smith of Geneva, Switzerland, "très sympa" (Feb. 29, 2004, 12:32 CET).

Information about qualification-related activities can also be tracked and stored in various ways. For example, performance-related qualification scores could be tracked for all tasks, regardless of task type and/or required qualifications. Alternatively, activities could be tracked for particular types of tasks or groups of related tasks (e.g., to determine that a task performer completes tasks with qualification 'A' 95% of the time but completes tasks with qualification 'B' only 80% of the time). Similarly, activities could be tracked for categories of tasks, such as to determine that a task performer completes 'pornography identification' tasks correctly 100% of the time, but only completes 'czech-english translation' tasks satisfactorily 80% of the time.

When searching for information related to qualifications and/or tasks, the TFF system in some embodiments allows a variety of types of searches to be performed. A non-exclusive list of example searches that a user could execute includes the following:

All tasks that I created/accepted, and status/progress of same (e.g., by a task requester and/or task performer)

All tasks currently available for acceptance, including the necessary qualifications for each task and the payment/reward for each (e.g., by a task performer)

All qualification types in the system that have been added in the last 24 hours (e.g., by any user)

All users to whom new qualifications have been issued in the last week (e.g., by any user with sufficient permissions)

All users having a nickname attribute with a value of "Jill" (e.g., by anyone with sufficient permissions to see user nicknames)

Which available tasks have prices <$1? How many task performers currently in the system and not currently working on a task would qualify for one or more of these tasks? (e.g., by a task requester)

How many task requesters of available tasks have qualification B? (e.g., by a task performer, such as a task performer who will only do tasks from certain task requesters)

How many users have qualifications X and (Y or Z) but not W? Of these, which ones have qualification X with a value above 90%? (e.g., by anyone)

Which task performers completed tasks requiring qualification X this week? What percent of their total completed tasks were approved by the requesters? (e.g., by anyone)

Of all qualification types containing "C++" in the name field, what percent were created in the twelve-month period ending Jun. 30, 2004? (e.g., by anyone)

How many qualifications containing the string "St. Louis" in their name were issued last month by or on behalf of Issuer ABC? (e.g., by anyone)

In some embodiments, the system further provides functionality to assist in authenticating or otherwise corroborating information about users, such as identities of users, specified qualifications of users, and other kinds of attributes of users. In particular, various information may be obtained and used to serve as evidence to corroborate one or more pieces of information about users, such as by obtaining information about a user's past activities (e.g., feedback and/or rating information related to the activities), "testimonials" or other assertions from others as to the accuracy of information about a user, information about a user's reputation, information about a user's status within a community or group (e.g., a social networking group), and more generally any observable indicia that can serve to corroborate user information. The corroborative information may be obtained in various ways, including from third-party sources and/or from a user whose information is being corroborated, and the obtaining of the corroborative information may be initiated in various ways, including as initiated by a user who is supplying corroborative information and/or initiated in an automated manner (e.g., based on a need for the corroborative information). In addition, in some embodiments corroboration is further enhanced by using additional techniques, such as by monitoring activities of a user and/or by occasionally challenging a user (e.g., by giving the user a short test) to verify information about the user (e.g., to obtain information to confirm or contradict a user's qualifications and/or identity).

As one example of corroborating users' identities based on evidence or other information from third parties, the third party may be an issuer of credit cards and/or debit cards, with such a card providing evidence that the cardholder name on the card is the actual name of the cardholder. A variety of other types of evidence or information associated with third parties may similarly be used to provide information about a user's identity, including information about a bank account or other financial account of a user, government-issued information for a user (e.g., a driver's license, passport, social security number, voting identity card, etc.), other government records (e.g., property records), etc. In such situations, a user may obtain such evidence from the third party and later provide the evidence to the system, or alternatively the system may in some embodiments directly interact with a third party to obtain such evidence for a user. For example, the system may interact with a third-party card issuer or government agency, or instead with a third party that provides a service involving verifying users' actual identities based on appropriate evidence and then providing assurances of the verified actual identity information to others upon request.

As previously noted, various types of evidence or other corroborative information related to users' identities can be obtained in various ways in various embodiments, and can be used in various ways to identify and/or corroborate a user's identity. For example, in some embodiments information about a user's identity may be obtained by using information stored by a telephone service provider. In some such embodiments, a user may be provided with a toll-free number of a system performing identity corroboration activities, and when the user calls that toll-free number, the entity can gather user identity information provided by the telephone service provider with that call (e.g., a number from which the user is calling and a name associated with that number), such as for use in corroborating an actual name that the user previously provided. Information may be gathered about users in similar manners from other third parties that have similar information, such as by using Caller ID technology with non-toll-free numbers, doing a reverse number lookup on a phone number provided by a user in order to identify the name of the user associated with that phone number, gathering information about a user based on an electronic communication sent by the user (e.g., based on an email address used by the user, a domain name of the user, an instant messaging or other message sender identity, etc.), and/or gathering information stored by other providers of services to the user (e.g., an Internet Service Provider, utility companies, educational institutions, medical facilities, etc.). More generally, in some embodiments the system may provide a predefined API and/or one or more Web services via which others can provide corroborative and other information about users.

In some embodiments, information about users' identities may further be obtained and/or corroborated based on groups to which the users belong and/or other affiliations of the users. For example, a user may be able to demonstrate membership or other affiliation with a group or organization that provides publicly available information about its members or other affiliated users, thus providing some corroboration that the user's asserted identity is accurate based on the asserted identity being in the publicly available membership or affiliation information. Alternatively, a user may be part of a social networking group or other group of users such that one or more other users of the group will attest to an identity of the user. In such embodiments, a user may provide contact and other information about one or more of such other users (e.g., email addresses), and a system performing identity corroboration activities may then use the provided information to assist in corroborating the user's identity, such as by using the contact information to query those other users to provide corroborative statements or other information about the user's identity. In addition, when information from other users is used to corroborate information about a user (e.g., based on a social networking group), an additional factor that may be considered is whether a group of users is merely acting as a self-corroborating body such that users of the group are corroborated only by each other, or whether other external evidence is available to provide additional corroboration.

After corroborative information is obtained, it may be used in various ways. In some embodiments, one or more pieces of corroborative information for a piece of user information (e.g., a user qualification) may be presented or otherwise provided with the user information, such as to allow the recipient of the user information to evaluate its accuracy, credibility and reliability based on the associated corroborative information. In other embodiments, the system may attempt to automatically assess the corroborative information in order to determine a confidence level or value or other assessment of the user information being corroborated, such as based on a type of the corroborative information, a degree of correspondence between the corroborative information and the information being corroborated, and/or on the source of the corroborative information (e.g., to affect the weight given the corroborative information, such as based on a reputation of the source). In addition, in some embodiments some of the types of corroboration-related activities may be performed for a fee, such as from the user whose information is being corroborated.

A particular type of performer qualification that is available in some embodiments relates to performance of a human task performer on one or more qualifying examinations. For example, a task requester who plans to submit multiple tasks of a similar type may first create a task with a known or desired performance result. That task may then be made available via the electronic marketplace as a qualifying examination task for performance by human task performers that are interested in performing other later tasks for the task requester. After a human task performer provides results for the qualifying examination task, those results can be graded relative to the known or desired results in order to determine whether and/or at what level the human task performer can successfully perform the task. A specified level of performance for the qualifying examination task (e.g., having a minimum specified score, or scoring at a minimum percentile relative to other human task performers) can then be used as a performer qualification criteria for later tasks by that task requester. Such qualifying examination tasks can be performed in various ways in various embodiments, including with or without a fee paid to successful performers of the task, with a fee paid by task performers for a task performance attempt and/or completion, as a task available to any task performers or to only task performers that meet other specified criteria (e.g., a first specified number of human task performers to successfully pass the test, to human task performers who have other specified qualifications, etc.), and as a task that is explicitly identified to task performers as a qualifying examination or that is not identified as such.

In addition to performer qualification criteria, task requesters can also specify a variety of other types of criteria for tasks. For example, in some embodiments task requesters may specify criteria related to when a task is to be performed, such as an expiration time period for initial assignment to a human task performer and/or an expiration time limit for a human task performer to provide results of task performance after a task has been assigned to them. A task requester may also in some embodiments specify information about a format in which results are to be supplied, including by supplying information to the task performer related to the results format (e.g., a response form to be completed by the human task performer, or an executable results program that the human task performer is to use to provide results and/or to perform the task). The performer qualification criteria and other types of criteria can also be specified in various forms, including as an exact match and as a minimum or maximum threshold, and for various activities related to a task (e.g., to allow task assignment; to verify performance results as being satisfactory; to determine whether a value of a task performer's qualification is sufficient, such as based on a generated confidence level or value for appropriateness of the qualification value; to determine whether a task performer's qualification is sufficiently corroborated, such as based on a generated confidence level or value based on a degree or amount of corroboration; etc.). Such thresholds may also be specified by other users (e.g., task performers) and/or automatically by the TFF system in other situations and embodiments.

In addition, in some embodiments task requesters may supply additional task-related information to assist task performers in identifying appropriate or interesting tasks, such as one or more categories for the task (e.g., based on a type of the task) and/or one or more keywords corresponding to the task. Such category and/or keyword information can then later be used by task performers when searching for and/or browsing for tasks of interest. In other embodiments, such category and/or keyword information may instead be automatically generated by the electronic marketplace based on analysis of information related to the task (e.g., by using a textual description of the task provided by the task requester, by using historical information about tasks supplied by task requesters, by using information that is supplied with the task to be analyzed, by using information about criteria specified for the task, etc.).

As previously noted, in at least some embodiments the task requests may also each specify one or more fees to be paid by the task requester to one or more task performers for successful performance of a task. In such embodiments, the fee can be specified to be paid under any of a variety of circumstances, including in a manner related to a specified state of a task (e.g., to the first task performer whose performance results are explicitly accepted by the task requester, to the first task performer whose performance results are automatically accepted by the electronic marketplace, to the first task performer who supplies performance results to the electronic marketplace, to the first task performer to whom a requested task is assigned, etc.). In other situations, multiple task performers may receive payment for performance of a task, such as the first X task performers that provide results (where X is a specified number by the task requester), multiple task performers whose results are in agreement and form a specified level (e.g., a majority) of performance results from X task performers, etc.

In other embodiments, payment for task requests can be determined in other ways, such as based on bidding by task performers (e.g., as part of a standard or Dutch auction), as a variable rate that is dependent on a degree or amount of success in providing satisfactory performance results, etc. In addition, in some embodiments the task requester may allow the electronic marketplace to specify the associated payment for a task (e.g., for a fee), such as based on a category of the task, on dynamic pricing based on current conditions at the time of task request, as part of a premium service for which the electronic marketplace guarantees some aspects of the results (e.g., a maximum time to receive performance results, a minimum level of performance results, etc.). Moreover, in some embodiments the system provides information to task requesters to assist them in manually pricing tasks, such as by providing historical pricing information for tasks of the same type or for other related tasks, by providing summary information about current pricing and current pricing trends, etc.

After payment is determined to be provided to one or more task performers for a task, the payment can be made in a variety of ways. In some embodiments the electronic marketplace or an associated system may provide accounts to task requester and/or task performer users, and if so payments may be made from those accounts of task requesters and/or to those accounts of task performers. In other embodiments, the electronic marketplace may also interact with third-party systems in order to effect payment, such as credit card companies, banks, etc. In addition, in some embodiments a variety of other types of payments could be made, whether in addition to or instead of payments from task requesters to task performers, such as payments to the electronic marketplace from task requesters and/or task performers for any of the functionality provided by the electronic marketplace, and/or such as payments to task requesters from task performers for performing tasks of the task requesters. More generally, in some embodiments payments and other rewards can be specified to flow from any one or more parties to any one or more other parties, whether task performers, task requesters, the TFF system, external parties, etc. A discussion of payment-related techniques that could be used to make payments in some embodiments is included in U.S. patent application Ser. No. 10/894,347, filed Jul. 19, 2004 and entitled "Automatic Authorization Of Programmatic Transactions," which is hereby incorporated by reference in its entirety.

After a task request has been submitted to the electronic marketplace, task performers can obtain information about available tasks in a variety of ways. In some embodiments, task performers will make requests to the electronic marketplace to identify tasks that are currently available that meet specified indicia, such as all currently available tasks or tasks whose specified qualification criteria are satisfied by the current qualifications of the task performer. While some such task information requests may be made interactively in some embodiments, in other embodiments at least some such requests may instead be made in a programmatic manner, such as by using a specialized program or instructions (e.g., a client-side program, macro, plug-in, etc.) that is designed to retrieve such information for a task performer (e.g., that is obtained from the electronic marketplace or from a task requester for their tasks). In addition to searching for a task based on qualifications of the task performer, the task performers can also specify a variety of other types of information about tasks to identify, such as tasks available from specified task requesters, tasks in specified categories or having specified keywords, tasks having specified associated payments or other associated criteria (e.g., expiration date), tasks from task requesters who satisfy specified requester qualification criteria, etc.

In addition to searching for tasks, task performers can also request that tasks be assigned to them in various ways, such as by identifying one or more specific tasks of interest and/or by identifying tasks that meet specified conditions (e.g., based on task criteria, an associated reward for a task, information about or an identity of a task requester who submitted the task, etc.). After a task has been assigned to a task performer, the task performer may then interact with the electronic marketplace (whether interactively or programmatically) to provide performance results information based on performance of the task. In addition, in some embodiments a task performer may specify in various ways that they desire to receive a string of assignments of related tasks, such as tasks of a specified task type. By creating such a "pipeline" of incoming tasks, the task performer may be able to perform the tasks more efficiently (e.g., if sufficient tasks are assigned to a task performer to allow them to constantly have a queue of available tasks to be performed), and correspondingly may be charged a fee in some embodiments for receiving such functionality. The creation of such a string of task assignments may be performed in various ways, such as by registering a notification and/or assignment request with the TFF system for a specified type of task, by repeatedly executing a search or assignment request with the TFF for a specified type of task, by using an application program to automatically perform such repeated searches, etc.

In some embodiments, the determination of whether a task is to be assigned to a task performer is based at least in part on information specified for the task by the task requester. For example, each task may allow a specified number (e.g., one) of simultaneous or sequential assignments of a task to task performers. Moreover, in some embodiments an assignment of a task is made in such a manner as to lock that assignment (e.g., for a specified period of time) so that it is not available to other task performers, while in other embodiments such locking may not be performed. Thus, for example, if a task requester desired results as soon as possible and was willing to pay only the first human task performer who provided satisfactory results, the task requester could specify that the task be made available to any number of human task performers and that it not be locked upon assignment, resulting in a race between task performers to be the first to supply successful results. Alternatively, the task requester may instead desire satisfactory results from only a single task performer but may provide for the task to be locked after it is assigned to a human task performer to allow them a specified amount of time (e.g., a minute or a day) to provide satisfactory results before the task will be made available to other task performers.

As another example, the task requester may desire responses from multiple task performers (e.g., to enable comparison of multiple responses as an automated accuracy check), and if so may allow a specified number of simultaneous assignments (e.g., corresponding to the number of desired responses). When responses from multiple human task performers are obtained, they can be used in various ways, such as to generate an average of the various results, to identify results that are agreed upon by all or by a majority or by a median number, etc. In addition, in such situations the multiple task performers can be paid in various ways, such as to provide the same payment to all task performers who provided results, to provide payment only to task performers whose results were determined to be accurate or otherwise used (e.g., based on them being in a majority of the results), to pay differing amounts to different task performers (e.g., based on determined accuracy of the results, or promptness of providing the results), etc.

After a task performer has completed performance of a task and submitted the results of task performance to the electronic marketplace, the results are handled in a manner specified by the task requester. For example, in some embodiments such task results for a task may be immediately forwarded to the task requester for the task, while in other embodiments the task results may be stored until the task requester retrieves them (e.g., after receiving notification from the electronic marketplace of their availability). In addition, in some embodiments the task requester may have specified one or more criteria related to evaluating whether the performance results are satisfactory, and if so the electronic marketplace system may automatically perform such result verification based on those criteria before providing the results to the task requester. In some embodiments, the task requester will further receive additional information related to performance of the task, such as information about the identity of the task performer, while in other embodiments such additional information may not be available to the task requester.

As previously noted, in some embodiments payment to the human task performers will also be triggered by one or more activities related to the performance results, such as the supplying of the task results by the task performer or the approval of the task results by the task requester and/or automated task verification activities. In addition, in some embodiments after task performance results are provided by task performers, the task requesters for those tasks may further be queried to provide human-generated ratings for the task performers (e.g., for use in qualification determinations for those task performers), such as related to adequacy and timeliness of the performance results, while in other embodiments the electronic marketplace could instead receive any such feedback information from the task requesters even when not explicitly solicited. Similarly, in some embodiments task performers may provide rating and other feedback information for task requesters that may be used for qualification determinations for those task requesters (whether in response to queries or otherwise), such as related to promptness and adequacy of payment, sufficiency of the description of the task, etc.

In embodiments in which quantitative measurements are made of task performers and/or task requesters, such as for use as qualifications for those users, the electronic marketplace system further performs a variety of types of tracking activities in order to gather information for those quantitative measurements. In particular, in some embodiments each activity of a task performer and/or task requester relative to a task is recorded and can be used as a quantitative measurement. In addition, at least some such tracking information can also be used for other purposes in at least some embodiments, such as to determine availability of and load on the electronic marketplace (e.g., to determine whether additional computing resources are needed or whether current computing resources are underutilized).

In addition to providing task information to task performers in response to requests, the electronic marketplace may in some embodiments provide functionality to automatically match task performers and new tasks as they become available, such as for a fee (e.g., a fixed amount, or a percentage of any payment provided to the task performer if they complete a task for which they are notified). For example, if a human task performer has previously supplied qualification information and/or preference information regarding tasks of interest (e.g., tasks in specified categories, having specified key words, from specified task requesters, from requesters having specified qualifications, etc.), such as during an initial registration process, the electronic marketplace can perform automated matching for new tasks that are submitted in order to determine whether the human task performer satisfies any specified criteria for the task and would desire to be notified of the task. If so, the electronic marketplace can notify the task performer in a variety of ways, such as based on previously provided preference information regarding how and when they are to be notified. In addition, in some embodiments the automated matching may further automatically assign new tasks to appropriate task performers (e.g., in accordance with preference information specified by the performers), including locking the task assignments if appropriate for the task. In other embodiments, task performers may receive similar functionality using third-party functionality, such as an automated program that obtains information about new tasks from the electronic marketplace (e.g., based on polling) and performs the automated matching functionality for those new tasks on behalf of one or more of the task performers.

Matching of tasks and task performers may be provided in a variety of ways. For example, in some embodiments matching will be performed in a bi-directional manner, such as when tasks have criteria for task performers and task performers have conditions for tasks (e.g., attributes of the task and/or of the task requester that submitted the task). In addition, a variety of other types of information may similarly be considered when performing matching. For example, in some embodiments a match may be time-sensitive (e.g., based on an urgency of a task) and/or price-sensitive (e.g., when the price for performing the task varies over time, such as to increase the price over time until a task is performed or to instead decrease the price over time). Similarly, in some embodiments a variety of other types of information may be considered, such as legal constraints (e.g., to enforce a minimum or maximum limit on the number of tasks assigned to a task performer, such as for contractual or tax reasons, or to restrict performance of tasks in some embodiments and situations to task performers in a certain geographical area due to tax or national security reasons). In addition, some types of tasks may be restricted to certain types of task performers, such as only new task performers (e.g., to assist new task performers who may lack extensive qualifications) and/or only experienced task performers.

In addition, in some embodiments and/or for some types of tasks (e.g., tasks for which a task requester has requested and/or purchased an enhanced, or "concierge," level of service), the system may facilitate task performance by attempting to locate a task performer to perform the task in various ways. For example, the system may in some embodiments assist task performers to enhance their qualifications, such as by recommending to them to acquire new qualifications (e.g., based on current and/or projected demand for qualifications, or based on comparisons to other similar task performers with whom they may be competing for tasks), and may further assist the task performers in acquiring the new qualifications in some embodiments (e.g., by offering a qualification test to acquire the qualification, providing information on how to acquire a qualification from a third-party qualification issuer (or "issuing entity"), etc.). When an exact match for a task performer is not available, the system may also provide additional functionality to assist a task requester, such as to identify task performers who are closest to being a match and providing a ranked list based on the closeness of those task performers. The system may similarly rank tasks for task performers (e.g., in response to a search), such as to identify the tasks that are the closest match and/or that possess other attributes of interest (e.g., having the highest reward) first. In addition, the system may in some embodiments attempt to identify external sources of qualification information and import additional qualification information, such as to identify a match that was not initially known due to a lack of complete qualification information.

In addition, while tasks may in some embodiments have associated categories and/or keywords that are supplied by task requesters, in other embodiments the electronic marketplace system automatically categorizes tasks and/or generates keywords for tasks based on analysis of information about the tasks, such as by analyzing similarities in attributes using data mining and other related analyses techniques. In a similar manner, in some embodiments the electronic marketplace may organize related task performers and/or related task requesters into groups based on similarities in qualifications and other attributes. Such organization and categorization of tasks, task performers and/or task requesters assists users of the electronic marketplace in identifying tasks and other parties of interest, such as other parties with whom to work or with whom to avoid working.

As previously noted, in some embodiments each task may be a simple stand-alone activity for which a task performer receives a task description (and optionally additional information to analyze) and provides results of task performance. In other embodiments, however, some or all of the tasks may instead have multiple stages and/or multiple related successive activities by the task performer, including having multiple interactions (e.g., with the task requester, the TFF system and/or one or more other executing applications) during and/or between the stages or successive activities. In such embodiments, payment can be provided to a task performer in various ways, such as based on completion of all stages/activities or instead based on completion of each of one or more intermediate stages/activities.

In addition, while in some embodiments each of the task performers may be unrelated to (and even unknown to) other task performers, in other embodiments multiple task performers may instead be affiliated or related to each other in various ways, such as by being part of a single organization, by working together (e.g., as a group) when performing some or all tasks (e.g., to coordinate performance of related tasks and/or to share task-related knowledge), etc. In at least some such embodiments, tasks may be submitted by one or more task requesters for performance by a group of multiple task performers (e.g., by a specified group, by a group that has at least a minimum number of members and/or that has at most a maximum number of members, by a group that has one or more specified qualifications for the group, etc.), and/or a group of multiple task performers may accept one or more tasks for performance by one or more members of the group even if the task requesters had not specified that those tasks were for performance by a group. In addition, when multiple users work together as a group, the group may in some embodiments by treated by the TFF system in a manner similar to a single user, such as to allow the group to be issued qualifications and/or to have various types of associated information, as well as to in some embodiments automatically determined aggregate qualifications for a group based on the individual qualifications of group members.

Similarly, while in some embodiments each of the task requesters may be unrelated to (and even unknown to) other task requesters, in other embodiments multiple task requesters may instead be affiliated or related to each other in various ways, such as by being part of a single organization, by working together (e.g., as a group) for some or all tasks to be performed (e.g., to coordinate performance requests for related tasks, such as by identifying them as being related and/or specifying criteria related to performance of a group of tasks), etc. In a related manner, in some embodiments groups of tasks may be identified as being related (e.g., based on indications received from the task requesters for the tasks), such as to coordinate performance of the tasks in the group in various ways (e.g., by collecting or aggregating performance results for all of the tasks, by assigning them to one or more task performers in a manner to facilitate the coordination of the performance, etc.). In addition, in some embodiments task requesters and/or task performers may be recruited for participation in the system in a variety of ways, including on the basis of existing group membership or other affinity information (e.g., to identify people likely to have time to work as task performers, such as based on their status as being potentially retired due to their membership in a seniors-oriented group).

In some embodiments, additional security mechanisms are further employed to restrict access to at least some information for at least some users. For example, some information about tasks may not be made available to at least some task performers, such as to hide information about the existence of tasks or about certain task details from task performers who are not qualified to perform the task, to whom the task is not assigned, or who otherwise meet criteria specified by a task requester. Furthermore, some information about a task may be made available to a potential task performer only when certain conditions are satisfied, such as completion of a non-disclosure agreement or satisfaction of other specified criteria. Similarly, at least some information about the task requesters and/or task performers may be hidden from at least some other task performers and/or task requesters, such as to shield identities of users (e.g., to provide partial or total anonymity between a task requester who submits a task and a task performer who performs the task, or to limit information about a task performer or task requester to potential competitors), or to limit access to information about quantitative measurements or other qualifications in order to minimize attempts by participants in the marketplace to artificially manipulate rankings and other qualification information.

In some embodiments, the system further attempts to provide meta-information about other information in the system (e.g., results of task performance, appropriateness of a user's qualification, appropriateness of corroboration of a user's qualification, etc.), such as to provide a confidence value to a task requester regarding a likely appropriateness (e.g., accuracy, reliability, reproducibility, etc.) of results of task performance, to provide a confidence value to a user regarding a likely appropriateness (e.g., accuracy, reliability, reproducibility, etc.) of a qualification of a user (e.g., of a rating value for the user for the qualification), to provide a confidence value to a user regarding a likely appropriateness (e.g., accuracy, reliability, reproducibility, etc.) of corroboration of a qualification of a user, etc. Such confidence values may be generated or otherwise determined in various ways for task results, such as based on information obtained from other task performers than those who provided the results (e.g., by having multiple task performers perform a task and comparing the results, by having more-qualified task performers review the initially obtained task results, etc.), on comparison of the results to other results received for similar or related tasks, on automatically verifying whether the results satisfy criteria specified for the task, etc. Such confidence values may be generated or otherwise determined in various ways for users' qualifications and for corroboration of users' qualifications, including based on information provided by or otherwise associated with those users and/or based on information provided by or otherwise associated with other users.

In some embodiments, the system further assists task requesters to obtain useful results in various ways, such as by providing insurance to recoup payments made for results that are not received or that turn out to be unsatisfactory, by providing an escrow service in which payments are held until they can be verified as satisfactory, by providing for appropriate contractual terms (e.g., binding arbitration) or other mechanisms to resolve disputes, etc. Some or all of these functionalities may be provided for a fee in some embodiments, such as a fee charged to the task requesters and/or to the task performers involved in a transaction benefiting from the functionality provided. In addition, in some embodiments the system attempts to improve its performance over time by learning preferences of task requesters and/or task performers, such as by monitoring their activities and/or gathering feedback from them regarding prior activities.

The system and/or the described techniques can also be used in other manners in some embodiments. As previously noted, the system may export various information in some embodiments for use by other systems, such as user qualification information and other types of user information. In addition, use of qualification information may be used for purposes of dating or other social or business networking in some embodiments, such as by submitting tasks having qualification criteria intended to match users whose qualifications satisfy the qualification criteria—in this example, the task may be performed by identifying the one or more task performers who satisfy the task's associated qualifications or other criteria. In a similar manner, users matching specified criteria could similarly be found for other purposes in other embodiments, such as to identify appropriate users for a research study, polling, opinion taking, surveys, etc.

As previously noted, in some embodiments the TFF system assists in managing at least some types of interactions with users, such as to allow task requesters and/or task performers to specify how certain types of task-related interactions are to occur. In particular, in some embodiments task requesters are allowed to specify how interactions are to occur with task performers who are performing their tasks, and in particular to specify one or more task interaction control ("TIC") types for each of their submitted tasks. In at least some such embodiments, each TIC type is associated with a distinct combination of multiple types of processing to be performed when presenting task-related information to a task performer and/or when obtaining results of the task performance from the task performer. When the TFF system interacts with a task performer to manage the performance of a task having a specified TIC type, the TFF system implements the combination of processing types for the specified TIC type to control those interactions.

In some embodiments, at least four types of user interaction processing may be specified for each TIC type, including a specified manner of manipulating information associated with a task before it is provided to a task performer (e.g., to prepare the information to be presented to the task performer), a specified manner of providing the manipulated information to the task performer (e.g., to control the presentation of the manipulated task information to the task performer), a specified manner of receiving or otherwise obtaining results of task performance from the task performer (e.g., to control how the task results are specified by and sent by the task performer), and a specified manner of manipulating obtained task results before they are provided to the task requester (e.g., to prepare the information to be presented or otherwise provided to the task requester). In this manner, each of the types of user interaction processing may be specified independently of the others, such as to transmit task information to a task performer using a first data format and/or first transmission protocol and to receive task results from the task performer using a distinct second data format and/or distinct second transmission protocol, and/or to have task information specified in a first format and to have task results specified in a different format.

In addition, in at least some embodiments each specified manner of performing one of the types of user interaction processing may be implemented by a component containing executable information to implement that specified manner of processing. For example, each specified manner of manipulating task information before it is provided to a task performer may be implemented by an appropriate task information manipulation component, each specified manner of sending manipulated task information to a task performer may be implemented by an appropriate task information provider component, each specified manner of receiving task results from a task performer may be implemented by an appropriate task results receiver component; and each specified manner of manipulating received task results may be implemented by an appropriate task results manipulation component.

Some illustrative examples of the user interaction processing type of manipulating task information before it is provided to a task performer include the following: using XSLT ("eXtensible Style Language Transformation") to transform task data in XML format to HTML ("HyperText Markup Language") format (e.g., for display to the task performer as a Web page formatted in a specific manner) or to another format (e.g., a different XML format); wrapping task data that is in a format presentable on the task performer's computing device (e.g., in "Flash" format to be presented by a Macromedia player on the task performer's computing device, or included as part of a Java applet executable on the task performer's computing device) in another format (e.g., HTML) for transmission to the task performer; encrypting the task information before it is sent to the task performer (e.g., in a manner so that it can be decrypted by the computing device of the task performer); modifying the form of the task information (e.g., to convert XML-based data to a chart/graph/table for presentation); manipulating the content of the task information (e.g., to transform text in one language to another), whether in addition to or instead of manipulating the information format; and acting as a pass-through mechanism that does not modify the task information. The task information to be manipulated can also take a variety of forms, including text, numerical data, one or more images, video data, audio information, etc.

Some illustrative examples of the user interaction processing type of providing task information to the task performer include the following: sending a Web page or other document type to the task performer for display or other presentation by a Web browser or other appropriate application program on a computing device of the task performer (e.g., using HTTP, WAP (or "Wireless Application Protocol"), SSL (or "Secure Sockets Layer"), Secure HTTP, etc.); and sending executable code (e.g., a Java applet) to the computing device of the task performer in a manner to invoke an appropriate environment to execute the code (e.g., using JNLP (or "Java Network Launching Protocol") to execute a Java applet). In some embodiments, the user interaction processing type of providing task information to the task performer may include selecting a protocol to be used in sending the task information and/or may include causing a particular type of application on the task performer's computing device to receive and handle the task information (e.g., by causing that program to be invoked).

Some illustrative examples of the user interaction processing type of obtaining results of task performance from the task performer include the following: receiving the task results via a provided Web service-based interface that a program on the task performer's computing device invokes to send the task results; receiving the task results as CGI data (e.g., via HTTP GET and/or POST commands), such as from a form on a Web page displayed to the task performer; and receiving task results sent from an executing program on the task performer's computing device (e.g., a program invoked using a specified user interaction processing type of providing task information to the task performer), such as using a variety of communication techniques (e.g., CORBA, RPC, Java RMI (or "Remote Method Invocation"), by using ReST (or "REpresentational State Transfer") to send XML data over HTTP, etc.).

Some illustrative examples of the user interaction processing type of manipulating obtained task results before they are provided to the task requester may include processing similar to that of manipulating task information before it is provided to a task performer. In addition, the manipulating of obtained task results before they are provided to the task requester may include the following: using XSD ("XML Schema Definition") or DTD ("Document Type Definition") to convert task results data in CGI form to XML form; decrypting task results that were encrypted at the computing device of the task performer; modifying the form of or manipulating the content of the task results in various ways; and acting as a pass-through mechanism that does not modify the task results.

In some embodiments, multiple alternatives are provided by the TFF system for each of the types of user interaction processing, such as by implementing each alternative as a distinct component. Thus, for example, the alternatives for the manipulation of task information processing type may each be implemented by a corresponding task information manipulation component, and may include one or more distinct components that each have XSLT instructions for transforming data in XML format in a specified manner, a component including executable information to wrap task data in Flash format in an HTML wrapper, and a pass-through component that provides as output the same task information that it receives as input. Similar alternatives may be provided by the TFF system for each of the user interaction processing types.

In addition, in some embodiments the TFF system provides one or more predefined TIC types that are each associated with a distinct combination of components that includes at least one component of each of the user interaction processing types. In this manner, a task requester may specify a TIC type for a task being submitted by selecting one of the predefined TIC types. In addition, in some embodiments a task requester may specify multiple TIC types for a task (e.g., with the TIC types using differing types of processing for providing manipulated task information to a task performer), such as to allow task performers with computing devices having a greater variability of capabilities to perform the task. In addition, in some embodiments the TFF system may further facilitate the performance of a task by automatically selecting one of multiple specified TIC types for a task for use by a task performer, such as based on known or identifiable capabilities of the computing device of the task performer.

In addition to selecting predefined TIC types, the TFF system in some embodiments further allows users to define their own TIC types, such as for their own use and/or the user of other users. In some embodiments the TIC type definition may include the user selecting a predefined component for each of the user interaction processing types, while in other embodiments a user may further be allowed to supply his/her own components for each of one or more of the user interaction processing types (e.g., components designed to handle data that is formatted in a manner specific to a task type created by the user). In addition, in some embodiments the user-supplied components may perform the user interaction processing in different manners than those of predefined alternatives (e.g., a user-supplied component that combines the processing of two or more of the user interaction processing types, such as to both send task information to a task performer and receive task results information from the task performer) and/or may perform various additional types of processing. Moreover, while in some embodiments the selected components for a TIC type interoperate in a predefined serial manner (with the task information manipulation component receiving the raw task data and sending the manipulated task information to the task information providing component, and with the task results obtaining component receiving the raw task results and sending them to the task results manipulation component), in other embodiments a user may be allowed to specify additional logic or relationships to define how the components interoperate. In addition, in some embodiments the selection of a component may depend on the components used before and/or after the component being selected, and thus the types of components made available to a user defining a new TIC type may vary based on selections already made and/or information specific to the task.

For illustrative purposes, some embodiments are described below in which specific types of user interactions are managed in specific ways, including by using various specific types of task information processing information in specific ways. However, those skilled in the art will appreciate that the techniques of the invention can be used in a wide variety of other situations, including with other types of task information processing and to manage other types of user interactions, and that the invention is not limited to the exemplary details provided.

Figure 12H:
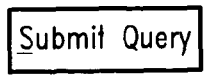

FIGS. 12A-12J illustrate an example of using multiple user interaction processing types to manage interactions related to performance of a task. In particular, FIG. 12A illustrates an example task that is submitted to the TFF and associated with a TIC type (not shown), with the task information specified in XML format in this example. In addition, the task in this example includes a question of type "multi-choice" (as shown on line 2), which is a multiple-choice question in which a task performer will select one of 5 specified images that best satisfies indicated conditions, in a manner similar to that previously discussed with respect to FIG. 2A. In this example, the task conditions are related to selecting an image best matching a specified subject (as indicated by the text in line 4 of the task that will be presented to the task performer), and the task includes indications of 5 images of type "image/jpeg" on lines 6-35.

FIG. 12B shows an example of an XSD file that includes information that can be used by the TFF system or other entity to validate that tasks having questions of type "multi-choice" are properly structured and include the appropriate data. For example, lines 30-35 of the file show the allowed types and data elements used in the "Question" section of the task illustrated in FIG. 12A, and in particular show that the "Question" data element has child elements of "Title", "Text" and "Choices" which have allowed types of "string", "string" and "ChoicesType", respectively. Other portions of the file provide other related information, such as lines 23-29 that further define the "ChoicesType" data type.

FIGS. 12C-12G next illustrate an example of task information manipulation processing type information for use in preparing the task information illustrated in FIG. 12A for presentation to a task performer, such as based on that task information manipulation processing type being specified for the TIC type associated with the task. In this example embodiment, the task information manipulation processing type information is implemented as an XSLT component that can be used to convert an XML input file to an output HTML file. The information in the XSLT component may be used by an XSLT processor program to find particular statement patterns in the XML input file that are then transformed in a specified manner in a new output file created by the XSLT processor. For example, line 4 of FIG. 12C shows that in this example the output file format will be HTML. Line 7 shows that the input XML file statement to be matched is "/Question", and lines 8-23 show corresponding HTML tags to be included in the output file. The following lines illustrated in FIG. 12C and those in FIGS. 12D-12G then illustrate how the task information from the task is manipulated to form an appropriate output HTML file to be presented to a task performer as a Web page.

After the HTML output file is sent to a computing device of the task performer (e.g., by a manipulated task information provider processing component, not shown, that sends the data using the HTTP protocol, such as based on the manipulated task information provider processing type being specified for the TIC type associated with the task), FIG. 12H illustrates the display of the HTML output file to the task presenter as a Web page, such as on a Web browser on the computing device of the task performer. In this example, the displayed Web page shows a question 1225 posed to the task performer, with multiple user-selectable image choices 1205*a-e* displayed as possible answers to the question. In particular, in this example each of the choices 1205 includes a displayed image and a user-selectable radio button control 1215 that the task performer can select. After the selection is made, which in this example is of Image 4, the task performer clicks on the "Submit" button 1220 at the bottom of the screen to cause the results of the task performance to be sent back to the TFF system.

After the task results information is received at the TFF system (e.g., by a processing component, not shown, that obtains task results by receiving CGI data from the task performer, such as based on the task results obtainer processing type being specified for the TIC type associated with the task), FIG. 12I illustrates an example of task results manipulation processing type information for use in preparing the task results to be provided to the task requester that submitted the task, such as based on that task results manipulation processing type being specified for the TIC type associated with the task. In particular, in this example the processing information is implemented as another XSLT file component that can be used to convert the task results from the task performer to XML format so that they can be programmatically provided to the task requester. For example, line 4 shows that the output of the XSLT file will be "xml" data, line 5 specifies that "/CGIData" is to be matched in the results information, and lines 6-11 specify that the value of the "@value" parameter for the selected image is to be written to the output XML file as the desired data. FIG. 12J then illustrates the output XML file that results from the operation of the task results manipulation processing, with line 3 showing that the answer selected by the task performer was labeled "Image4".

Figure 13:
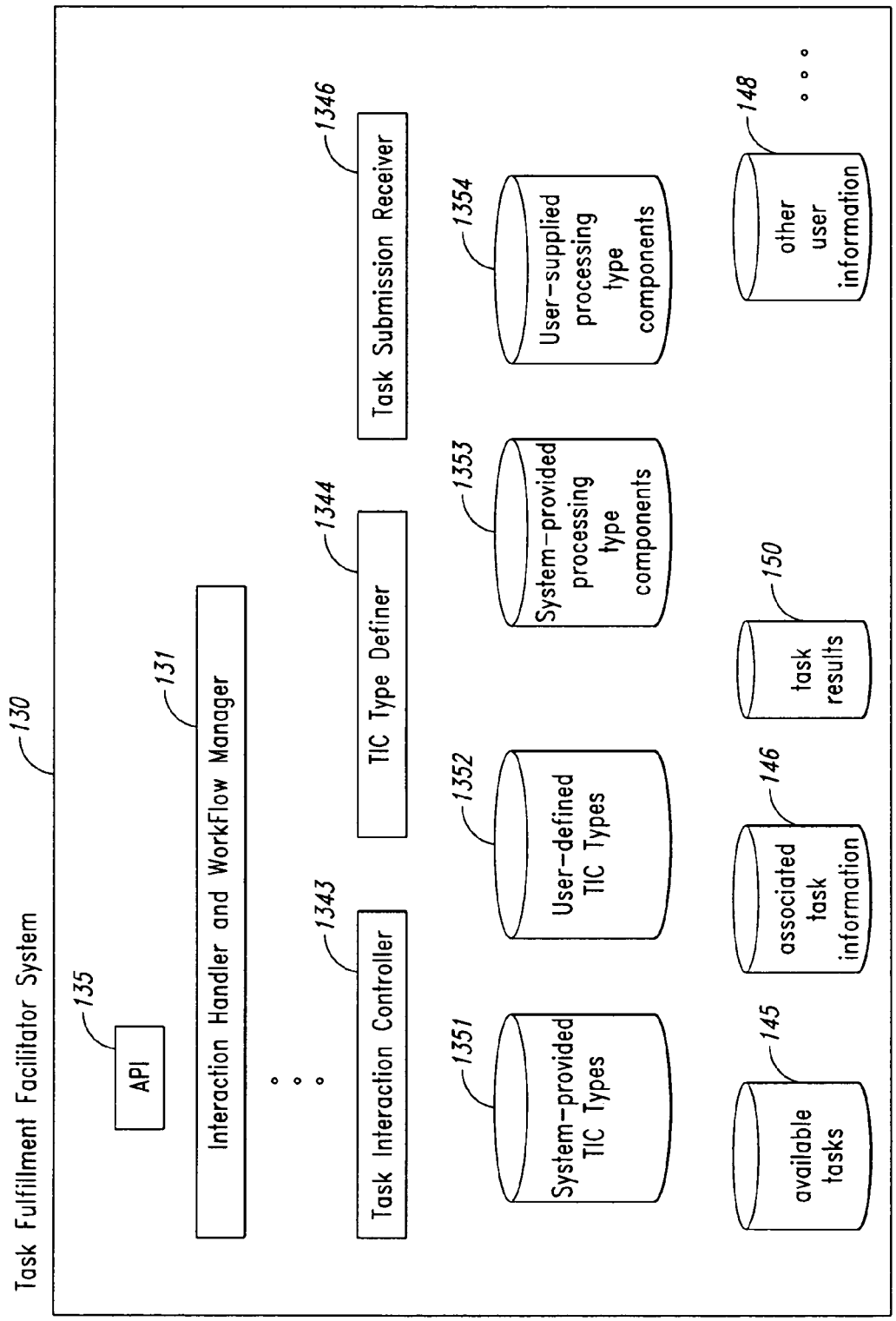
FIG. 13 is a block diagram illustrating an example system for providing an embodiment of the described electronic marketplace.

FIG. 13 illustrates an example embodiment of the TFF system 130 similar to that previously discussed with respect to FIG. 1B, but with additional modules to provide the described functionality related to the use of TIC types. In particular, FIG. 1B included a User Interaction Manager module 134 to assist in managing at least some types of interactions with users, and FIG. 13 includes three additional modules 1343, 1344 and 1346 in the illustrated embodiment to provide functionality related to the use of TIC types (e.g., as sub-modules of or a specific implementation of the User Interaction Manager module). In particular, the TFF system 130 in the embodiment illustrated in FIG. 13 includes a Task Interaction Controller module 1343, a TIC Type Definer module 1344, and a Task Submission Receiver module 1346. Various of the other modules and information discussed with respect to FIG. 1B are not included in FIG. 13 for the sake of brevity, but may be included and interact with the illustrated modules as appropriate in other embodiments.

In the illustrated embodiment, the Task Submission Receiver module receives submissions of tasks from task requesters and associates one or more TIC types with each of the submitted tasks, such as based on a specification of the TIC type for a task by the task requester submitting the task. In situations in which the task requester submits one or more tasks in an interactive manner, the Task Submission Receiver module may assist the identification of an appropriate TIC type by providing options for the TIC type to the task requester, such as based on the type of task(s) and/or information associated with the task requester. The TIC type options may include predefined TIC types and/or TIC types previously defined by the task requester, and in some embodiments the Task Submission Receiver may further allow a task requester to define a new TIC type for use with a task being submitted, such as based on interactions with the TIC Type Definer module. In other embodiments, the association of one or more TIC types with a task may instead be performed at times other than task submission, such as after the submission. After tasks are submitted and associated with one or more TIC types, information about the associated TIC types is included with the other information about the task in the database 145. During performance of the task, at least one of the associated TIC types will be used to control the task performance, and the associated TIC types may further be used in some embodiments to assist in initially selecting appropriate task performers for the task (e.g., based on those task performers having capabilities to receive task information and provide task results in a manner consistent with the processing types specified for the associated TIC types).

The Task Interaction Controller module in the illustrated embodiment controls the performance of tasks based on the TIC types associated with the tasks. In particular, when a task is to be performed by a task performer, the Task Interaction Controller module selects one of the TIC types associated with the task, and uses the types of information processing specified for the TIC type to control the task performance. In the illustrated embodiment, definitions of predefined system-provided TIC types (if any) are included in the database 1351, and definitions of user-defined TIC types (if any) are included in the database 1352. Each of the TIC type definitions specify multiple processing types to be used with the TIC type, and in some embodiments may specify logic or parameters to control how the multiple processing types interoperate. In some embodiments, each of the processing types is associated with an associated component or other grouping of processing information, with predefined system-provided components (if any) stored in the illustrated embodiment in database 1353 and user-defined components (if any) stored in the illustrated embodiment in database 1354. Thus, to control performance of a task based on an associated TIC type, the Task Interaction Controller module retrieves the TIC type definition from databases 1351 or 1352, retrieves the components specified in the TIC type definition from databases 1353 and/or 1354, and executes those components in an appropriate manner to control the task performance. An appropriate TIC type associated with a task can be selected by the Task Interaction Controller module can be selected for use in various ways, such as based on the selected TIC type being the only TIC type associated with the task, on the selected TIC type being specified by the task performer, on the selected TIC type being preferred or needed for use with the computing device of the task performer based on the device's capabilities, etc.

The TIC Type Definer module in the illustrated embodiment allows users (e.g., task requesters) to define new TIC types for use in controlling tasks to be submitted, and may further in some embodiments allow users to supply or otherwise define new components for use with a TIC type being defined (e.g., to process information specified in a format and/or task type specific to a task requester, or to provide additional capabilities, such as to encrypt and decrypt information sent to and received from a task performer in a specified manner). In other embodiments, users may not be allowed to define their own TIC types, and thus the TIC Type Definer module may not be present in those embodiments. The TIC type definition may be performed in various ways, such as by successively displaying or otherwise providing to a user each of the available alternatives for each of a series of types of information processing, such as based on predefined system-provided components. In embodiments and situations in which dependencies exist between different components or processing types, the module may further limit the provided alternatives based on the prior selections. After a new TIC type is defined, the module stores the definition in the database 1352, and further stores any user-supplied components in the database 1354.

In other embodiments, some of the types of illustrated functionality and/or information may not be provided, and other types of information and/or functionality may be available. In addition, the illustrated functionality may be combined in more or fewer modules, and the illustrated types of information may be stored in other manners.

Figure 9:
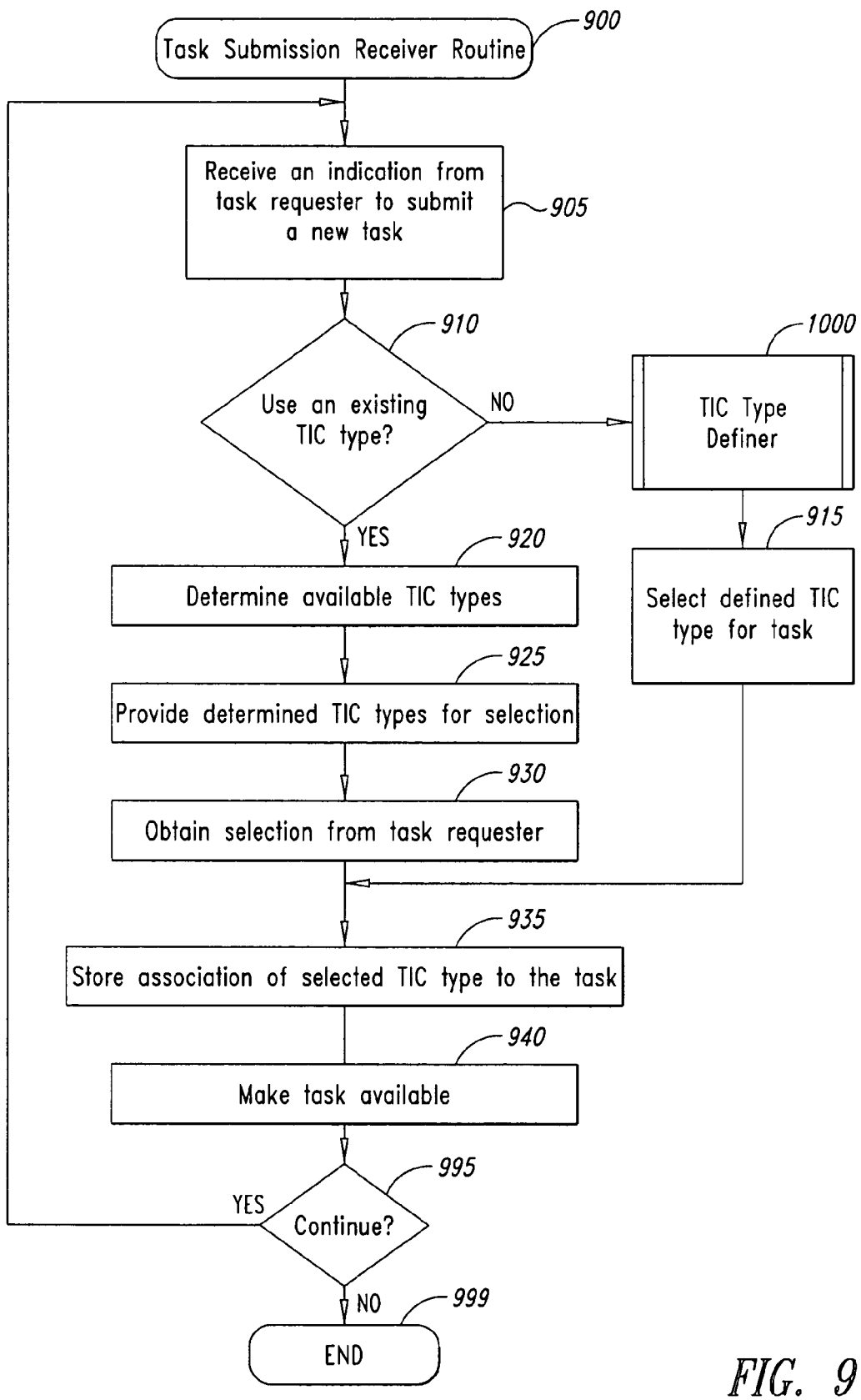
FIG. 9 is a flow diagram of an embodiment of a Task Submission Receiver routine.

FIG. 9 is a flow diagram of an embodiment of a Task Submission Receiver routine 900. The routine may, for example, be provided by execution of an embodiment of the Task Submission Receiver module 1346 of FIG. 13, such as to receive task submissions and associate one or more TIC types with the tasks. In the illustrated embodiment, the routine interacts with a user in an interactive manner to associate a TIC type with a task, although in other embodiments a user may submit an indication of a task and of one or more TIC types in a non-interactive manner.

The routine begins at step 905, where an indication is received from a task requester to submit one or more new tasks. The routine determines in step 910 whether to use one or more existing TIC types (e.g., predefined system-provided TIC types), such as based on an indication received from the task requester, and if so continues to step 920 to determine available TIC types. Available TIC types may be determined in various ways, such as based on all defined TIC types, TIC types determined to be appropriate for the task and/or the user submitting the task, etc. The routine then continues to step 925 to provide the determined TIC types to the task requester, and in step 930 obtains a selection from the task requester of one or more of the TIC types. If it was instead determined in step 910 not to use an existing TIC type, the routine continues instead to execute the TIC Type Definer routine in step 1000 to define one or more new TIC types, and in step 915 selects the newly defined TIC type(s) for use with the task being submitted.

After steps 930 or 915, the routine continues to step 935 to associate the selected TIC type(s) with the task(s) being submitted, and continues to step 940 to make the tasks available for performance (e.g., by storing information about the tasks in an available tasks database). The routine then continues to step 995 to determine whether to continue. If so, the routine returns to step 905, and if not the routine continues to step 999 and ends.

Figure 10A:
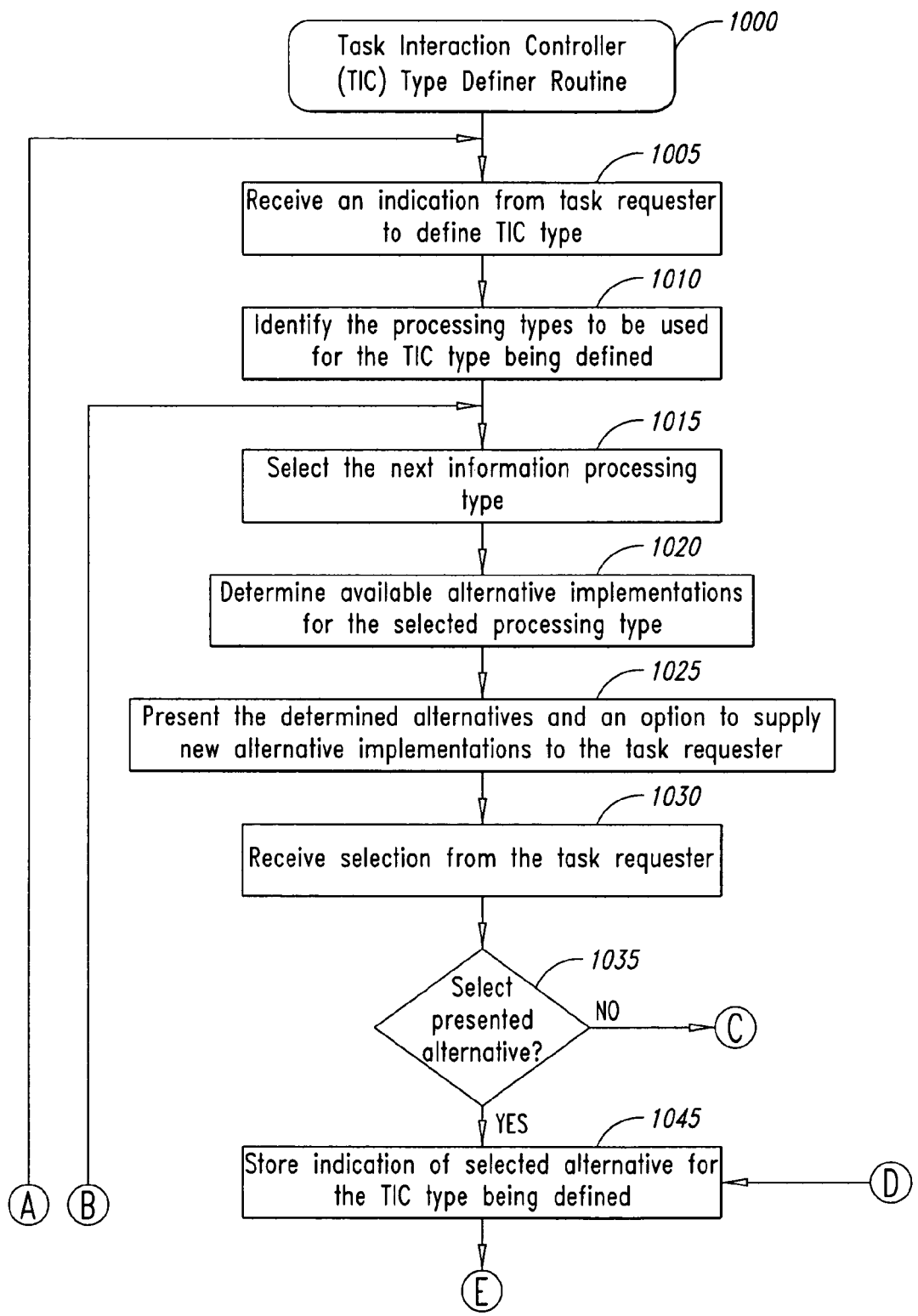
FIGS. 10A and 10B are a flow diagram of an embodiment of a Task Interaction Controller Type Definer routine.
Figure 10B:
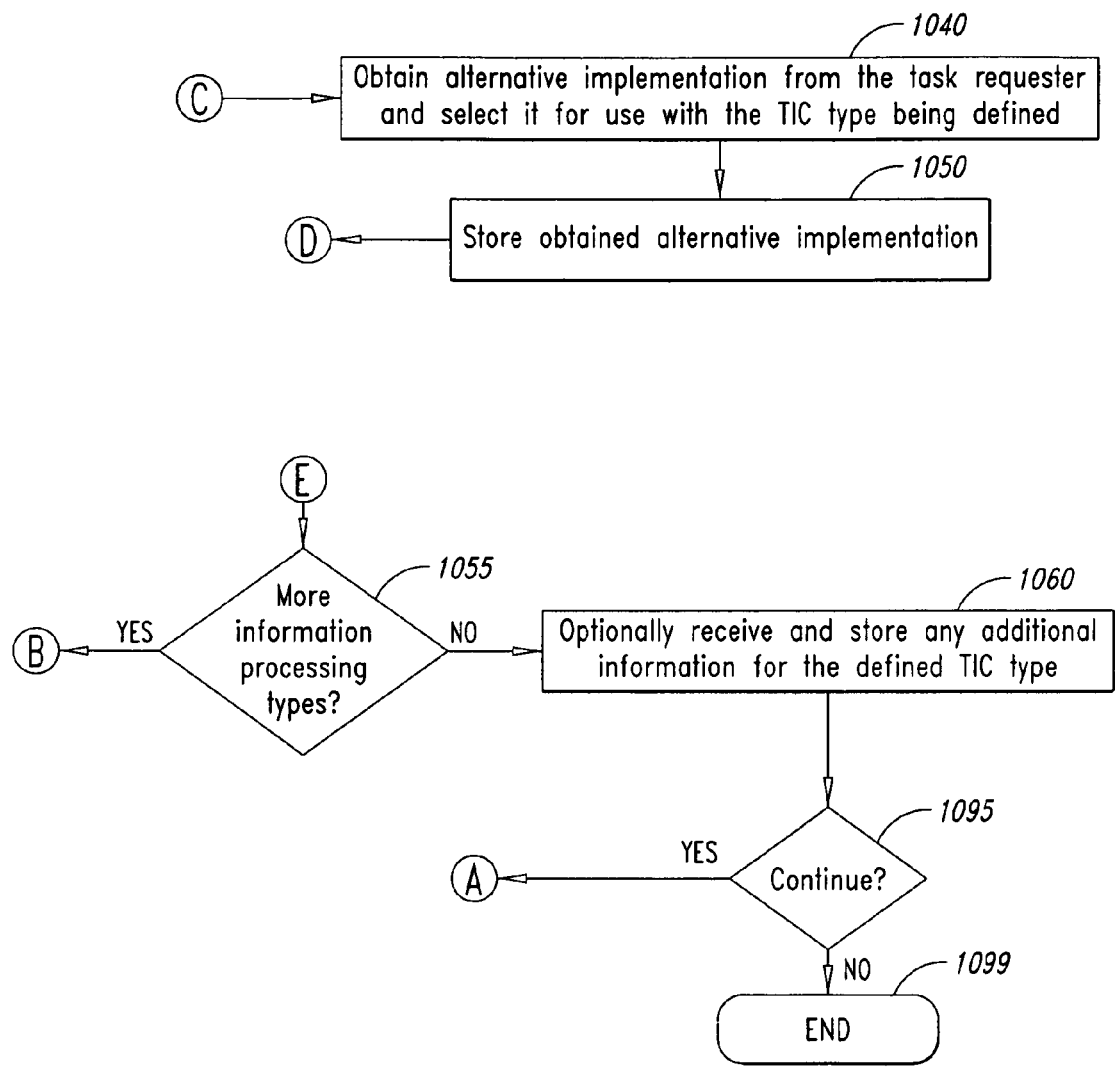

FIGS. 10A and 10B are a flow diagram of an embodiment of a Task Interaction Controller Type Definer routine 1000. The routine may, for example, be provided by execution of an embodiment of the TIC Type Definer module 1344 of FIG. 13, such as to define new TIC types by users. In the illustrated embodiment, the routine interacts with a user in an interactive manner to define a new TIC type, although in other embodiments a user may instead submit a definition of one or more new TIC types in a non-interactive manner.

The routine begins at step 1005, where an indication is received from a user (e.g., a task requester) to define a new TIC type. The routine continues to step 1010 to identify the processing types to be used for the TIC type being defined, such as based on a default set of processing types used for all TIC types or instead in another manner. The routine then continues to step 1015 to select the next information processing type to be specified for the new TIC type being defined, beginning with the first. In step 1020 the routine then determines available alternatives for the selected information processing type, such as all alternatives or instead in a manner based on other information from the new TIC type (e.g., other alternatives already selected, the user defining the new TIC type, etc.). The routine then continues to step 1025 to present the available alternatives to the task requester along with an option to instead supply a new alternative implementation, although in other embodiments such user-supplied alternatives may not be used or may be specified by the task requester at other times or in other manners.

The routine then continues to step 1030 to receive a selection from the task requester, and in step 1035 determines whether the task requester selected one of the previously available alternatives. If not, the routine continues to step 1040 to obtain an alternative implementation from the task requester (e.g., by receiving a component with executable information to implement the alternative) and selects it for use with the new TIC type being defined, and in step 1050 stores the obtained alternative for later user. After step 1050, or if it was instead determined in step 1035 that the task requester selected an existing alternative, the routine continues to step 1045 to store an indication of the selected alternative as being specified for the new TIC type. The routine then determines in step 1055 whether there are more information processing types to specify for the new TIC type, and if so returns to step 1015 to select the new information processing type to specify. If not, the routine stores a definition of the new TIC type for later use, and then continues to step 1060 to optionally specify any received additional information for the new TIC type (e.g., information about the conditions under which the TIC type may be used and who may use it). While not illustrated here, the routine may in some embodiments also return an indication to the task requester for the new defined TIC type, such as a unique identifier for later use in referencing the new TIC type. The routine then determines in step 1095 whether to continue. If so, the routine returns to step 1005, and if not continues to step 1099 and ends.

Figure 11:
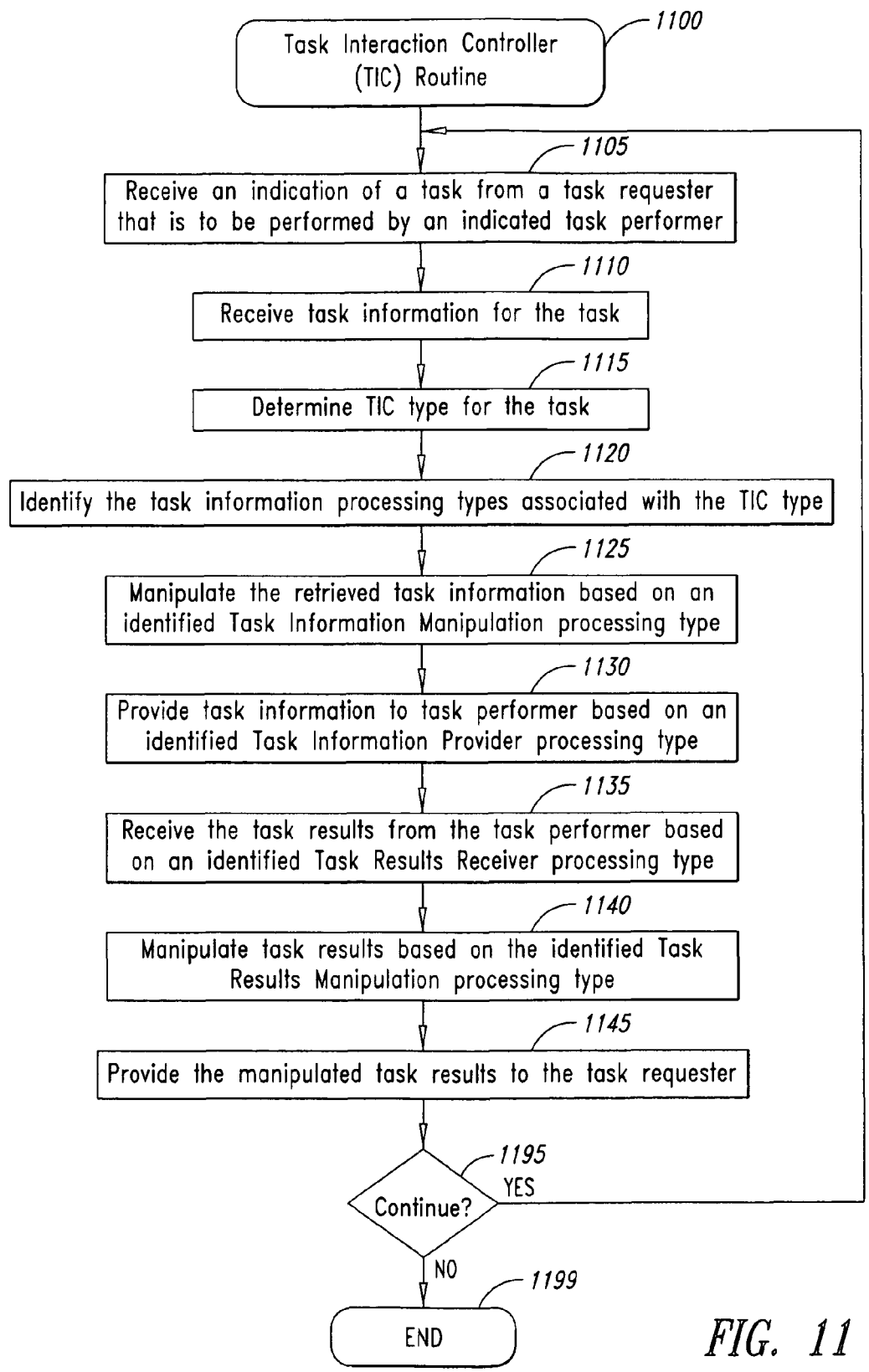
FIG. 11 is a flow diagram of an embodiment of a Task Interaction Controller routine.

FIG. 11 is a flow diagram of an embodiment of a Task Interaction Controller routine 1100. The routine may, for example, be provided by execution of an embodiment of the Task Interaction Controller module 1343 of FIG. 13, such as to control performance to tasks based on TIC types associated with the tasks.

The routine begins at step 1105, where an indication is received of a task to be performed by a task performer, such as based on a request by the task performer. The routine continues to step 1110 to retrieve task information for the task, and in step 1115 determines a TIC type for use in controlling performance of the task, such as based on an association of the TIC type with the task and/or a selection of the TIC type by the task performer. The routine then continues to step 1120 to determine multiple task information processing types specified for the determined TIC type—in the illustrated embodiment, each TIC type specifies a component or other group of processing information for each of four task information processing types, although in other embodiments other numbers or types of processing types may instead be used.

In steps 1125-1140, the routine then performs each of the types of processing specified for the determined TIC type. In step 1125, the routine manipulates the retrieved task information in a specified manner based on a specified task information manipulation processing type for the TIC type, and in step 1130 the routine provides the manipulated task information to the task performer in a specified manner based on a specified task information providing processing type for the TIC type. After the task performer performs the task, the routine receives the results of the task performance in a specified manner in step 1135 based on a specified task results receiver processing type for the TIC type, and in step 1140 manipulates the received task results in a specified manner based on a task results manipulation processing type for the TIC type. While the illustrated embodiment indicates a synchronous flow in which the routine waits for and obtains task results after sending the task information, in other embodiments the routine could be structured in other manners, such as to continue with other processing while waiting for task results (if any) to be sent. In addition, in some situations task performers may not provide task results for a task after they accept an assignment to perform the task, which may be indicated to the routine in an explicit message from the task performer to withdraw from task performance or instead by not receiving task results within a specified period of time, and if so the routine would continue to handle other task-related requests and information.

After step 1140, the routine continues to step 1145 to provide the manipulated task results to the task requester in a specified manner, although in other embodiments the task results may instead be stored until the task requester proactively retrieves them. After step 1145, the routine continues to step 1195 to determine whether to continue. If so, the routine returns to step 1105, and if not continues to step 1199 and ends.

While the use of TIC types and associated use of various types of information processing have been described in conjunction with the TFF system, those skilled in the art will appreciate that these techniques may similarly be used in variety of other situations, including in other types of systems in which questions are provided and answers are gathered, or more generally in which information is provided and received. In addition, in some embodiments and situations only some of the illustrated types of information processing may be used, such as to use processing for providing information or for receiving information but not for both. Accordingly, TIC types can be used in a variety of other embodiments.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computing system configured to facilitate performance of tasks, comprising:
   one or more processors;
   a first module configured to, when executed by at least one of the one or more processors, automatically assess relevance of each of multiple qualifications based at least in part on automatically tracked use of the multiple qualifications by at least one of task requesters who submit tasks and task performers who perform tasks, and to automatically assess credibility of each of multiple qualification issuers based at least in part on the automatically tracked use of the multiple qualifications, the automatic assessing of the relevance of each of the multiple qualifications including measuring an aspect of the qualification with respect to each of one or more predetermined metrics; and
   a second module configured to, when executed by at least one of the one or more processors, provide information to one or more users regarding the automatically assessed relevance of one or more of the multiple qualifications and to provide information to one or more users regarding the automatically assessed credibility of one or more of the qualification issuers.

2. The computing system of claim 1 further comprising one or more additional modules configured to facilitate performance of tasks each having one or more associated qualifications by task performers whose issued qualifications match the associated qualifications of the tasks, each of the tasks being submitted for performance by a task requester who associates the one or more qualifications with the task for use in controlling which task performers perform the task.

3. The computing system of claim 2 wherein the one or more additional modules are part of a task fulfillment facilitator system, and wherein the first module is a relevance assessment manager module.

4. The computing system of claim 1 further comprising a user qualification module configured to issue qualifications to task performers that each reflect an ability of a task performer to perform tasks.

5. The computing system of claim 1 wherein, for each of one or more of the multiple qualification issuers, the assessed credibility of the qualification issuer is based at least in part on automatically assessed relevance of one or more qualifications issued by the qualification issuer.

6. The computing system of claim 1 wherein the first and second modules each include software instructions for execution in memory of the computing system.

7. The computing system of claim 1 wherein the first module consists of means for automatically assessing relevance of each of multiple qualifications based at least in part on automatically tracked use of the qualifications by task requesters with submitted tasks and/or by task performers who perform tasks, and for automatically assessing credibility of each of multiple qualification issuers based at least in part on the automatically tracked use of the qualifications, and wherein the second module consists of means for providing information to one or more users regarding the automatically assessed relevance of one or more of the qualifications and for providing information to one or more users regarding the automatically assessed credibility of one or more of the qualification issuers.

8. The computing system of claim 1 wherein the one or more predetermined metrics used for the automatic assessing of the relevance of each of the multiple qualifications include at least one of one or more metrics related to popularity of the qualification for use regarding task performance, of one or more metrics related to performance of tasks with which the qualification is associated, of one or more metrics related to performance of tasks by task performers to whom the qualification is issued, and of one or more metrics related to profitability of performance of tasks related to the qualification.

9. The computing system of claim 1 wherein the one or more predetermined metrics used for the automatic assessing of the relevance of each of the multiple qualifications include multiple metrics, the multiple metrics including one or more metrics related to popularity of the qualification for use regarding task performance, one or more metrics related to performance of tasks with which the qualification is associated, one or more metrics related to performance of tasks by task performers to whom the qualification is issued, and one or more metrics related to profitability of performance of tasks related to the qualification.

10. The computing system of claim 1 wherein the automatic assessing of the relevance of each of the multiple qualifications is based on at least one of a number of times that the qualification has been issued to a task performer and a number of times that the qualification has been associated with a task.

11. The computing system of claim 1 wherein the automatic assessing of the relevance of each of the multiple qualifications is based on at least one of throughput of performed tasks by task performers who have been issued the qualification, time to complete tasks by task performers who have been issued the qualification, a number of tasks completed by task performers who have been issued the qualification, a number of completed tasks that have been associated with the qualification, a rate of acceptance of completed tasks that have been associated with the qualification, and time to complete tasks that have been associated with the qualification.

12. The computing system of claim 1 wherein the automatic assessing of the relevance of each of the multiple qualifications includes at least one of determining other qualifications with which the qualification may be used together as a group, of determining other qualifications that are alternatives to the qualification, of determining one or more types of task requesters who use the qualification, and of determining one or more types of task performers who use the qualification.

13. The computing system of claim 1 wherein the providing of the information regarding the automatically assessed relevance of the one or more qualifications includes providing the information to one or more users for use related to performance of additional tasks, the one or more users each being a task requester user who submits at least one of the additional tasks for performance, and the information regarding the automatically assessed relevance of the one or more qualifications being provided to enable the one or more task requester users to identify qualifications to be used with the additional tasks in order to control which task performers are allowed to perform the additional tasks.

14. The computing system of claim 1 wherein the providing of the information regarding the automatically assessed relevance of the one or more qualifications includes providing the information to one or more users for use related to performance of additional tasks, the one or more users each being a task performer user, and the information regarding the automatically assessed relevance of the one or more qualifications being provided to enable the one or more task performer users to identify qualifications to be obtained by the task performer users for use in performing the additional tasks.

15. The computing system of claim 1 wherein the multiple qualifications are each of one of multiple distinct types of qualifications, and wherein the automatic assessing of the relevance of the multiple qualifications includes assessing relevance of multiple of the qualification types.

16. The computing system of claim 1 wherein at least some of the multiple qualification issuers are third-party entities who provide qualifications for a fee to at least one of task requesters for use in controlling which task performers perform tasks and of task performers for use in reflecting abilities to perform tasks.

17. The computing system of claim 1 wherein the automatic assessing of the credibility of each of at least one of the multiple qualification issuers includes measuring one or more aspects of the qualification issuer based at least in part on feedback from human users regarding the qualification issuer.

18. A computer-implemented method for facilitating performance of tasks, comprising:
    automatically assessing relevance of each of multiple qualifications based at least in part on automatically tracking at least one of use of the multiple qualifications by task requesters who submit tasks with those submitted tasks and of use of the multiple qualifications by task performers who perform tasks submitted by the task requesters, the automatic assessing of the relevance being performed by one or more configured computing systems and including measuring an aspect of each of the multiple qualifications with respect to each of one or more predetermined metrics;
    automatically assessing credibility of each of one or more qualification issuers based at least in part on the automatically tracked use of the multiple qualifications, the automatic assessing of the credibility being performed by the one or more configured computing systems;
    providing information to one or more users regarding the automatically assessed relevance of one or more of the multiple qualifications; and
    providing information to one or more users regarding the automatically assessed credibility of one or more of the qualification issuers.

19. The method of claim 18 further comprising facilitating performance of the submitted tasks by the task performers, each of the submitted tasks being associated with one or more of the multiple qualifications by one of the task requesters who submitted the task in order to control which task performers perform the task, and each of the submitted tasks being performed by at least one of the task performers who has issued qualifications that match the associated qualifications of the submitted task.

20. The method of claim 19 wherein the one or more configured computing systems are part of a task fulfillment facilitator system, and wherein the method further comprises facilitating issuance of one or more qualifications to each of one or more of the task performers, each qualification that is issued to a task performer reflecting an ability of the task performer to perform tasks with which the qualification is associated.

21. The method of claim 20 wherein, for each of at least one of the one or more qualification issuers, the qualification issuer issues one or more of the multiple qualifications to one or more of the task performers, and the assessed credibility of the qualification issuer is based at least in part on the automatically assessed relevance of the one or more qualifications issued by the qualification issuer.

22. A non-transitory computer-readable storage medium whose contents include instructions that when executed configure a computing system to facilitate performance of tasks, by performing a method comprising:
    automatically assessing relevance of each of multiple qualifications based at least in part on use of the multiple qualifications by task requesters who submit tasks with those submitted tasks and use of the multiple qualifications by task performers who perform tasks submitted by the task requesters, the automatic assessing of the relevance being performed by the configured computing system and including measuring an aspect of each of the multiple qualifications with respect to each of one or more predetermined metrics;

automatically assessing credibility of each of one or more qualification issuers based at least in part on the use of the multiple qualifications by at least one of the task requesters and the task performers, the automatic assessing of the credibility being performed by the configured computing system;

providing information to one or more users regarding the automatically assessed relevance of one or more of the multiple qualifications; and providing information to one or more users regarding the automatically assessed credibility of one or more of the qualification issuers.

23. The computer-readable storage medium of claim 22 wherein the method further comprises facilitating performance of the submitted tasks by the task performers, each of the submitted tasks being associated with one or more of the multiple qualifications by one of the task requesters who submitted the task in order to control which task performers perform the task, and each of the submitted tasks being performed by at least one of the task performers who has issued qualifications that match the associated qualifications of the submitted task.

24. The computer-readable storage medium of claim 22 wherein the configured computing system is part of a task fulfillment facilitator system, and wherein the method further comprises issuing one or more qualifications to each of one or more of the task performers, each qualification that is issued to a task performer reflecting an ability of the task performer to perform tasks with which the qualification is associated.

25. The computer-readable storage medium of claim 22 wherein, for each of at least one of the one or more qualification issuers, the qualification issuer issues one or more of the multiple qualifications to one or more of the task performers, and the assessed credibility of the qualification issuer is based at least in part on the automatically assessed relevance of the one or more qualifications issued by the qualification issuer.

26. The computer-readable storage medium of claim 22 wherein the computer-readable medium is a memory of the computing system.

* * * * *